(12) United States Patent
Girault

(10) Patent No.: US 10,893,743 B1
(45) Date of Patent: Jan. 19, 2021

(54) PORTABLE COMPUTING DEVICE HOLSTER

(71) Applicant: Dimitri Girault, Miramar, FL (US)

(72) Inventor: Dimitri Girault, Miramar, FL (US)

(*) Notice: Subject to any disclaimer, the term of this patent is extended or adjusted under 35 U.S.C. 154(b) by 0 days.

(21) Appl. No.: 16/006,772

(22) Filed: Jun. 12, 2018

Related U.S. Application Data

(63) Continuation-in-part of application No. 15/207,480, filed on Jul. 11, 2016, now Pat. No. 9,995,432, which is a continuation-in-part of application No. 14/044,038, filed on Oct. 2, 2013, now Pat. No. 9,388,939.

(Continued)

(51) Int. Cl.
| | |
|---|---|
| *F16M 13/04* | (2006.01) |
| *F21V 33/00* | (2006.01) |
| *G06F 1/16* | (2006.01) |
| *A45F 5/00* | (2006.01) |
| *F16M 11/04* | (2006.01) |
| *F16M 11/10* | (2006.01) |
| *F16M 11/20* | (2006.01) |
| *A45F 5/02* | (2006.01) |

(Continued)

(52) U.S. Cl.
CPC ........... *A45F 5/102* (2013.01); *F16M 11/041* (2013.01); *F16M 11/125* (2013.01); *F16M 13/04* (2013.01); *A45F 2005/006* (2013.01); *A45F 2005/1066* (2013.01); *A45F 2200/0525* (2013.01); *G06F 1/163* (2013.01); *G06F 1/1632* (2013.01)

(58) Field of Classification Search
CPC .... G06F 1/1626; G06F 1/1632; G06F 1/1637; G06F 1/166; G06F 1/1613; G06F 1/1633; G06F 1/181; G06F 1/1607; G06F 1/1679; H05K 5/0217; A45F 2005/006; A45F 2200/0525; A45F 5/00; F16M 11/041; F16M 13/04
See application file for complete search history.

(56) References Cited

U.S. PATENT DOCUMENTS 4,431,290 A * 2/1984 Kennedy ................ G01C 11/02
396/182
5,081,478 A 1/1992 Hayashida et al.
(Continued)

*Primary Examiner* — Binh B Tran
*Assistant Examiner* — Michael A Matey
(74) *Attorney, Agent, or Firm* — Allen D Hertz, P.A.; Allen D. Hertz

(57) ABSTRACT

A portable computing tablet holster comprising a handle assembly attached to a portable computing tablet retention assembly. The portable computing tablet retention assembly is adapted to retain a portable computing tablet therein using a pair of elongated retention channels extending along opposite elongated edges of a tablet rear support panel. The tablet is retained by a lateral retention channel extending along a lateral edge and at least one flexible retention element located proximate an opposite lateral edge thereof. The handle assembly can be rigidly fixed to the rear panel or moveably assembled to the rear panel. Movement between the handle and the rear panel can include a sliding movement, a rotating movement, and/or a pivoting movement. A user input device can be integrated into the handle for controlling at least one of a light and/or a camera integrated into the holster, the tablet, and the like.

31 Claims, 49 Drawing Sheets

Related U.S. Application Data

(60) Provisional application No. 61/709,298, filed on Oct. 3, 2012.

(51) Int. Cl.
*A45F 5/10* (2006.01)
*F16M 11/12* (2006.01)

(56) References Cited

U.S. PATENT DOCUMENTS

| | | | |
|---|---|---|---|
| 5,305,030 A * | 4/1994 | Yokoyama | A45C 11/38 348/E5.025 |
| 6,773,110 B1 | 8/2004 | Gale | |
| 7,563,038 B2 | 7/2009 | Hershenzon | |
| 7,877,841 B2 | 2/2011 | Mangaroo et al. | |
| 7,907,394 B2 | 3/2011 | Richardson et al. | |
| 7,976,227 B2 | 7/2011 | Orf et al. | |
| 8,091,850 B2 * | 1/2012 | Carnevali | B25B 5/02 248/176.1 |
| 8,138,869 B1 | 3/2012 | Lauder et al. | |
| 8,376,301 B2 * | 2/2013 | Fan | F16M 11/041 249/231.21 |
| 8,638,557 B2 * | 1/2014 | Tsai | F16M 11/041 248/919 |
| 8,770,539 B1 * | 7/2014 | Hsu | B60R 11/0241 248/126 |
| 8,885,338 B1 * | 11/2014 | Simpson | A45F 5/10 224/929 |
| 9,202,095 B2 * | 12/2015 | Martin | G06K 7/0004 |
| 9,450,634 B2 | 9/2016 | Rayner | |
| 2003/0029985 A1 | 2/2003 | Zeller et al. | |
| 2004/0026590 A1 | 2/2004 | Lin | |
| 2005/0196999 A1 * | 9/2005 | Chang | B60R 11/0241 439/345 |
| 2006/0204239 A1 * | 9/2006 | Inaba | G03B 35/00 396/325 |
| 2007/0090638 A1 | 4/2007 | Severi Rivera | |
| 2008/0158411 A1 * | 7/2008 | Firnberg | F16M 11/10 348/373 |
| 2008/0169393 A1 * | 7/2008 | Wang | B60R 11/02 248/274.1 |
| 2009/0009936 A1 * | 1/2009 | Neu | H04B 1/3877 361/679.01 |
| 2009/0321593 A1 * | 12/2009 | Foddis | F16M 11/16 248/187.1 |
| 2010/0171021 A1 * | 7/2010 | Smith | B65H 75/446 248/558 |
| 2010/0195278 A1 | 8/2010 | Wilkenfeld | |
| 2010/0214470 A1 | 8/2010 | Cottagnoud | |
| 2011/0031287 A1 | 2/2011 | Le Gette et al. | |
| 2011/0164173 A1 * | 7/2011 | Orf | H04N 5/2252 348/376 |
| 2011/0170851 A1 * | 7/2011 | Orf | F16M 11/041 396/421 |
| 2011/0221319 A1 | 9/2011 | Law et al. | |
| 2011/0240830 A1 | 10/2011 | Alemozafar et al. | |
| 2011/0249394 A1 * | 10/2011 | Nielsen | G06F 1/1632 361/679.41 |
| 2011/0249964 A1 | 10/2011 | Wood | |
| 2011/0255226 A1 * | 10/2011 | Duncan Seil | B60R 11/02 361/679.01 |
| 2011/0290975 A1 | 12/2011 | Lin | |
| 2011/0299231 A1 * | 12/2011 | Gaddis, II | H05K 5/023 361/679.01 |
| 2011/0315733 A1 | 12/2011 | White | |
| 2012/0026684 A1 * | 2/2012 | Matthews | F16M 11/041 361/679.58 |
| 2012/0037771 A1 | 2/2012 | Kitchen | |
| 2012/0068043 A1 | 3/2012 | Daigle et al. | |
| 2012/0075799 A1 | 3/2012 | Pollex | |
| 2012/0111881 A1 * | 5/2012 | Gaddis, II | G06F 1/1628 220/752 |
| 2012/0113572 A1 | 5/2012 | Gaddis, II | |
| 2012/0273630 A1 * | 11/2012 | Gillespie-Brown | F16M 11/041 248/122.1 |
| 2013/0001382 A1 | 1/2013 | Jang | |
| 2013/0005401 A1 * | 1/2013 | Rosenhan | G06F 1/1626 455/557 |
| 2013/0016463 A1 * | 1/2013 | Hiramoto | H01R 13/516 361/679.01 |
| 2013/0105644 A1 * | 5/2013 | Yu | G10G 5/005 248/125.7 |
| 2013/0126688 A1 * | 5/2013 | Li | F16M 11/041 248/276.1 |
| 2013/0148273 A1 | 6/2013 | Tsai | |
| 2013/0161967 A1 | 6/2013 | Jarrett | |
| 2013/0168514 A1 * | 7/2013 | Woolford | F16M 11/041 248/231.9 |
| 2013/0176669 A1 * | 7/2013 | Takahashi | B60R 11/02 361/679.01 |
| 2014/0093229 A1 * | 4/2014 | Lecuna Aguerrevere | F16M 11/048 396/420 |
| 2014/0124644 A1 * | 5/2014 | Wong | E05B 73/0082 248/553 |
| 2014/0166832 A1 * | 6/2014 | Briant | F16M 11/041 248/205.1 |
| 2014/0233180 A1 | 8/2014 | Vargas | |
| 2014/0359710 A1 * | 12/2014 | Chaput | H04M 15/67 726/4 |
| 2015/0009672 A1 | 1/2015 | Girault | |
| 2015/0192956 A1 | 7/2015 | Whorton | |
| 2015/0195392 A1 * | 7/2015 | Nissenbaum | A45F 5/00 455/569.1 |
| 2015/0244126 A1 | 8/2015 | Carnevali | |
| 2015/0292669 A1 | 10/2015 | Floersch | |
| 2015/0300050 A1 * | 10/2015 | Van Balen | A47F 7/0246 248/551 |
| 2015/0313026 A1 | 10/2015 | Yu | |
| 2015/0319285 A1 | 11/2015 | Zajeski | |
| 2015/0365121 A1 | 12/2015 | Smith | |
| 2017/0003574 A1 * | 1/2017 | Choi | G03B 15/07 |

* cited by examiner

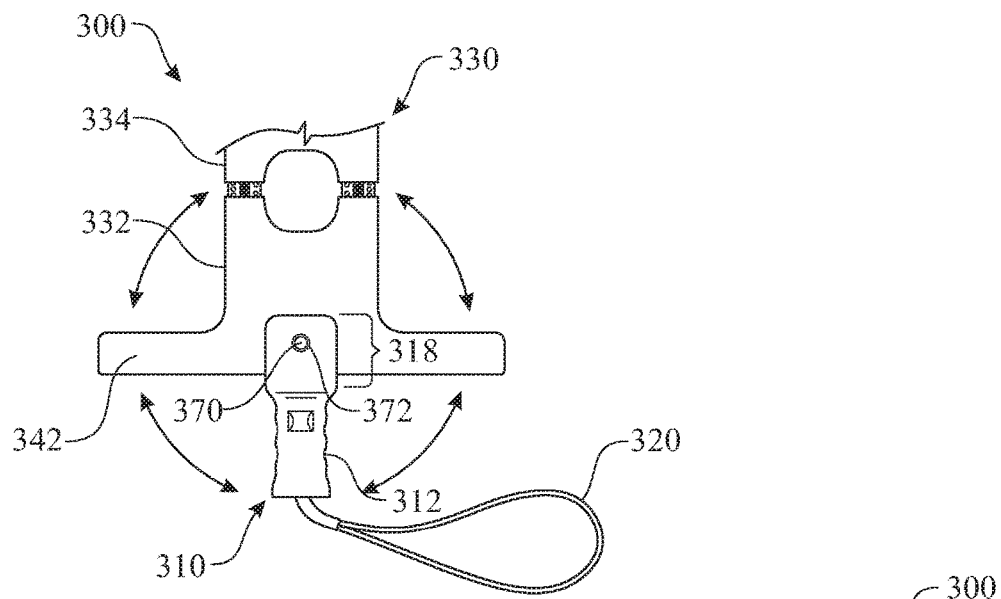
FIG. 6A
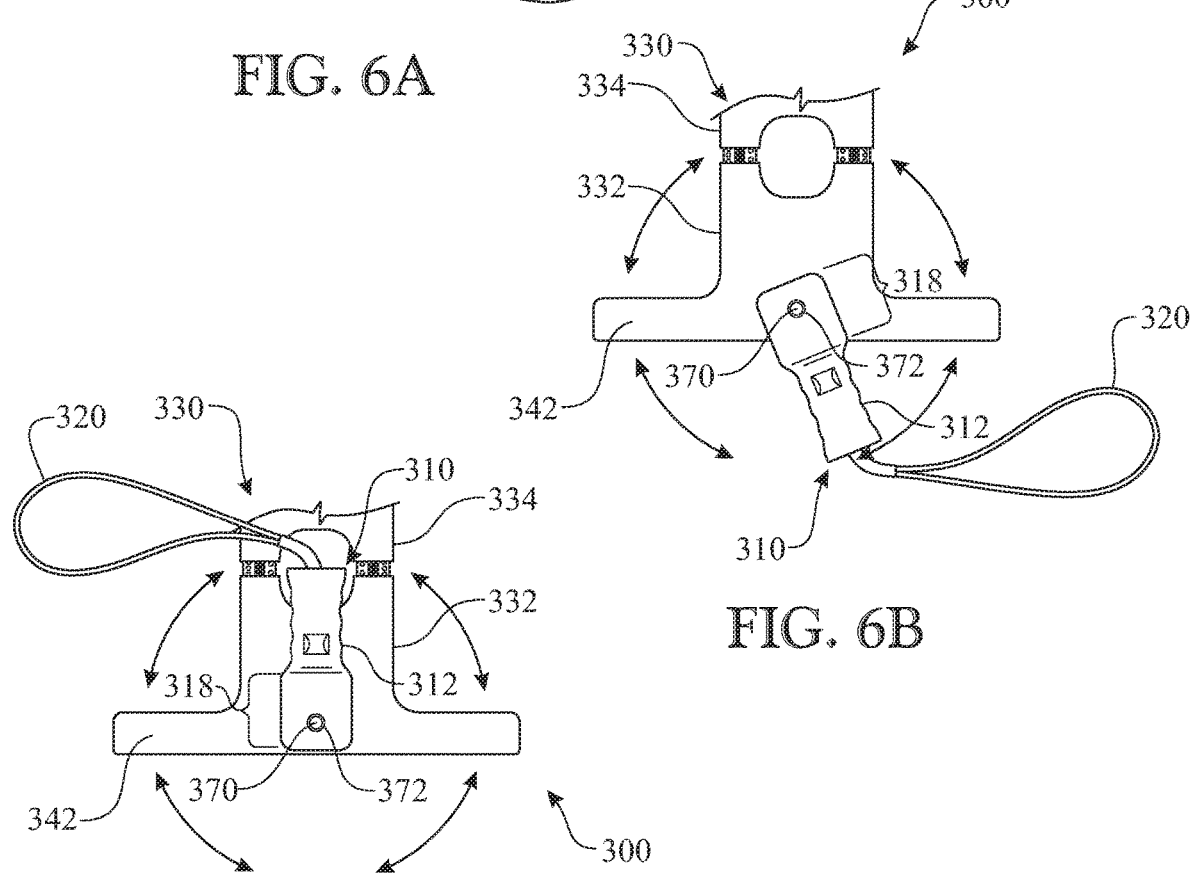
FIG. 6B
FIG. 6C

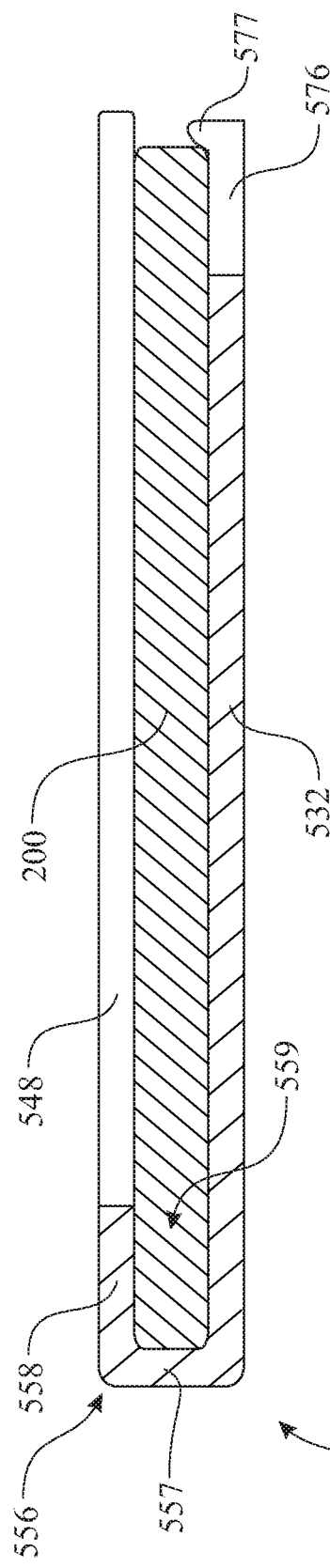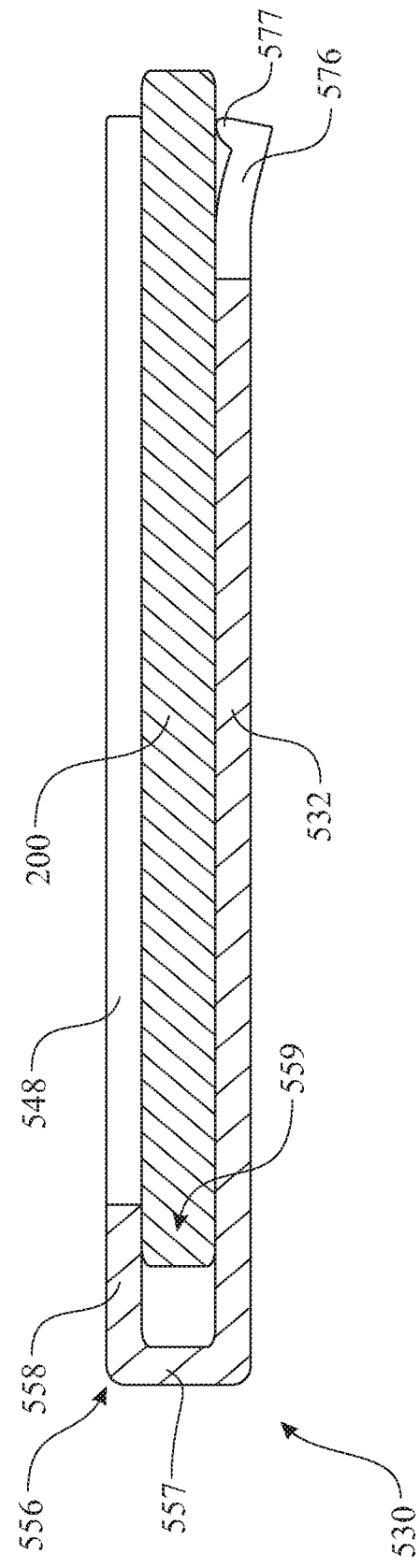

PORTABLE COMPUTING DEVICE HOLSTER

CROSS-REFERENCE TO RELATED APPLICATION

This Non-Provisional Utility Application (NPPA) is:
(A) a Continuation-In-Part (CIP), which claims the benefit of United States Non-Provisional Utility Patent Application (NPPA) Ser. No. 15/207,480, filed on Jul. 11, 2016 (scheduled to issue as U.S. Pat. No. 9,995,432 on Jun. 12, 2018),
(B) wherein United States Non-Provisional Utility Patent Application (NPPA) Ser. No. 15/207,480 a Continuation-In-Part (CIP), claiming the benefit of United States Non-Provisional Patent Application (NPPA) Ser. No. 14/044,038, filed on Oct. 2, 2013 (issued as U.S. Pat. No. 9,388,939 on Jul. 12, 2016),
(C) wherein Ser. No. 14/044,038 is a Non-Provisional Utility Patent Application (NPPA) claiming the benefit of U.S. Provisional Patent Application Ser. No. 61/709,298, filed on Oct. 3, 2012,
(D) all of which are incorporated herein in their entireties.

FIELD OF THE INVENTION

The present disclosure relates to an apparatus for supporting a portable computing device. More particularly, the present disclosure relates to a portable computing device holster, which allows a user to adequately hold the portable computing device using a single hand or to additionally increase stability when supporting the portable computing tablet using two hands.

BACKGROUND OF THE INVENTION

The present invention provides a portable computing device holster. Various portable computing device holsters are known in the art for use in supporting a portable computing devices relative to a fixed surface such as, for example, table tops, automotive dash boards or seats, etc. Portable computing devices can include portable computing tablets, multi-media tablets, Smartphones, and the like.

Cases are common place for protection of portable computing devices. The cases include features which support the portable computing devices when placed upon a supporting surface, such as a table, a chair, a countertop, and the like. Some cases include a strap extending across a rear panel of the case, enabling single handed support for the user. This configuration tends to be cumbersome or unusable when using the portable computing device to capture or record images and/or video.

One drawback with the currently available technology is the ability to support the portable computing tablet using a single hand. For example, it is very difficult to hold a portable computing device using a single hand when capturing video images while operating the multi-media device freehand. Owners of portable computing devices use the portable computing devices to capture video images during events at any of a variety of venues. Portable computing devices are commonly rectangular in shape and lack handles, grooves, grips or any other provision to enhance a grasp thereof, wherein any of these features would be beneficial to the user while capturing video images. The smooth and flat design of the portable computing devices makes it difficult or impossible to grasp with a single hand. Additionally, using a single hand to grip the portable computing tablet will result in poor video quality due to vibrations resulting from a lack of stability. It is also recognized that when using a single hand to grasp the portable computing device, the likelihood of accidentally dropping the portable computing tablet also increases. Dropping the portable computing device commonly results damage to at least one of the case and the display. Repair of the damage portable computing device is very expensive. Portable computing devices are also limited to the available lighting for video recording. Portable computing devices do not have adequate light sources to support video recording in poorly lit environments, such as indoors, evenings or night time, and the like.

Portable computing devices are continuously being adapted for new functions. The currently available carrying cases provide limited functionality. Selfie sticks provide a user with an extension handle for use with a portable computing device; generally a Smartphone. The selfie stick includes a telescoping handle having a controller at a grip end and an electronic device holster at a second, distal end. The device is provided as a finished assembly.

Accordingly, there remains a need in the art for a portable computing device holster enabling a user to hand hold a portable computing device with a single hand of a user. Additionally, there exists a need in the art for a portable computing device holster incorporating a light emitting device to enhance the ability of the portable computing device to film clear and bright still pictures or video. There also exists a need in the art for a portable computing device holster enabling adaptability for a variety of applications. This includes an ability to utilize accessories.

SUMMARY OF THE INVENTION

The present invention overcomes the deficiencies of the known art and the problems that remain unsolved by providing an apparatus for supporting and controlling a portable computing tablet using a single hand of a user.

In accordance with a first embodiment of the present invention, the invention consists of a portable computing tablet holster assembly comprising:
a portable computing tablet retention assembly comprising:
  a tablet holster frame rear panel having a first elongate edge, a second elongated edge opposite and parallel to the first elongate edge, a first lateral edge, wherein the first lateral edge extends between like first ends of the first elongate edge and the second elongate edge, a second lateral edge opposite and parallel to the first lateral edge, the second lateral edge extending between like second ends of the first elongate edge and the second elongate edge,
  a tablet holster frame first retention channel extending along at least a portion of the first elongate edge,
  a tablet holster frame second retention channel extending along at least a portion of the second elongate edge,
  a tablet holster frame end retention channel extending along at least a portion of the first lateral edge,
  each channel being designed to receive and retain a respective edge of the portable computing tablet, and
  a pliant tablet retention feature extending inward from a contact surface of the tablet holster frame rear panel, the pliant tablet retention feature being designed to enable passage of the portable computing tablet into the holster and retain the portable computing tablet within the holster during use; and a handle having an attachment end and a distal, free end, the handle being attached to the tablet holster frame rear panel at the attachment end thereof.

In a second aspect, the first retention channel and the second retention channel are sized to slideably receive a thickness of a respective edge of the portable computing tablet.

In another aspect, a light emitting device is provided and is located on an outer, exposed surface of the portable computing tablet retention assembly.

In yet another aspect, a switch for controlling the light emitting device is integrated onto the handle or hand grip.

In yet another aspect, the pliant tablet retention feature is a pliant tablet retention tab unitarily formed within a backing panel of the portable computing tablet retention assembly.

In yet another aspect, the pliant tablet retention tab is flexibly formed by a pair of slots extending inward from an exposed edge of the backing panel of the portable computing tablet retention assembly.

In yet another aspect, the pliant tablet retention tab is flexibly formed by a pair of slots extending inward from an exposed edge of the backing panel of the portable computing tablet retention assembly, the pliant tablet retention tab further comprising at least one feature adapted for flexure thereof.

In yet another aspect, the pliant tablet retention tab is flexibly formed by a pair of slots extending inward from an exposed edge of the backing panel of the portable computing tablet retention assembly, the pliant tablet retention tab having a thickness adapted for flexure thereof.

In yet another aspect, the pliant tablet retention tab includes a raised lip extending in a direction away from the backing panel of the portable computing device.

In yet another aspect, the pliant tablet retention feature includes a spring biasing element.

In yet another aspect, the spring biasing element is one of a cantilevered spring, a coil spring, a compression spring, a foam material, and the like.

In yet another aspect, the handle is attached to the portable computing tablet retention assembly by a handle attachment section, the handle attachment section extends axially from an attachment end of the handle.

In yet another aspect, the handle can include a telescoping feature. The telescoping feature can extend the handle from a contracted dimension to an extended dimension that is multiples of a length of the handle in the contracted state. The telescoping components can be of a length that is generally proximate and slightly shorter than the length of the handle in the contracted state. The extension would be approximately multiples of the length of the handle in the contracted state, the multiples being respective to the number of telescoping segments integrated into the handle.

In yet another aspect, the handle attachment section is affixed to the portable computing tablet retention assembly.

In yet another aspect, the handle attachment section is rigidly affixed to the portable computing tablet retention assembly.

In yet another aspect, the handle attachment section is integral with the portable computing tablet retention assembly.

In yet another aspect, the handle attachment section is moveably assembled to the portable computing tablet holster.

In yet another aspect, the handle attachment section is slideably assembled to the portable computing tablet holster.

In yet another aspect, the handle attachment section is slideably assembled to the portable computing tablet retention assembly using a sliding interface.

In yet another aspect, the handle attachment section is slideably assembled to the portable computing tablet retention assembly using a sliding interface; the sliding interface includes a locking mechanism, wherein the locking mechanism retains the handle attachment section in a desired position on the portable computing tablet retention assembly.

In yet another aspect, the handle attachment section is slideably assembled to the portable computing tablet retention assembly, the handle attachment section comprising a handle attachment tab, the portable computing tablet retention assembly comprising a slot, wherein the handle attachment tab is slideably assembled within the slot.

In yet another aspect, the handle attachment section is pivotally assembled to the portable computing tablet retention assembly.

In yet another aspect, the handle attachment section is pivotally assembled to the portable computing tablet retention assembly, the pivotal motion rotating about an axis that is substantially perpendicular to a plane defined by a surface of a display of the portable computing device.

In yet another aspect, the handle attachment section is pivotally assembled to the portable computing tablet retention assembly, the pivotal motion rotating about an axis that is substantially perpendicular to a plane defined by a surface of a display of the portable computing device and concentrically located on the portable computing tablet retention assembly.

In yet another aspect, the handle attachment section is at least one of pivotally and pivotally assembled to the portable computing tablet retention assembly.

In yet another aspect, the handle attachment section and the portable computing tablet retention assembly are pivotally assembled to one another by a pivot element enabling rotation of the handle relative to the portable computing tablet retention assembly.

In yet another aspect, the pivot element is a pivot pin.

In yet another aspect, the pivot element is a ratchet pivot disk and a mating ratchet mechanism.

In yet another aspect, the handle attachment section is pivotally assembled to the handle.

In yet another aspect, the handle attachment section is pivotally assembled to the handle, the pivotal motion rotating about an axis that is substantially perpendicular to an elongated axis of the handle.

In yet another aspect, the handle includes finger grooves.

In yet another aspect, the handle includes one or more finger grooves, wherein the switch is integral with one of the one or more finger grooves.

In yet another aspect, a controller is integrated into the handle.

In yet another aspect, the controller includes a short range wireless communication circuit, wherein the short range wireless communication circuit is compatible with a short range wireless communication circuit of the portable computing tablet.

In yet another aspect, the controller is in signal communication with a connector, the connector being adapted to connect with a mating connector of the portable computing device.

In yet another aspect, the controller is in signal communication with a non-volatile digital memory device, the non-volatile digital memory device being at least one of integral with the handle and removable from the handle.

In yet another aspect, the controller is in signal communication with a user input device.

In yet another aspect, the user input device being at least one of: a joystick, a touch pad, a digital input wheel, a digital input sphere, a keypad, and the like.

In yet another aspect, the controller is in signal communication with a digital camera, the digital camera being integral with the handle or the portable computing tablet holster.

In yet another aspect, the portable computing tablet retention assembly includes at least one portable computing tablet retention assembly tablet slot, the slot extending inward from the terminating lateral edge of the portable computing tablet holster.

In yet another aspect, the portable computing tablet retention assembly includes at least one retention assembly tablet slot, the slot extending inward from the open, tablet insertion lateral edge of the portable computing tablet retention assembly.

In yet another aspect, the handle is formed comprising an angular segment.

In yet another aspect, the handle is formed comprising an angular segment, the angular segment extending between a handle attachment section and an elongated gripping section.

In yet another aspect, the angular segment enables the user to employ the handle as a stand to support the portable computing tablet retention assembly when placed upon a generally horizontally oriented supporting surface.

In yet another aspect, the angular segment enables the user to rotate the handle to a position located behind (a non tablet side) the portable computing tablet holster.

In yet another aspect, the portable computing tablet holster comprises two handles, the two handles extending downward from a same longitudinal edge of the portable computing tablet retention assembly.

In yet another aspect, the portable computing tablet holster is adapted to control a radio controlled device, wherein at least one user input device is adapted to acquire user input for controlling the radio controlled device is integral with the handle.

In yet another aspect, the portable computing tablet holster is adapted to control the radio controlled device, wherein at least one user input device is integral with each of the pair of handles, each of the at least one user input device is adapted to acquire user input for controlling the radio controlled device.

In accordance with a second embodiment of the present invention, the invention consists of a portable computing tablet holster comprising:
  a first retention member having a first retention plate and a first retention rail extending from the first retention plate, the first retention rail defining a first channel for receipt of a first edge of a portable computing tablet;
  a second retention member movably mounted to the first retention member and having a second retention plate and a second retention rail extending from the second retention plate, the second retention rail defining a second channel for receipt of a second edge of the portable computing tablet;
  a handle assembly including a hand grip attached to the first retention member; and
  at least one slide affixed to one of the first and second retention members and movably mounted relative to the other of the first and second retention members.

In another aspect, the at least one slide comprises a pair of slide pins.

In another aspect, an extension spring is affixed at one end to the first retention member and at an opposite end to the second retention member.

Introducing another embodiment, a portable computing tablet holster for use in supporting a portable computing tablet with a single hand of a user is provided comprising:
  a retention member having a retention plate and a retention rail extending from the retention plate;
  a handle assembly including a handle member; and
  an articulating mechanism pivotally mounted to the handle assembly and rotatably mounted to the retention member.

In another aspect, the retention rail defines a channel for receipt of an upper, a lower and a side edge of a portable computing tablet, the channel extending around an upper edge, a closed side edge and a lower edge of the retention plate.

In another aspect, a light emitting device is provided and is located on an outer, exposed surface of the second retention member.

In another aspect, the handle assembly includes a support member extending from an upper end of the handle member.

In another aspect, the support member includes a light emitting device and the handle member includes a switch for operating the light emitting device.

In another aspect, the support member includes a light emitting device and the handle member includes a touch screen for operating the light emitting device.

In another aspect, the articulating mechanism includes a hinged support arm pivotally mounted on the support member and a ratchet plate affixed to the retention plate and rotatably mounted on the hinged support arm.

In another aspect, the hinged support arm is pivotally mounted to the support member by a hinge.

In another aspect, the ratchet plate includes ratchet teeth engagable with the hinged support arm to incrementally rotate the retention member relative to the handle assembly.

In another aspect, the retention plate includes a hole to accommodate a camera lens of the portable computing tablet and at least one tab engagable with an edge of the portable computing tablet to releasably retain the portable computing tablet within the retention member.

Introducing a further embodiment, a portable computing tablet holster having an integrated system for support and use with a portable computing tablet is provided comprising:
  a retention member for receipt of a portable computing tablet and having a retention plate and a retention rail;
  a handle assembly including a handle member and attached to the retention member;
  a controller positioned within one of the retention member and handle assembly;
  a memory module linked to the controller;
  a user input in the form of a touch screen on the handle member, the user input being linked to the controller; and
  a wired interface linked to the controller and in direct communication with a wired interface of the portable computing tablet.

In another aspect, a camera and light emitting device are mounted on the handle assembly and in operational communication with the controller.

In yet another aspect, the portable computing device holster employs a portable computing device retention assembly that is removably assembled to a handle assembly.

In yet another aspect, the portable computing device retention assembly includes a handle sliding mechanism receiving slot, the handle sliding mechanism receiving slot includes a pair of parallel arranged handle sliding mechanism receiving edge channels located along each side of the handle sliding mechanism receiving slot. The handle assembly includes a handle sliding mechanism sized and shaped to be received by the handle sliding mechanism receiving edge channels. Edges of the handle sliding mechanism are sized and shaped to be slideably inserted into the handle sliding mechanism receiving edge channels. Each edge of the handle sliding mechanism can be shaped to follow an interior contour of the respective handle sliding mechanism receiving edge channel.

In yet another aspect, the handle sliding mechanism can include at least one feature to temporarily restrain the handle sliding mechanism from moving within the handle sliding mechanism receiving slot.

In yet another aspect, the at least one feature within the handle sliding mechanism to temporarily restrain the handle sliding mechanism from moving within the handle sliding mechanism receiving slot can include at least one biased retracting element.

In yet another aspect, each at least one biased retracting element engages with a respective handle sliding mechanism detent lateral bore. A series of handle sliding mechanism detent lateral bores are formed within the handle sliding mechanism receiving edge channels.

In yet another aspect, the handle sliding mechanism can be fabricated having one or more body segments.

In yet another aspect, the handle sliding mechanism can be fabricated having a pair of body segments.

In yet another aspect, each at least one biased retracting element is slideably assembled between the pair of body segments.

In yet another aspect, each at least one biased retracting element is slideably assembled between the pair of body segments and retained in a normally outwardly biased position by a biasing element. In one solution, the biasing element can be a compression spring.

In yet another aspect, the portable computing device retention assembly includes a first channel base segment and a second channel base segment.

In yet another aspect, at least one of the a first channel base segment and a second channel base segment can include a portable electronics retention element channel formation that includes a plurality of different sized and/or shaped grooves to receive different sized and/or shaped portable computing devices or shaped portable computing device protective cases. The associated size and shape can be of different thicknesses, different cross sectional shapes (rounded, squared off, etc.), or any combination thereof.

In yet another aspect, the portable electronics retention element channel formation can include a second channel formation formed within a first channel formation.

In yet another aspect, the portable electronics retention element channel formation can include a third channel formation formed within the second channel formation.

In yet another aspect, the second channel formation can be shaped being narrower than the first channel formation.

In yet another aspect, the second channel formation can be shaped differently than the first channel formation.

In yet another aspect, the portable electronics retention element channel formation can include a first channel formation and a first channel formation, the first channel formation and the second channel formation being parallelly arranged and distant from one another along each respective first channel base segment and second channel base segment.

In yet another aspect, the portable computing device retention assembly includes a base elongated retention element channel base segment and a distal elongated retention element channel base segment.

In yet another aspect, the base elongated retention element channel base segment is integrated into a rear support panel and the distal elongated retention element channel base segment is integrated into distal elongated retention element, wherein the distal elongated retention element is slideably assembled to the rear support panel. The sliding assembly between the distal elongated retention element and the rear support panel enables a distance adjustment between the base elongated retention element channel base segment and the distal elongated retention element channel base segment.

In yet another aspect, a tension biasing element has a respective end attached to each of the distal elongated retention element and the rear support panel. The tension biasing element draws the distal elongated retention element and the rear support panel towards one another. The tensile force can retain a portable computing device between the base elongated retention element channel base segment and the distal elongated retention element channel base segment.

In yet another aspect, the tension biasing element can be a tension spring. A first end of the tension spring can be secured to a securing element of the rear panel expansion sliding element and a second end of the tension spring can be secured to a securing element of the tablet rear support panel.

In yet another aspect, the securing element of the tablet rear support panel can be located within a biasing element attachment point access cavity.

In yet another aspect, the biasing element attachment point access cavity can be concealed using a biasing element cavity cover member. The biasing element cavity cover member can be secured to the tablet rear support panel using an adhesive, a mechanical connection, a snap interface design, a hinge, a hinge and snap feature combination, a material welding process, and the like.

In yet another aspect, the handle sliding mechanism includes an assembly feature, enabling assembly of the handle sliding mechanism to a support device. The support device can be a handle, an articulating assembly of a handle, a gooseneck support arm, a tripod, a strap attachment, and the like.

In yet another aspect, a gooseneck assembly includes a gooseneck support arm, a gooseneck ball clamping component, and a gooseneck ball clamping component compression nut. The gooseneck ball clamping component is assembled to the handle sliding mechanism. The gooseneck support arm includes a flexible gooseneck support arm attachment ball. The flexible gooseneck support arm attachment ball is inserted into a gooseneck ball clamping component ball receiving socket of the gooseneck ball clamping component. The gooseneck ball clamping component compression nut creates a compression force, which is applied by the gooseneck ball clamping component ball receiving socket to the flexible gooseneck support arm attachment ball.

In yet another aspect, the gooseneck ball clamping component ball receiving socket includes at least one slit or compression gap, the compression gap segments the gooseneck ball clamping component ball receiving socket, enabling contraction between segments, generating a compression force by a surface of gooseneck ball clamping component ball receiving socket. An exterior surface of the gooseneck ball clamping component ball receiving socket can be conically shaped, where an interior surface of the gooseneck ball clamping component compression nut engages with the exterior surface of the gooseneck ball clamping component ball receiving socket. As the gooseneck ball clamping component compression nut engages with the exterior surface of the gooseneck ball clamping component ball receiving socket, the taper of the conical shape of the exterior surface of the gooseneck ball clamping component ball receiving socket compresses the exterior surface of the gooseneck ball clamping component ball receiving socket inward, creating the clamping force.

In yet another aspect, a portable power system can be integrated into the handle assembly.

In yet another aspect, the portable power system can include a portable power supply. The portable power supply can include at least one battery, at least one super capacitor, or any other suitable portable power storage device.

In yet another aspect, power is transferred from the portable power supply to an electronic element using at least one power conductor provided within a sliding interface between the distal elongated retention element and the rear support panel.

In yet another aspect, power is transferred by transferring a positive contact along a first sliding interface and a negative contact along a second sliding interface.

In yet another aspect, power is transferred from the portable power supply to an electronic element using at least one power conductor provided within a sliding interface between the handle sliding mechanism and the rear support panel.

In yet another aspect, power is transferred from the portable power supply to an electronic element using at least one power conductor provided within a sliding interface between the handle sliding mechanism and a respective mating element of the handle assembly.

In yet another aspect, the electronic element can be integrated into one of the distal elongated retention element or the rear support panel.

In yet another aspect, the electronic element can be integrated into one of the base elongated retention element channel base segment and the distal elongated retention element channel base segment.

In yet another aspect, the electronic element can be a hot shoe.

In yet another aspect, the electronic element can be a laser projection virtual keyboard.

In yet another aspect, a signal cable can provide signal communication between the laser projection virtual keyboard and the portable computing device.

In yet another aspect, the laser projection virtual keyboard can include a wireless communication circuit for wirelessly communicating with the portable computing device.

In yet another aspect, the electronic element can be a light emitting device.

In yet another aspect, the electronic element can be a microphone.

In yet another aspect, the microphone can include a wireless communication circuit for wirelessly communicating with the portable computing device.

In yet another aspect, an accessory can be inserted into the hot shoe.

In yet another aspect, the accessory inserted into the hot shoe can be a light emitting device. Power can be provided to the light emitting device through the hot shoe.

In yet another aspect, the accessory inserted into the hot shoe can be a microphone. Power can be provided to the microphone through the hot shoe.

In yet another aspect, the accessory inserted into the hot shoe can be a laser projection virtual keyboard. Power can be provided to the laser projection virtual keyboard through the hot shoe.

In yet another aspect, the laser projection virtual keyboard can be moveable between the distal elongated retention element and the rear support panel.

In yet another aspect, the portable computing device retention assembly can include at least one feature for receiving a screen display shade accessory.

In yet another aspect, the screen display shade accessory includes a top panel that is designed to extend forward of the portable computing device.

In yet another aspect, the screen display shade accessory can include a gasketing material located between a contacting edge of the top panel and a respective mating surface of the portable computing device.

In yet another aspect, the screen display shade accessory can include a top panel and a pair of side panels, each side panel extending generally perpendicularly downward from each respective edge of the top panel.

In yet another aspect, each side panel can include a tapered front edge. The taper would be oriented having a widest portion proximate the top panel and the edge continuing closer to the portable computing device, as the edge continues away from the top panel.

In yet another aspect, the at least one feature for receiving a screen display shade accessory integrated into the portable computing device retention assembly can be a slot for slideably receiving a screen display shade accessory attachment extrusion. The screen display shade accessory attachment extrusion would be assembled to or integrated with the top panel. The screen display shade accessory attachment extrusion can be unitarily formed with the top panel or provided as a separate component that is subsequently assembled to the top panel.

In yet another aspect, the at least one feature for receiving the screen display shade accessory can be integrated into at least one of the rear support panel and the distal elongated retention element. More specifically, the at least one feature for receiving the screen display shade accessory can be integrated into at least one of the base elongated retention element channel base segment and the distal elongated retention element channel base segment.

In yet another aspect, the slot for slideably receiving the screen display shade accessory attachment extrusion can be shaped to ensure that the motion is only limited to a sliding motion along an axial direction of the slot.

In yet another aspect, the slot for slideably receiving the screen display shade accessory attachment extrusion can be shaped to ensure that the motion is limited to a sliding motion along an axial direction of the slot and a pivotal motion about the axial direction of the slot.

In yet another aspect, the holster can include a receptacle for receiving a Bluetooth controller.

In yet another aspect, the receptacle for receiving a Bluetooth controller can include a Bluetooth controller receptacle top panel.

In yet another aspect, the receptacle for receiving a Bluetooth controller can include a Bluetooth controller receptacle top panel. The Bluetooth controller receptacle top panel is designed to engage with a top segment of a side panel of the Bluetooth controller.

In yet another aspect, the receptacle for receiving a Bluetooth controller can include a front panel latch element extending generally perpendicular from an outer edge of the Bluetooth controller receptacle top panel. The front panel latch element is designed to engage with a front panel of the Bluetooth controller.

In yet another aspect, the receptacle for receiving a Bluetooth controller can include a Bluetooth controller receptacle lower panel. The Bluetooth controller receptacle lower panel is designed to engage with a lower or bottom segment of the side panel of the Bluetooth controller.

In yet another aspect, the receptacle for receiving a Bluetooth controller can include a Bluetooth controller receptacle retention projection. The Bluetooth controller receptacle retention projection is designed to engage with and be inserted through a Bluetooth controller housing retention slot extending through the Bluetooth controller.

In yet another aspect, a portable computing device retention assembly can be configured to removably receive one or more side wing expansion panels.

In yet another aspect, a portable computing device retention assembly can be configured to removably receive a pair of side wing expansion panels, a first side wing expansion panel which assembles to the portable computing device retention assembly, extending outward in a first direction and a second side wing expansion panel which assembles to the portable computing device retention assembly, extending outward in a second, opposite direction.

In yet another aspect, a portable computing device retention assembly can be configured to removably receive two pair of side wing expansion panels, a first lower side wing expansion panel which assembles to the portable computing device retention assembly, extending outward in a first direction and a second lower side wing expansion panel which assembles to the portable computing device retention assembly, extending outward in a second, opposite direction and a first upper side wing expansion panel which assembles to the portable computing device retention assembly, extending outward in a first direction and a second upper side wing expansion panel which assembles to the portable computing device retention assembly, extending outward in a second, opposite direction. The first lower side wing expansion panel and the first upper side wing expansion panel would be assembled to the rear support panel using the same extension wing panel assembly slot of the tablet rear support panel.

In yet another aspect, the tablet rear support panel can additionally include a portable computing device retention assembly camera aperture. The portable computing device retention assembly camera aperture could be formed through the tablet rear support panel, providing a window for the camera located at a rear of the portable computing device. The camera aperture is sized to accommodate a majority (with a goal of accommodating all) camera locations on the portable computing device.

In yet another aspect, a tacky material or micro-retention material can be applied to a contacting surface of at least one of the tablet rear support panel, the wing expansion elements, and the like. The tacky material or micro-retention material is designed to grip a substantially smooth surface, such as a surface of the portable computing device.

In yet another aspect, the lower wing expansion elements can further include a slot for receiving and supporting the portable computing device.

In yet another aspect, each side wing includes a sliding assembly extrusion feature. Each sliding assembly extrusion feature can be formed in a shape of an extruded key, a dovetail, or any other suitable shape. The suitable shape being one that retains the side wing in position, only enabling a sliding motion along an axial direction of the sliding interface. A stop can be provided at a proximal end of the sliding interface or key slot of the rear support panel.

In yet another aspect, a strap receiving slot can be formed through each side section of the rear support panel. The strap receiving slot is designed to receive a strap. The strap is designed to be attached to an arm of a user or any other suitable support element.

In yet another aspect, a strap comfort fill element can be sized and shaped to be inserted into a handle sliding mechanism receiving slot of the tablet rear support panel. The strap comfort fill element is inserted to provide comfort to the user. A slot would be formed through the strap comfort fill element. The slot of the strap comfort fill element would be sized, shaped and located to align with the like slot of the tablet rear support panel.

In yet another aspect, the strap can employ a pair of mating segments of a dense hook and loop material.

In yet another aspect, a loop would be secured to one end of the strap.

In yet another aspect, in use, the strap comfort fill element would be inserted into the handle sliding mechanism receiving slot of the tablet rear support panel. The free end of the strap would be inserted through the strap receiving slot. The strap would be used to secure the assembly to the user or any other desired support element. The portable computing device would be assembled to and retained by the tablet rear support panel. These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the drawings provided to illustrate and not to limit the invention, in which:

FIG. 6A presents a partial viewing side elevation view of a first exemplary alternative embodiment of the portable computing tablet holster, the alternative embodiment incorporating a handle pivotally assembled to a non-viewing side of a base tablet rear support panel of the portable computing tablet holster, the handle being shown in a fully extended configuration;

FIG. 6B presents a partial viewing side elevation view of the portable computing tablet holster originally introduced in FIG. 6A, the illustration presenting the handle partially rotated relative to the base tablet rear support panel of the portable computing tablet holster;

FIG. 6C presents a partial viewing side elevation view of the portable computing tablet holster originally introduced in FIG. 6A, the illustration presenting the handle rotated one-hundred-eighty degrees (180°) relative to the base tablet rear support panel of the portable computing tablet holster;

FIG. 14 presents a sectional view of the portable computing tablet holster and portable computing tablet, the section being taken along section line 14-14 in FIG. 10, the illustration introducing a tab, wherein the tab is employed to retain the portable computing tablet within the portable computing tablet retention assembly;

FIG. 15 presents a sectional view of the portable computing tablet holster and portable computing tablet, the section being similar to the section taken along section line 14-14 in FIG. 10, wherein the tab is deformed to allow for removal of the portable computing tablet from the portable computing tablet retention assembly;

Like reference numerals refer to like parts throughout the several views of the drawings.

DETAILED DESCRIPTION OF DRAWINGS

The following detailed is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
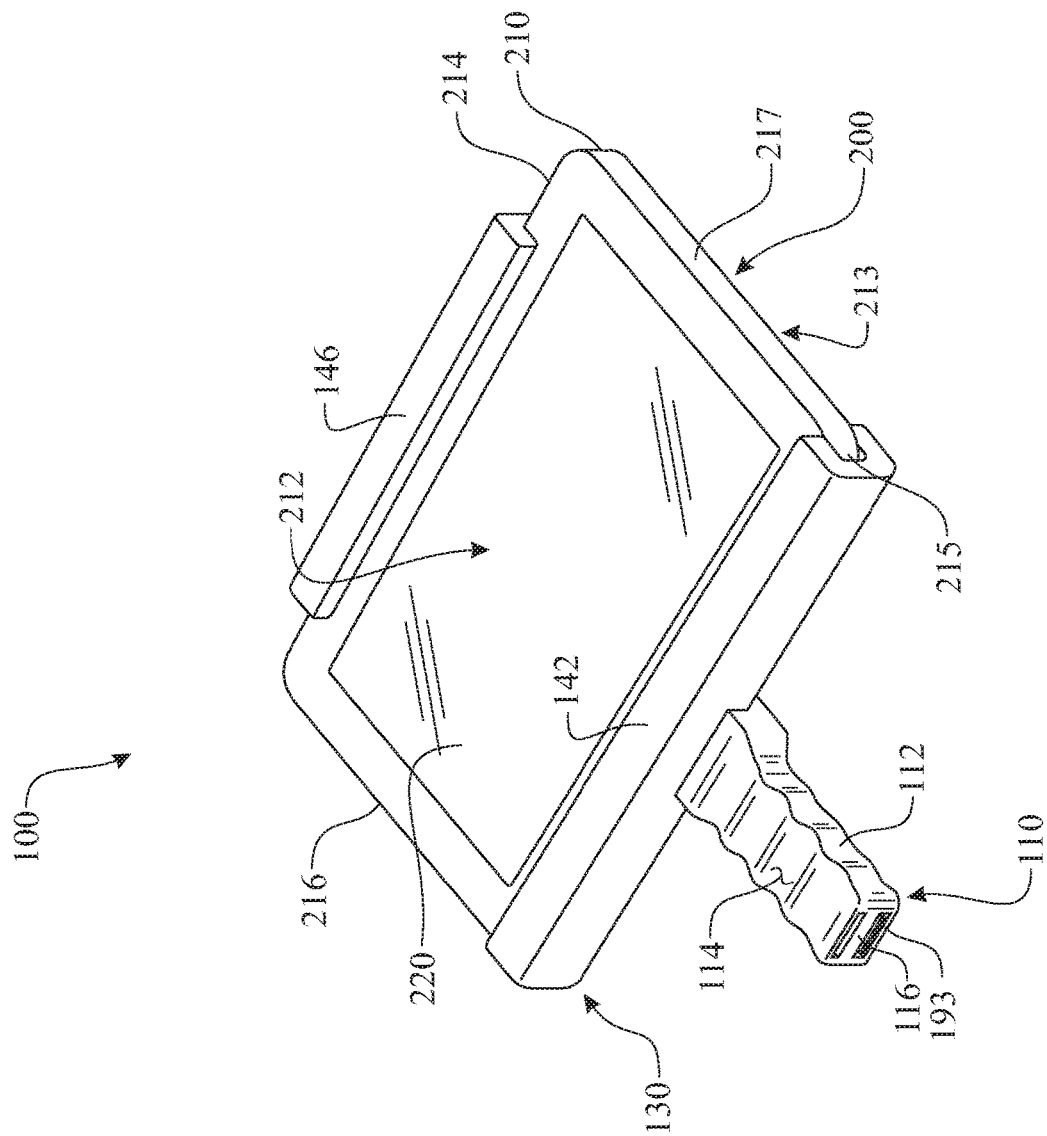
FIG. 1 presents an isometric view of a first exemplary portable computing tablet holster employed to retain a portable computing tablet.
Figure 2:
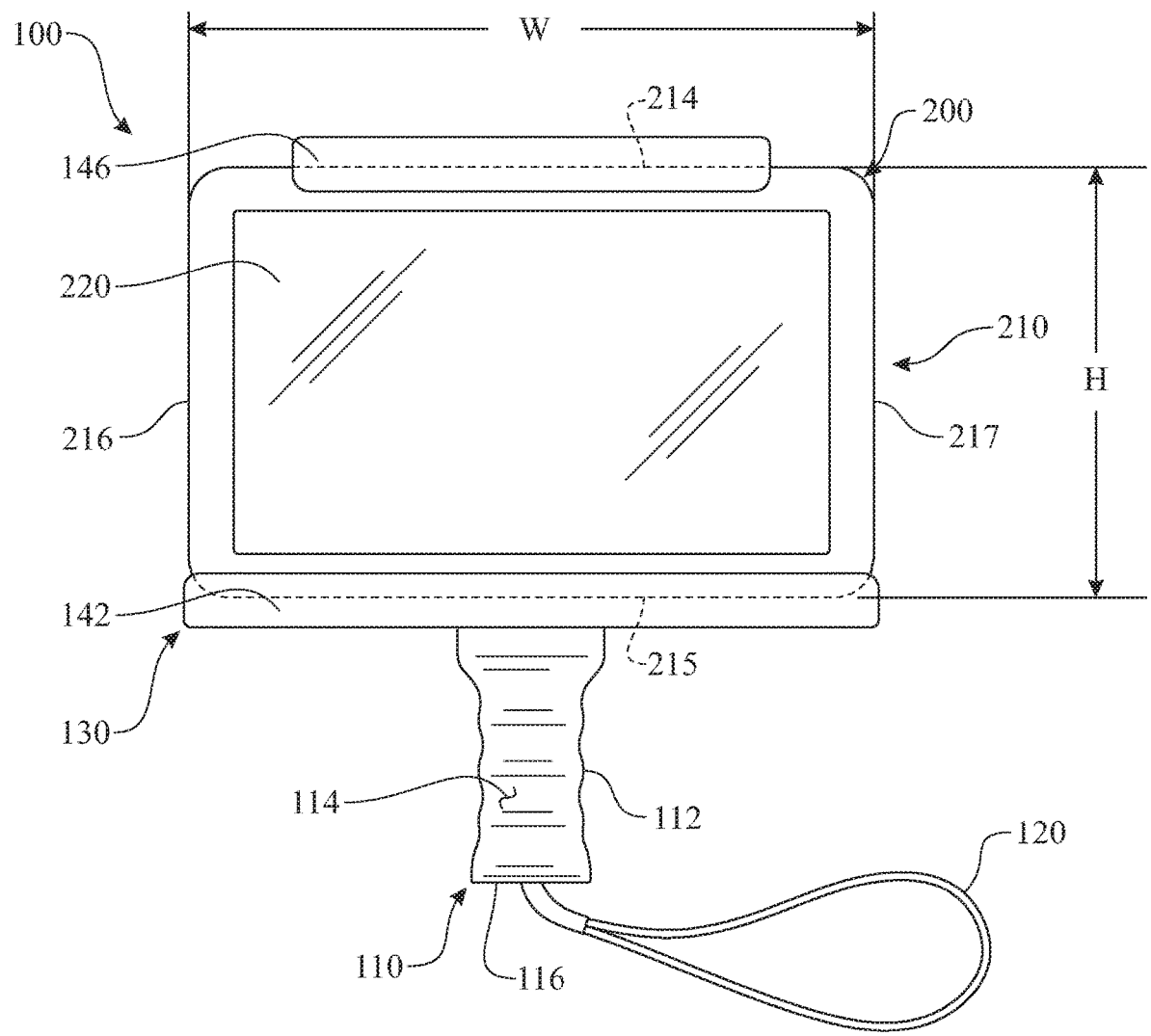
FIG. 2 presents a viewing side elevation view of the exemplary portable computing tablet holster originally introduced in FIG. 1 the portable computing tablet being inserted into and supported by the portable computing tablet holster.
Figure 3:
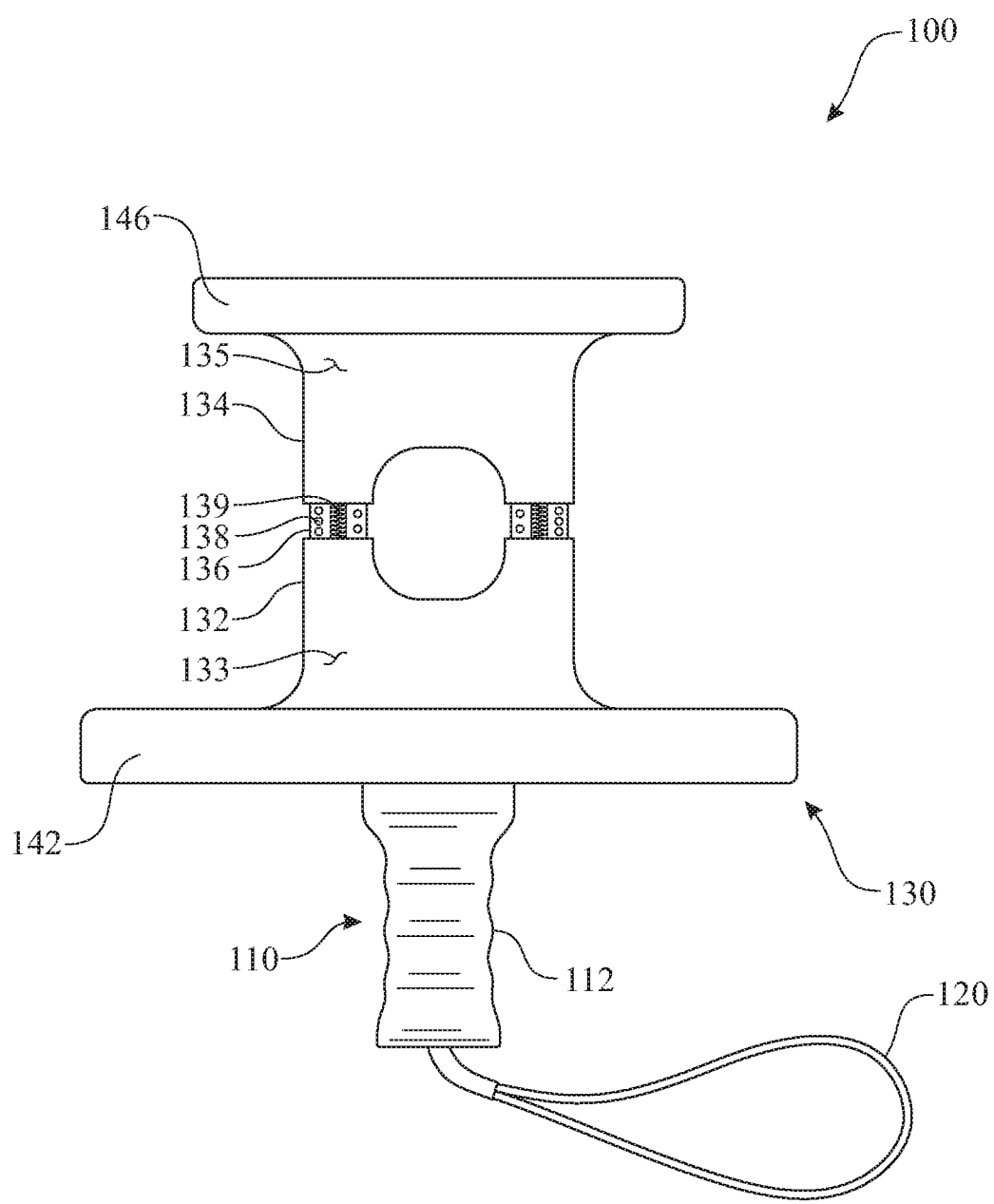
FIG. 3 presents a viewing side elevation view of the exemplary portable computing tablet holster originally introduced in FIG. 1, the illustration introducing a base tablet rear support panel and an expanding tablet rear support panel, the base tablet rear support panel and the expanding tablet rear support panel being shown in a fully extended configuration.
Figure 5:
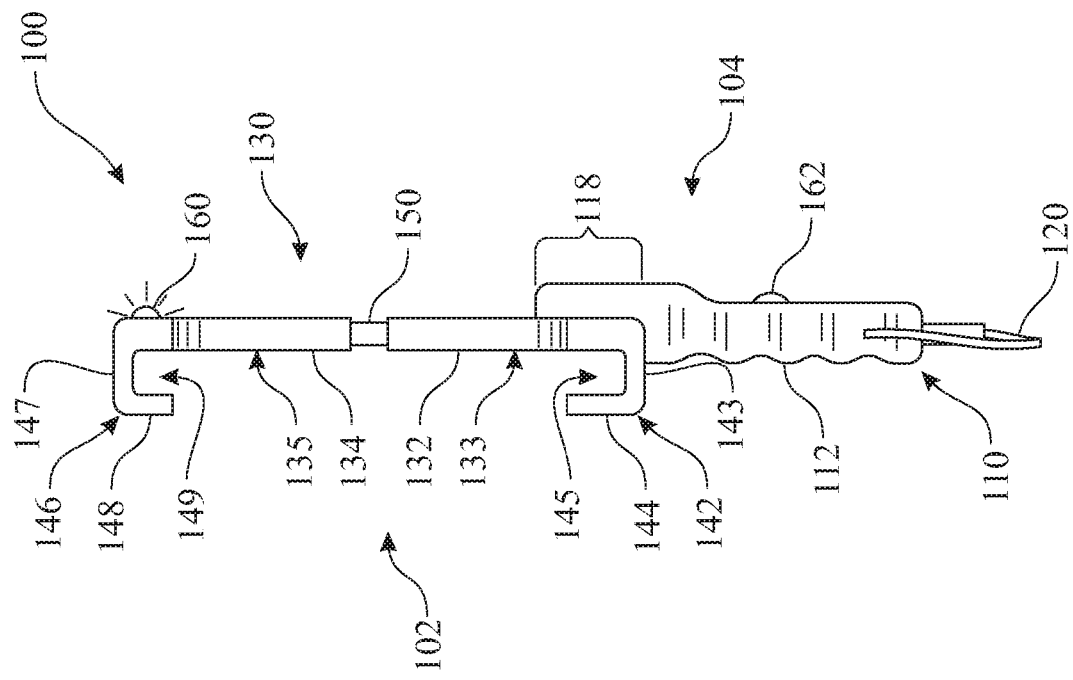
FIG. 5 presents a side elevation view of the exemplary portable computing tablet holster originally introduced in FIG. 1, the base tablet rear support panel and an expanding tablet rear support panel being shown in a fully extended configuration.
Figure 4:
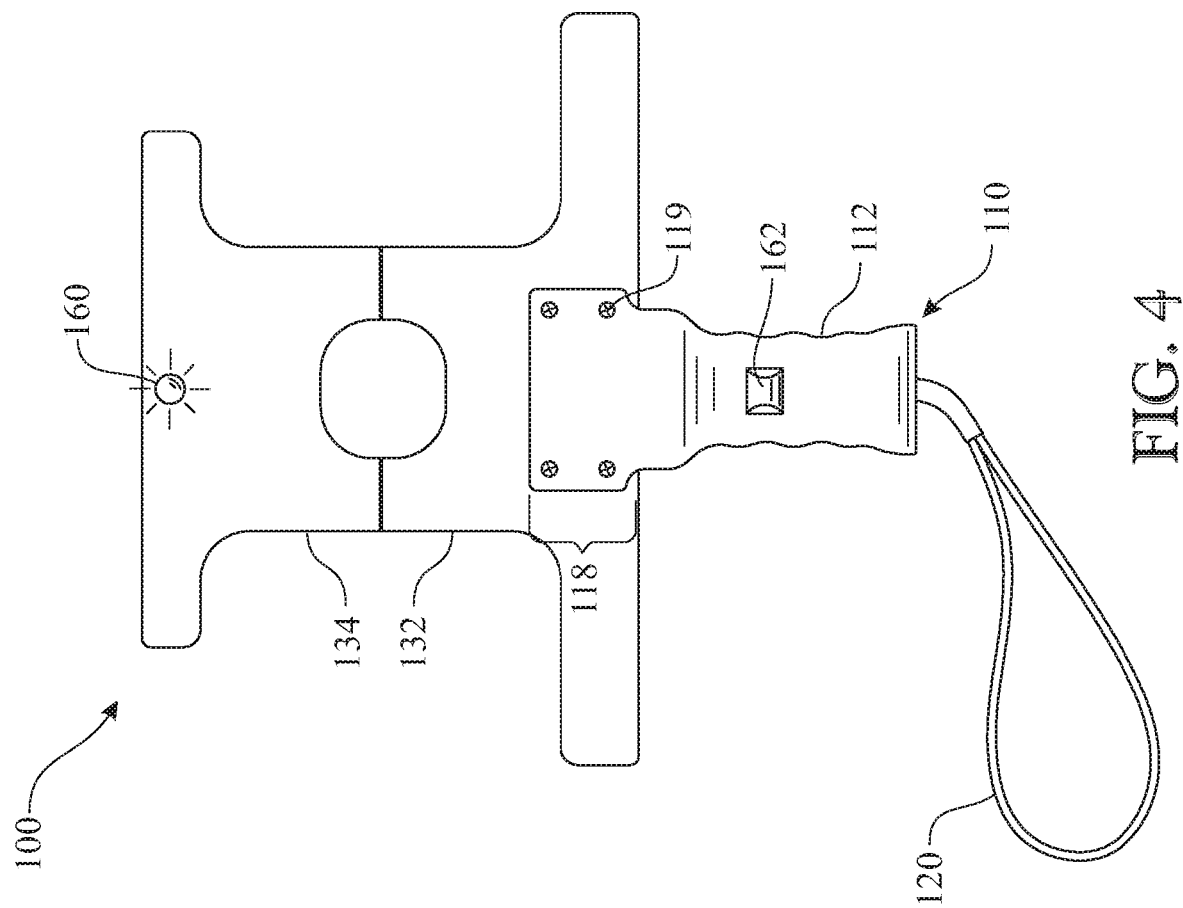
FIG. 4 presents an outward elevation view of the exemplary portable computing tablet holster originally introduced in FIG. 1, the base tablet rear support panel and an expanding tablet rear support panel being shown in a fully contracted configuration.

A portable computing tablet holster 100 is initially introduced in FIGS. 1 and 2, with details being presented in FIGS. 3 through 5. Orientation of the portable computing tablet holster 100, as identified in FIG. 5, is referred to by a respective function thereof, including a portable computing tablet holster viewing side 102 and a portable computing tablet holster opposite, non-viewing or recording side 104. The portable computing tablet holster 100 is adapted for use in supporting and manipulating a portable computing tablet 200 using a single hand of a user. The portable computing tablet holster 100 generally includes a handle assembly 110 assembled to a portable computing tablet retention assembly 130. The portable computing tablet retention assembly 130 includes a tablet rear support panel 132, 134. The tablet rear support panel 132, 134 can be provided as a single unit or separated into two sections (as shown), more specifically, comprising a base tablet rear support panel 132 and an expanding tablet rear support panel 134. The base tablet rear support panel 132 and the expanding tablet rear support panel 134 would be slideably assembled to one another using a sliding assembly mechanism. The sliding assembly mechanism can include any suitable mechanism enabling expansion (FIGS. 3 and 5) and contraction (FIG. 4) between the base tablet rear support panel 132 and the expanding tablet rear support panel 134. The exemplary illustration employs a rear panel expansion sliding element 136, a rear panel extension biasing element 139, and a rear panel extension detent feature 138 to provide the expansion and the contraction between the base tablet rear support panel 132 and the expanding tablet rear support panel 134.

The portable computing tablet 200 is retained within the portable computing tablet retention assembly 130 by a base elongated retention element 142, located along an elongated edge of a base tablet rear support panel 132 of the portable computing tablet retention assembly 130 proximate the handle assembly 110, and a distal elongated retention element 146, located along a free elongated edge of the expanding tablet rear support panel 134 of the portable computing tablet retention assembly 130. Details of the sections of each of the elongated retention elements 142, 146 are best identified in FIG. 5. Each of the elongated retention elements 142, 146 is shaped having an elongated retention element channel formation 145, 149, each elongated retention element channel formation 145, 149 comprising the respective section of the tablet rear support panel 132, 134, an elongated retention element channel base segment 143, 147 and an elongated retention element channel rail segment 144, 148. Each elongated retention element channel base segment 143, 147 extends generally perpendicularly from the respective section of the tablet rear support panel 132, 134 towards the viewing side of the portable computing tablet holster 100. Each elongated retention element channel rail segment 144, 148 extends generally perpendicularly from the respective elongated retention element channel base segment 143, 147 towards the center of the portable computing tablet holster 100. The resulting elongated retention element channel formations 145, 149 of the elongated retention elements 142, 146 are arranged facing one another. The portable computing tablet 200 is slideably inserted into the portable computing tablet retention assembly 130, sliding each elongated edge 214, 215 within the respective elongated retention element channel formation 145, 149. The rear, non-viewing surface 213 of the portable computing tablet 200 would slide against a rear support panel tablet contacting surface 133, 135 of the respective tablet rear support panel 132, 134. It is understood that a spacing element, such as a sheet of rubber, plastic, foam, and the like can be applied to the rear support panel tablet contacting surface 133, 135 or to the rear, non-viewing surface 213. The spacing element would compensate for dimensional differences between a thickness of the portable computing tablet 200 and a depth defined by the elongated retention element channel formations 145, 149.

The handle assembly 110 includes a handle attachment section 118 extending axially from an attachment end of a handle 112. The handle attachment section 118 is affixed to a non-viewing side of the base tablet rear support panel 132. A flexible wrist loop or lanyard 120 is attached to a distal, free, detached end 116 of the handle 112. The lanyard 120 can be fabricated of materials and include any of many features associated with commonly known lanyards. The handle 112 can be covered by a pliant material for comfort to a user and/or to enhance a grip of a user. The pliant material can be any suitable pliant material, including foam, rubber, soft plastic, nylon, neoprene, and the like. The portable computing tablet 200 is commonly used to operate applications, access the Internet, listen to music, recording music, communicate with others (audio chat, video chat, short message service (SMS), Multimedia Messaging Service (MMS), email, and the like), play games, view digital images, view videos, capture digital still images, capture video, and the like. The portable computing tablet 200 generally includes electronic circuitry, a portable power supply, a touch screen 220, a microphone, a speaker, at least one user input button at least one connector, and the like, wherein all of the components are contained within and/or supported by a portable computing tablet housing 210. Orientation of the portable computing tablet housing 210 can be referenced by functionality, more specifically, a front, viewing surface 212 and an opposite rear, non-viewing surface 213.

The portable computing tablet housing 210 has a peripheral edge defined by a pair of elongated edges 214, 215 and a pair of lateral edge 216, 217. The portable computing tablet holster 100 can be adapted to retain different sized portable computing tablets 200, more specifically, the portable computing tablet holster 100 is designed to retain portable computing tablets 200 of any reasonable width "W" and height "H", as identified in FIG. 2. The exemplary portable computing tablet holster 100 includes the expanding tablet rear support panel 134, which is slideably assembled to the base tablet rear support panel 132, as shown in FIGS. 3 through 5. The base elongated retention element 142 is carried by the base tablet rear support panel 132 and remains in a fixed positioned respective to the handle 112. The distal elongated retention element 146 is carried by the expanding tablet rear support panel 134. The slideable positioning of the expanding tablet rear support panel 134 respective to the base tablet rear support panel 132 enables adjustment the distance between the base elongated retention element 142 and the distal elongated retention element 146 to accommodate the height "H" of the portable computing tablet 200. It is noted that a span of the elongated retention element channel formations 145, 149 is sized to accommodate a thickness (not identified in the drawings, but understood by definition) of the portable computing tablet 200. It is noted that padding can be adhesively secured to a rear panel extension biasing element 139 of each of the tablet rear support panels 132, 134 to improve a fit of the portable computing tablet 200 within each of the elongated retention element channel formations 145, 149.

The expanding tablet rear support panel 134 is movably assembled to the base tablet rear support panel 132 to capture, secure, and retain the portable computing tablet 200 between the base elongated retention element 142 and the distal elongated retention element 146. At least one panel expansion sliding element 136 is affixed to each of the base tablet rear support panel 132 and the expanding tablet rear support panel 134. In one embodiment, the at least one panel expansion sliding element 136 can be assembled into a cavity formed within each of tablet rear support panels 132, 134. One end can be fixed in one of the tablet rear support panels 132, 134 and the second end can be slideably received in the other of the tablet rear support panels 132, 134. At least one rear panel extension biasing element 139 can be provided to support the expansion and contraction provided by the tablet rear support panels 132, 134. In a preferred solution, the at least one rear panel extension biasing element 139 would provide a contraction force between the base tablet rear support panel 132 and the expanding tablet rear support panel 134, ensuring pressure remains against the elongated edges 214, 215 of the portable computing tablet 200. The rear panel expansion sliding element 136 can include one or more rear panel extension detent features 138, such as protrusions and depressions, wherein the one or more rear panel extension detent features 138 are adapted to retain the base tablet rear support panel 132 and the expanding tablet rear support panel 134 at any of a number of predetermined spans. The one or more rear panel extension detent features 138 can provide discrete increments defining discrete spans between the base elongated retention element 142 and the distal elongated retention element 146.

The handle assembly 110 includes a handle attachment section 118, as shown in FIG. 4. The handle attachment section 118 extends from an attachment end of the handle 112 along an axis that is parallel to an elongated axis of the handle 112. The handle attachment section 118 is affixed to the base tablet rear support panel 132 by any suitable assembly method, including an adhesive, a bonding agent, mechanical fasteners, ultrasonic welding, heat staking, and the like. In the exemplary illustration, the attachment section 118 is assembled to the base tablet rear support panel 132 using a plurality of handle assembly fasteners 119, such as screws, rivets, compression pins, and the like. In an alternative design, the handle assembly 110 can be integrally fabricated with the base tablet rear support panel 132. The handle 112 is critical to the usefulness of the portable computing tablet holster 100, as the handle 112 allows the user to hold the portable computing tablet 200 using a single hand or increase the stability using a second hand.

The portable computing tablet holster 100 can additionally include a light emitting device 160 (FIGS. 4 and 5) to provide sufficient lighting for taking pictures with a camera 296 (FIG. 15) of the portable computing tablet 200. The light emitting device 160 illuminates the subject matter for the picture. The light emitting device 160 can be any suitable light emitting device, including an incandescent bulb, a light emitting diode, or other light emitting source. The light emitting device 160 is provided on a front surface 160 of the second retention member 114. An actuation switch 162 is located on a non-viewing side of the handle 112 and is electrically connected to the light emitting device 160 by way of any known electrical connective interface to actuate and deactivate the light emitting device 160. Locating the actuation switch 162 on the non-viewing side of the handle 112 enables the user to operate the actuation switch 162 using their finger. Alternatively, the actuation switch 162 can be located on the viewing side of the handle 122, enabling the user to operate the actuation switch 162 using their thumb.

A connector 193 can be integrated into the distal, free, detached end 116 of the handle 112. The connector 193 would be in signal and/or power communication with a controller circuit and/or a portable power supply integrated into the portable computing tablet holster 100. The exemplary connector 193 is a Universal Serial Bus (USB connector).

Although the illustrations present a solid tablet rear support panel 132, 134, it is understood that the tablet rear support panel 132, 134 can be perforated to reduce material costs and weight. The perforations can be of any desired shape, including circular, oval, hexagonal, octagonal, square, rectangular, triangular, star shaped, of a parallelogram, heart shaped, a freeform shape, a graphical illustration, and any other shape or image that the designer dreams up. The perforation can be similar in size and/or shape or varied in size and/or shape.

The various components can be fabricated of a molded plastic, casting, stamping, additive manufacturing (3-D printing) (stereolithography, metal sintering, and the like), a machined material (plastic, metal, wood, or any other suitable material), off the shelf components (springs 139, sliding mechanisms 136, screws 119, connectors 193, electronic components, light emitting devices 160, switches 162, straps for the lanyard 120, heat shrink tubing (for connecting two ends of the lanyard 120), ringlets (for attaching the lanyard 120 to the distal, free, detached end 116 of the handle 110, and the like), and any other manufacturing and/or assembly processes and associated materials. The various components would be assembled according to common assembly practices.

The handle of the portable computing tablet holster 100 is rigidly affixed to the base tablet rear support panel 132. The handle assembly 110 can be replaced with a pivotal handle assembly 310 pivotally assembled to a retention assembly 330 of a portable computing tablet holster 300, as illustrated in FIGS. 6A through 6C. The portable computing tablet holster 300 and the portable computing tablet holster 100 have a number of like features. Like features of the portable computing tablet holster 300 and the portable computing tablet holster 100 are numbered the same except preceded by the numeral '3'.

In the portable computing tablet holster 300, the handle assembly 110 is pivotally assembled to a non-viewing side of the base tablet rear support panel 132 using a pivoting assembly. In the exemplary illustration, a pivot axle 370 extends through a pivot axle bore 372 on a handle attachment section 318 of a handle assembly 310 and is affixed to a base tablet rear support panel 332. The pivoting assembly enables at least one of a clockwise and a counterclockwise rotation of the handle assembly 110 relative to the base tablet rear support panel 332 to aid in positioning the portable computing tablet 200 (not shown) or to place the portable computing tablet holster 300 into a storage configuration, as shown in FIG. 6C. The pivoting assembly can include a clutch or similar feature (not shown) to adjust a resistance to the rotational motion. The clutch or similar feature would dictate the torsional force required to rotate the handle assembly 310 respective to the retention assembly 330. The pivoting assembly can include a unidirectional feature, which would limit the rotation of the handle assembly 310 respective to the retention assembly 330 to one of the clockwise or the counterclockwise direction of rotation.

Figure 7A:
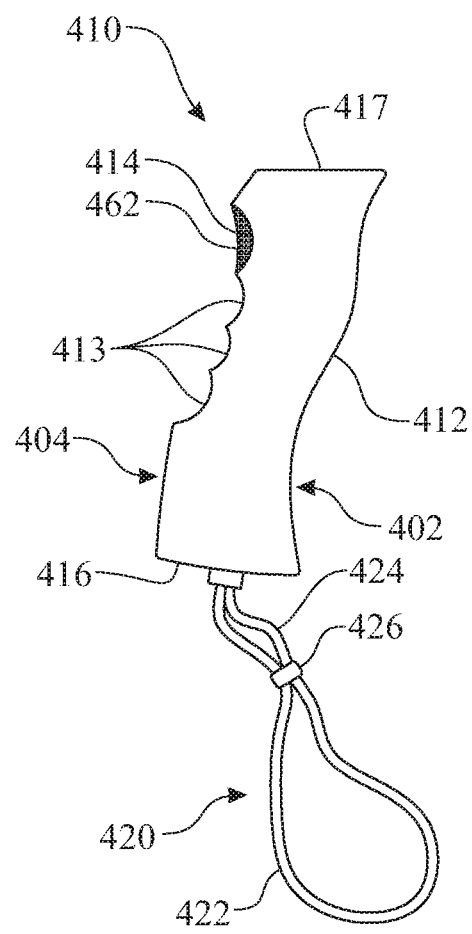
FIG. 7A presents a side elevation view of an exemplary ergonomic handle for use with any suitable variant of the disclosed portable computing tablet holsters.
Figure 7B:
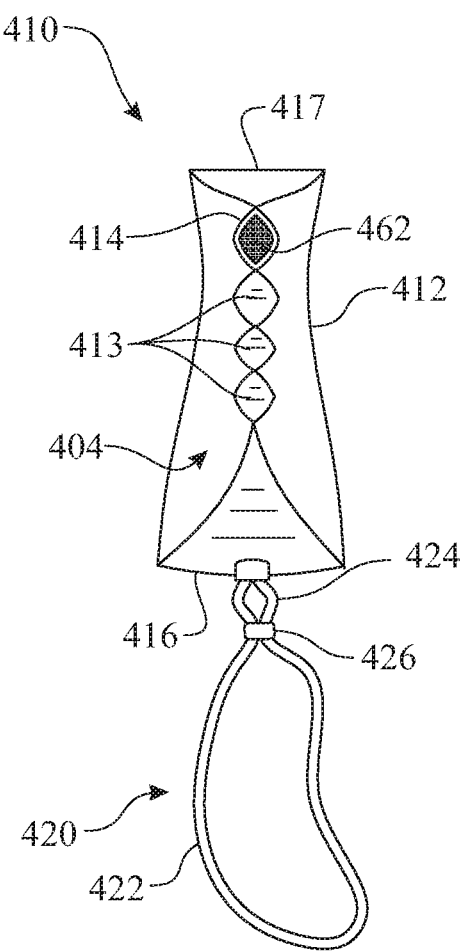
FIG. 7B presents a viewing side elevation view of the ergonomic handle originally introduced in FIG. 7A.

As shown in the various illustrations throughout this application, the handle can be of any suitable size and shape. A handle assembly 410 can include a handle 412 having ergonomic features, such as a curved gripping surface on a viewing handle side 402 and a series of handle finger receiving formations 413 formed on an opposite non-viewing handle side 404, as shown in FIGS. 7A and 7B. The handle assembly 410 can include a lanyard 420. The lanyard 420 is attached to a distal, free, detached end 416 of the handle 412. The lanyard 420 can provide multiple functions, including retention of the portable computing tablet holster when the portable computing tablet holster accidentally slips from the user's grip, stabilizing the handle 412 relative to a wrist of a user, and the like. The functionality of the lanyard 420 can be enhanced by including a lanyard sizing loop slide bead 426. The lanyard sizing loop slide bead 426 segment the lanyard 420 into a proximal lanyard loop 424 and a distal lanyard loop 422. The user would place the distal lanyard loop 422 over their wrist. The user would then slide the lanyard sizing loop slide bead 426, reducing the size of the distal lanyard loop 422, tightening or cinching the distal lanyard loop 422, thus securing the lanyard 420 to the user. The ergonomic handle 412 allows the user to hold the portable computing tablet holster 100 with greater stability than the handle 112. The increased stability is provided by the shape of the handle 412. The handle 412 of the handle assembly 410 is designed to include a side profile having a pistol grip shape, as shown in FIG. 7A and a front profile having an hour glass shape, as shown in FIG. 7B.

A plurality of handle finger receiving formations 413 are formed or molded into a non-viewing handle surface 404 of the handle 412 to further aid in gripping the handle. As disclosed above, the light emitting device is incorporated in the portable computing tablet holster. The light emitting device provides light during a condition that lacks sufficient light for capturing video by the portable computing tablet 200. The handle 412 can include an actuation switch 462 to operate the light emitting device 160. The actuation switch 462 could be included within a proximal handle finger receiving formation 414. A handle attachment section, such as any handle attachment section presented herein 118, can be integrated into the handle assembly 410, wherein the handle attachment section preferably extends upward from a proximal handle end 417 of the handle 412. The handle attachment section is provided for attachment of the handle 412 to the base tablet rear support panel 132 by any suitable attachment configuration, such as handle assembly fasteners 119, a pivot axle 370, or any other handle assembly configuration taught herein or other configurations known by those skilled in the art.

An alternative embodiment of a portable computing tablet holster 500 for use in supporting and manipulating the portable computing tablet 200 using a single hand of a user is illustrated in FIGS. 8 through 14. The portable computing tablet holster 500 is an enhanced variant of the portable computing tablet holster 100. Like features of the portable computing tablet holster 500 and the portable computing tablet holster 100 are numbered the same, except preceded by the numeral '5'.

A first distinction of the portable computing tablet holster 500 is an inclusion of a lateral retention channel. The lateral retention channel includes the same elements 143, 144; 147, 148 as the elongated retention base segments 142, 146 to define the elongated retention element channel formations 145, 149, respectively. The exemplary lateral retention channel is segmented into a lateral retention base segment 552, a lateral retention central segment 554 and a lateral retention distal segment 556. The lateral retention base segment 552 is preferably continuous with the base elongated retention element 542. Similarly, the lateral retention distal segment 556 is preferably continuous with the distal elongated retention element 546. The lateral retention central segment 554 is provided to support a connector 593. The connector 593 can be employed to simply provide mechanical coupling between the portable computing tablet 200 and the portable computing tablet retention assembly 530 or the connector 593 can be in electrical and/or signal communication with electrical and/or power components located in the handle 512. Connectivity therebetween would be provided in accordance with any electrical and/or signal connectivity configuration known by those skilled in the art. The connectivity configuration would support the rotational motion and/or the pivotal motion, where applicable.

A second distinction of the portable computing tablet holster 500 is the inclusion of an articulating assembly 580. The articulating assembly 580 enables at least one of a rotational motion between a handle assembly 510 and a portable computing tablet retention assembly 530 and a pivotal motion between the handle assembly 510 and the portable computing tablet retention assembly 530. The rotational motion between a handle assembly 510 and a portable computing tablet retention assembly 530 rotates about an axis that is perpendicular to a viewing surface of the portable computing tablet 200. The pivotal motion between a handle assembly 510 and a portable computing tablet retention assembly 530 pivots about an axis that is perpendicular to a longitudinal axis of the handle 512. The articulating motion enables the user to optimize the orientation of the portable computing tablet 200 for viewing the touch screen 220, taking photographs, capturing video, or any other use. The articulating motion additionally allows for positioning of the camera 296 of the portable computing tablet 200.

Figure 9:
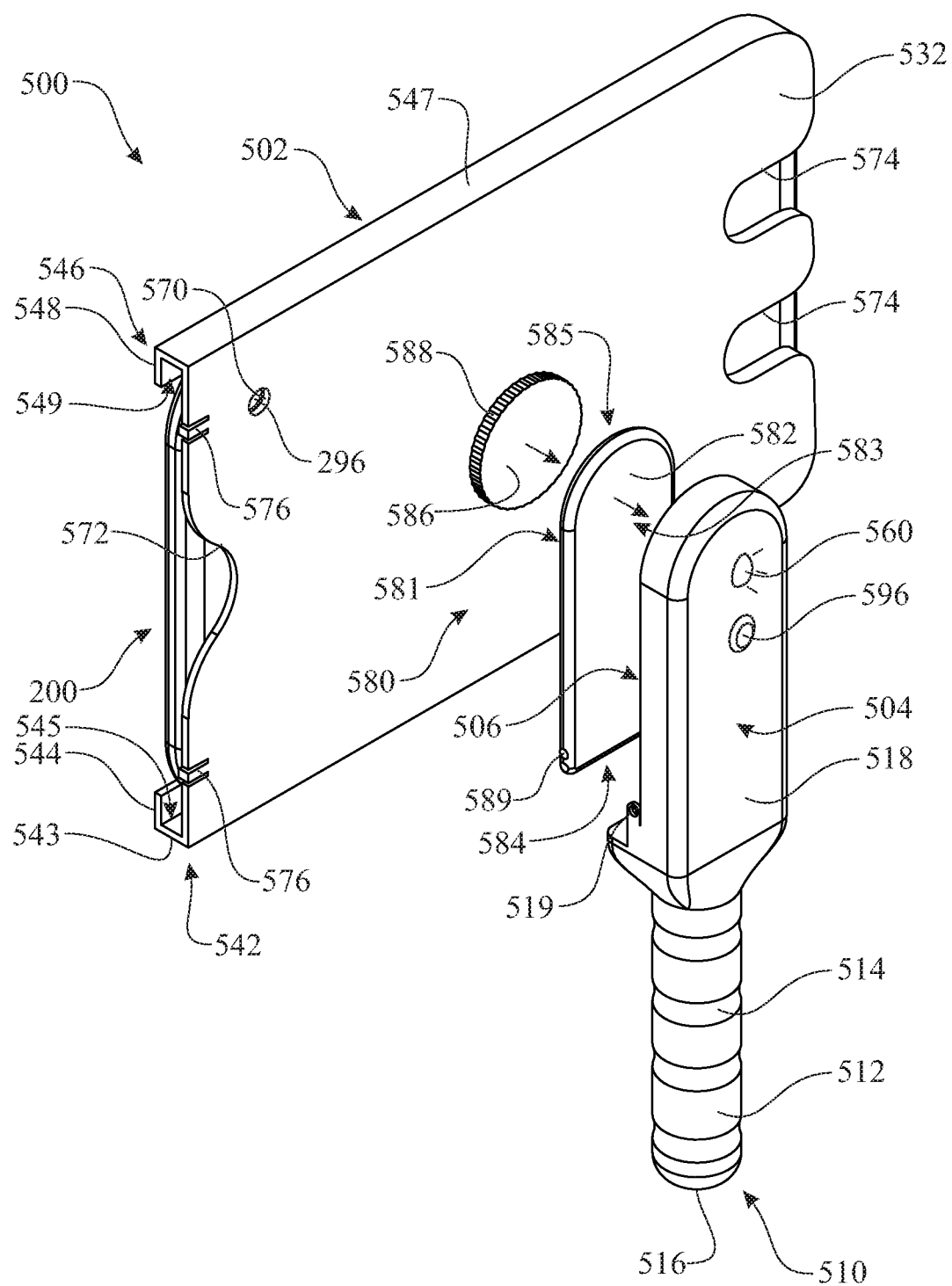
FIG. 9 presents an exploded isometric non-viewing side view of the portable computing tablet holster originally introduced in FIG. 8, the illustration introducing components of a ratcheting system.
Figure 10:
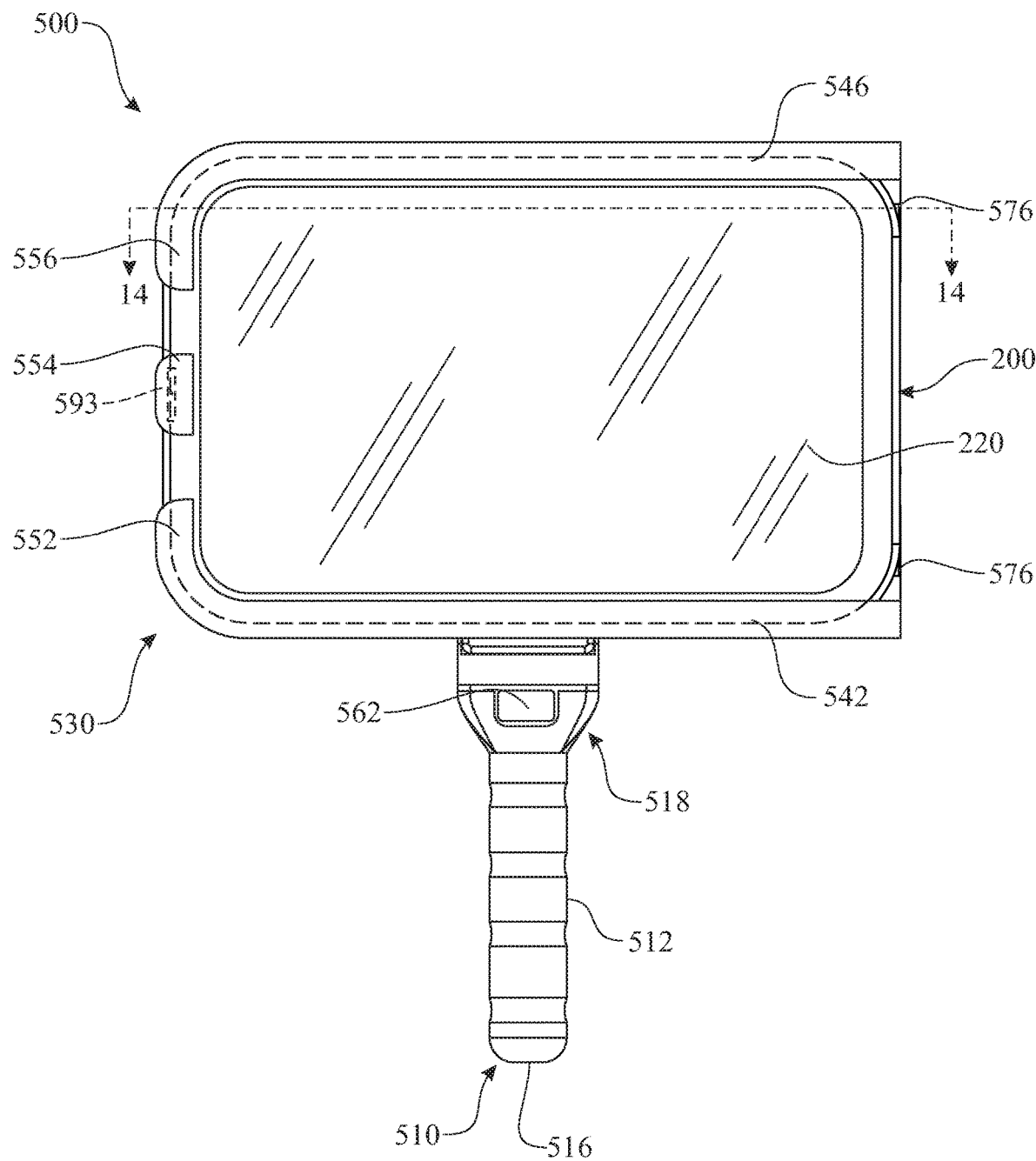
FIG. 10 presents a viewing side elevation view of the portable computing tablet holster originally introduced in FIG. 8.

The articulating assembly 580 includes a series of components enabling the rotational motion and the pivotal motion, as best shown in the exploded assembly view illustrated in FIG. 9. The rotational motion, as demonstrated in FIGS. 9 and 10, can be provided by an inclusion of any rotational element. In the exemplary illustration, the rotational element is a ratchet rotation disk 586. A series of rotation disk ratchet teeth 588 are formed about a peripheral edge of the ratchet rotation disk 586. The ratcheting function provided by the rotation disk ratchet teeth 588 controls the rotational motion of the handle assembly 510 and the portable computing tablet retention assembly 530 relative to one another. The rotation disk ratchet teeth 588 engage with a mating feature provided on or formed within a cavity of a hinged support arm 582 or alternatively provided on the portable computing tablet retention assembly 530, or in a configuration excluding a pivotal capability, on the 518. The hinged support arm 582 is assembled abutting a handle attachment interior surface 506 of the handle attachment section 518 of the handle assembly 510.

Figure 11:
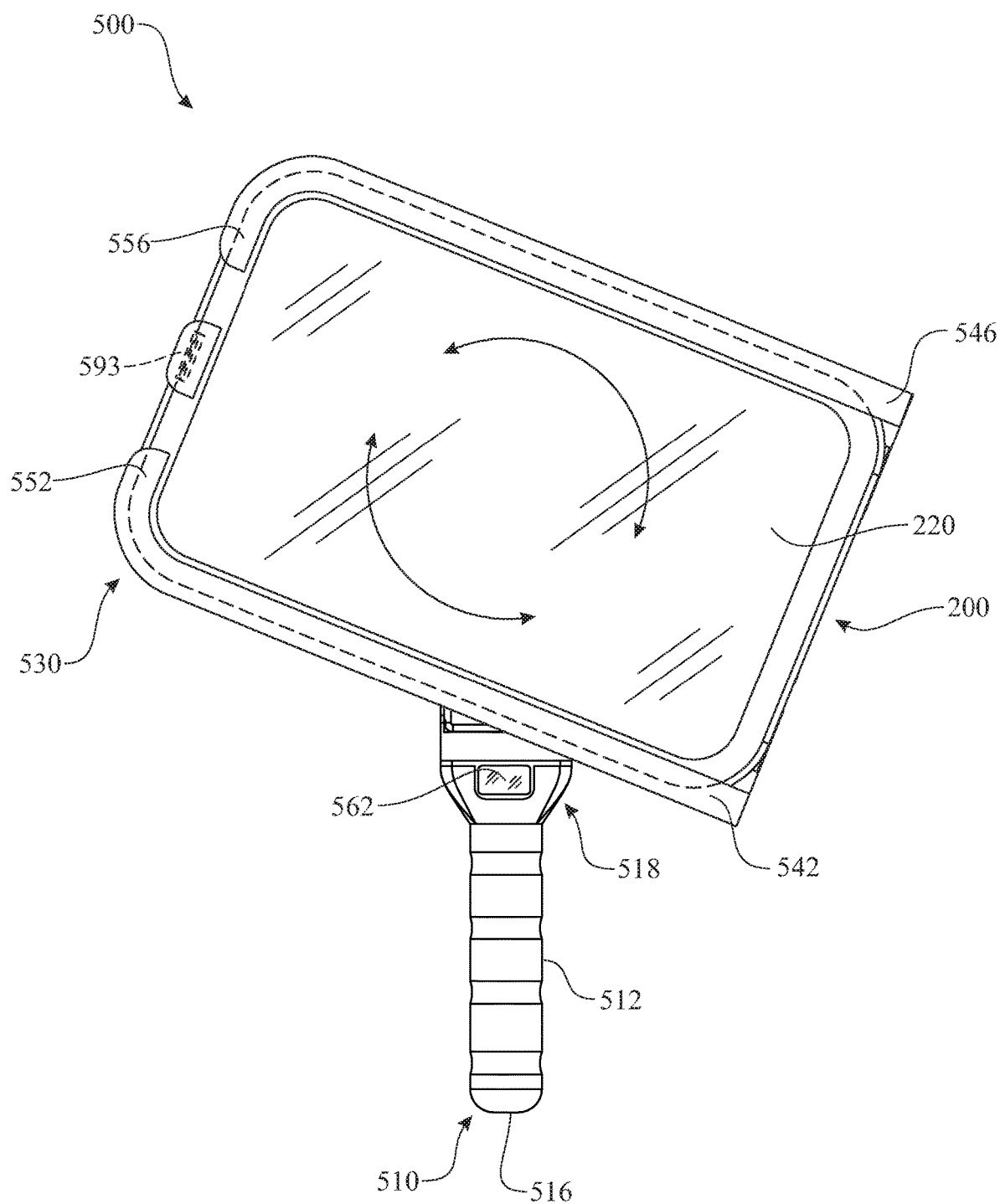
FIG. 11 presents a viewing side elevation view of the portable computing tablet holster originally introduced in FIG. 8, the illustration introducing a rotation of a portable computing tablet retention assembly relative to an ergonomic handle assembly.
Figure 12:
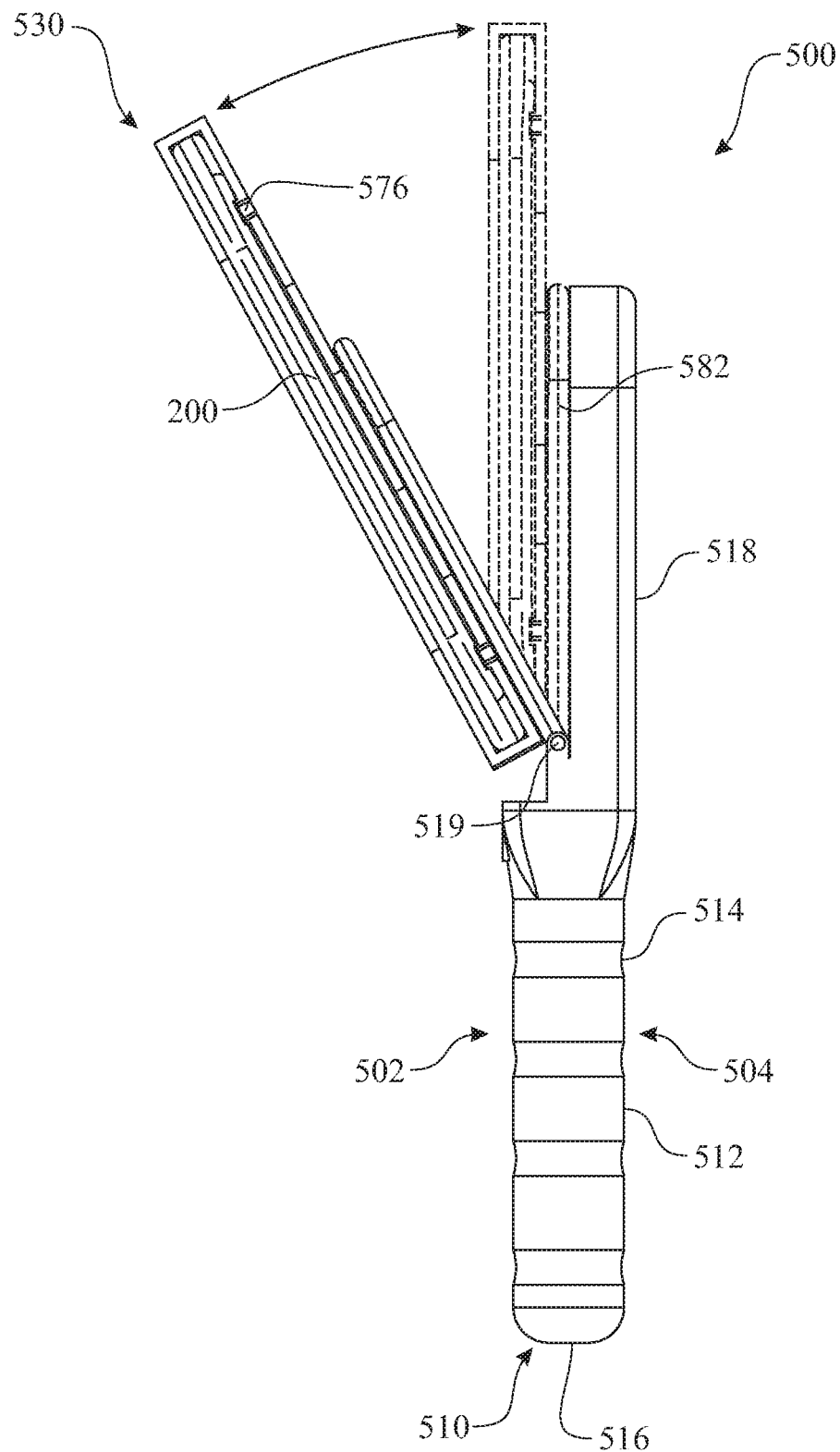
FIG. 12 presents a side elevation view of the portable computing tablet holster originally introduced in FIG. 8, the illustration introducing a pivotal motion of the computing tablet retention assembly relative to the handle assembly.

The pivotal motion is provided by a pivotal assembly between the hinged support arm 582 and the handle assembly 510 (as shown) or between the portable computing tablet retention assembly 530 and the handle assembly 510 using a similar pivotal assembly configuration as illustrated in FIG. 11. Orientation of the hinged support arm 582 can be referenced by a hinged support arm holster pivot surface 581, a hinged support arm holster hinged assembly surface 583, a hinged support arm assembly edge 584, and a hinged support arm distal free edge 585. The hinged support arm 582 is hingeably or pivotally assembled to the handle attachment section 518 of the handle assembly 510 using any suitable pivot assembly configuration. In the exemplary illustration, a pin (not shown, but understood by description) is inserted through a pair of hinge tab bores 519 formed through tabs of the handle attachment section 518 and a like hinge bore 589 formed through the hinged support arm 582. Alternatively, the tabs can be formed on the hinged support arm 582 and a single bore can be formed through the handle attachment section 518. The pivot assembly configuration may take various forms, including a pinned hinge, a piano hinge, a living hinge integrally molded into the support member 330 and the support plate 344, individual discrete hinges, and the like.

Figure 8:
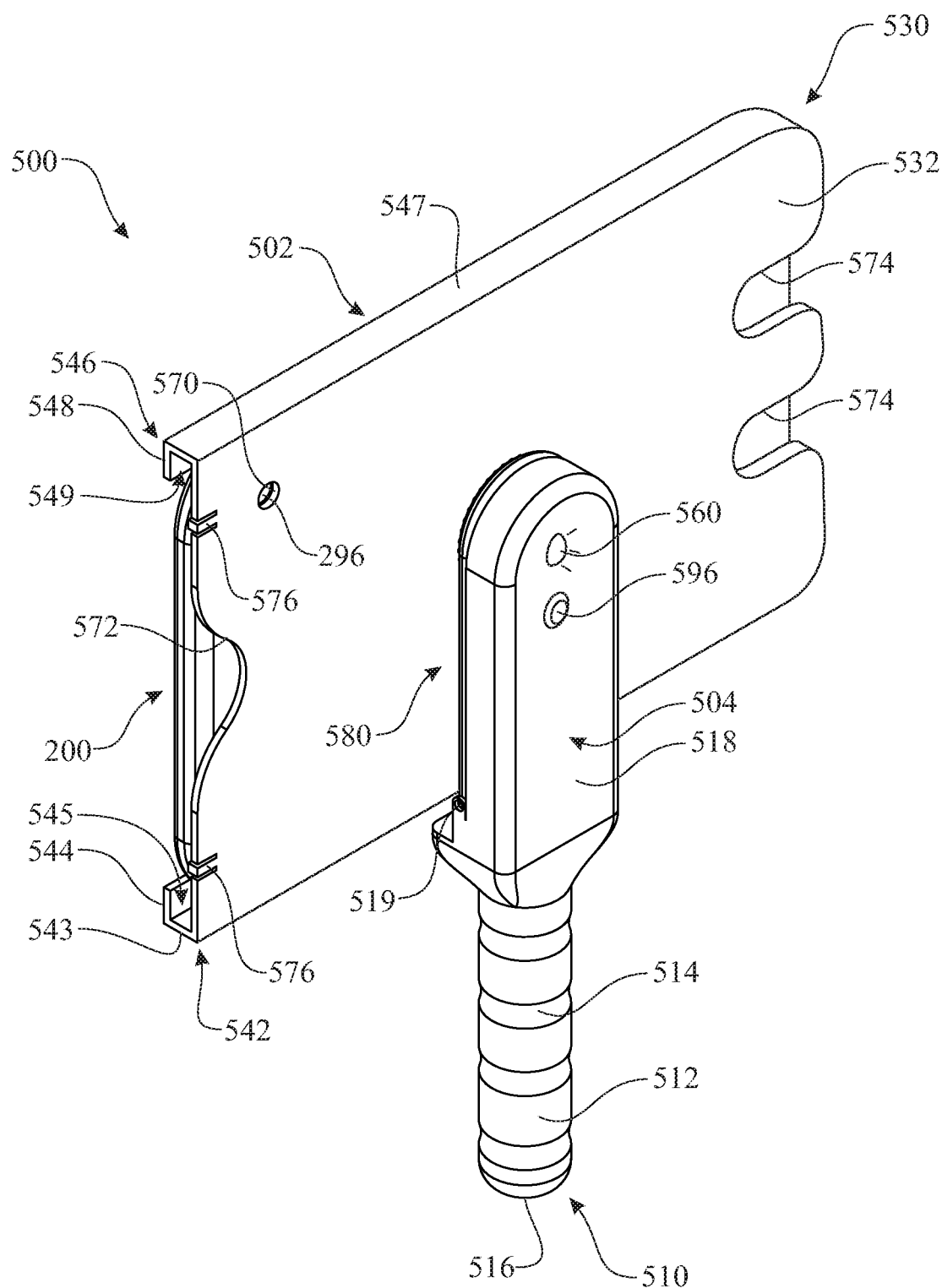
FIG. 8 presents an isometric non-viewing side view of another exemplary alternate embodiment of a portable computing tablet holster, the illustration showing a portable computing tablet inserted into a portable computing tablet retention assembly of the portable computing tablet holster.

The portable computing tablet retention assembly 130, more specifically the tablet rear support panel 132, 134, of the portable computing tablet holster 100 is shaped providing clearance for the camera 296 of the portable computing tablet 200. In the exemplary portable computing tablet holster 500, a camera viewing aperture 570 is formed through the base tablet rear support panel 532 of the portable computing tablet retention assembly 530 to accommodate the camera 296 of the portable computing tablet 200, as shown in FIGS. 8 and 9.

Figure 13:
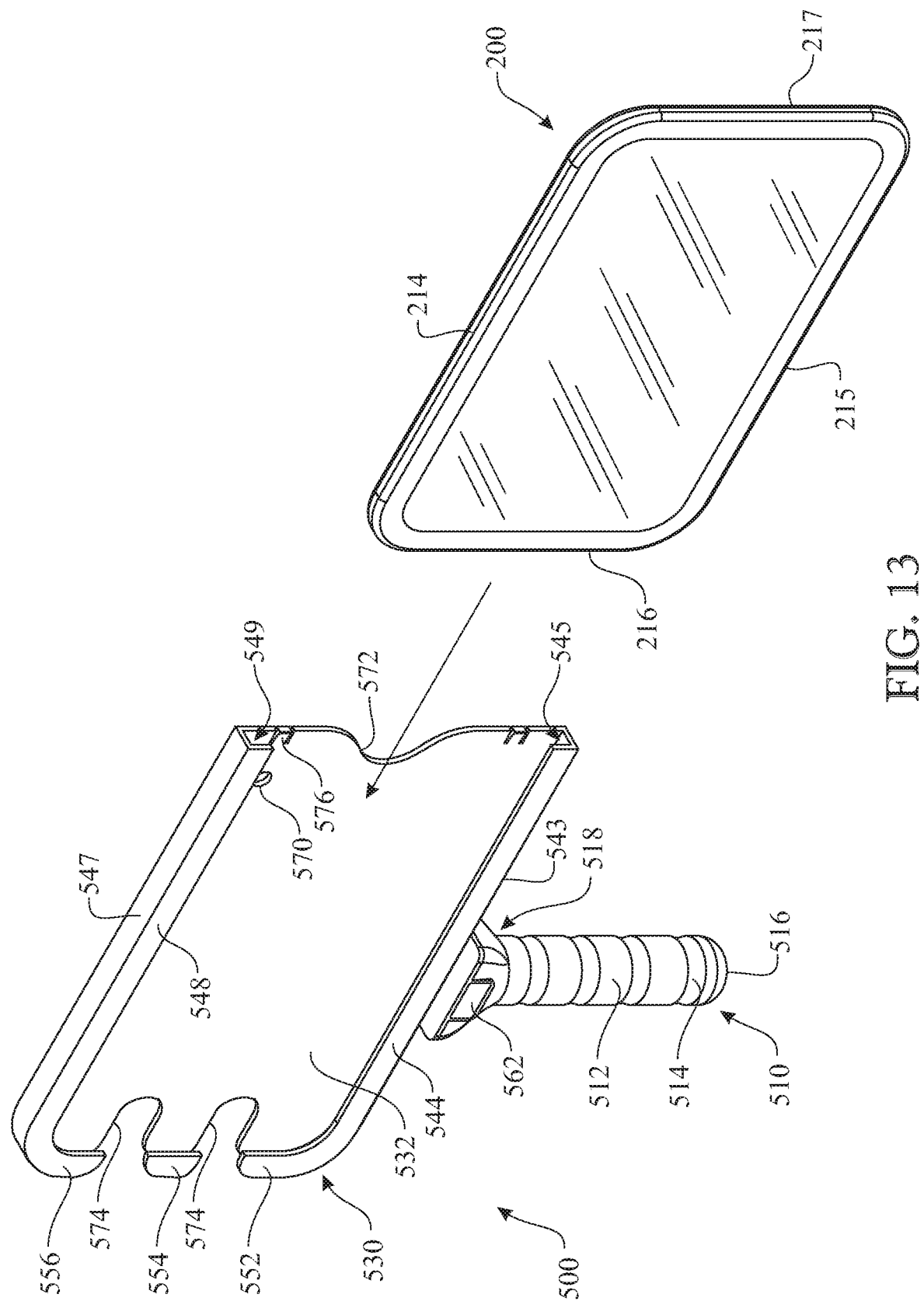
FIG. 13 presents an isometric assembly view of the portable computing tablet holster originally introduced in FIG. 8 and portable computing tablet, the illustration introducing a process of inserting the portable computing tablet into the portable computing tablet retention assembly of the portable computing tablet holster.

The portable computing tablet retention assembly 130, more specifically the tablet rear support panel 132, 134, of the portable computing tablet holster 100 is shaped providing clearance for the user's fingers for both insertion of the portable computing tablet 200 into the portable computing tablet retention assembly 130 and removal of the portable computing tablet 200 from the portable computing tablet retention assembly 130. A portable computing tablet holster open end slot 572 is formed along a lateral edge at an insertion side of the base tablet rear support panel 532. The portable computing tablet holster open end slot 572 enables the user to apply an insertion force to the portable computing tablet 200 throughout the insertion process, particularly during the last short distance wherein the respective lateral edge of the portable computing tablet 200 is positioned beyond the open lateral edge of the base tablet rear support panel 532. The portable computing tablet holster open end slot 572 enables the user to insert the portable computing tablet 200 into the portable computing tablet retention assembly 530, as shown in FIG. 13, wherein the respective lateral edge passes across a flexible cantilevered retention element nib 577 of a flexible cantilevered retention element 576, as shown in FIG. 15, enabling the flexible cantilevered retention element 576 to return to an un-deformed position, thus positioning the flexible cantilevered retention element nib 577 into a retention configuration, as shown in FIG. 14. It is noted that the base tablet rear support panel 532 can flex slightly to allow the portable computing tablet 200 to be released from each flexible cantilevered retention element nib 577 of each respective flexible cantilevered retention element 576.

It is understood that the configuration of the retention tabs 576 is only exemplary and that any configuration that can be depressed to enable the portable computing tablet 200 to pass across the pliant retention feature can be employed. Other pliant retention features can include a biasing spring, a spring biased bearing or ball catch, a cantilevered spring, a spring loaded catch, and the like. In addition to the retention feature, or as an alternate, less desirable configuration, the retention element channel formations (similar to the 145, 149) can be designed to provide a friction fit with the portable computing tablet housing 210 to aid in retaining the portable computing tablet 200 within the portable computing tablet retention assembly 530.

Once the portable computing tablet 200 is properly seated within the portable computing tablet retention assembly 530, it might be difficult to remove the portable computing tablet 200 from the portable computing tablet retention assembly 530. At least one portable computing tablet holster tablet securing end slots 574 can be formed through the base tablet rear support panel 532, extending inward from a lateral retaining edge including the connector 593, as shown in FIGS. 8 and 9. The lateral retention segment is sectioned to accommodate each of the at least one portable computing tablet holster tablet securing end slot 574. In the exemplary illustration, the portable computing tablet holster 500 includes a pair of portable computing tablet holster tablet securing end slots 574, the pair of portable computing tablet holster tablet securing end slots 574 sections the lateral retaining edge into the lateral retention base segment 552, lateral retention central segment 554, and lateral retention distal segment 556. The lateral retention central segment 554 is included to support the connector 593, located specifically to mate with a connector 293 of the portable computing tablet 200. The inclusion of the portable computing tablet holster tablet securing end slot 574 provide the user with an access for applying a removal force to the portable computing tablet 200 to overcome the retention configuration provided by the flexible cantilevered retention element nib 577 and the respective flexible cantilevered retention element 576. It is understood that the portable computing tablet holster open end slot 572 and the portable computing tablet holster tablet securing end slot 574 can be of any suitable quantity and shape.

Each of the lateral support segments 552, 554, 556 would include like features forming a channel, the features being exemplified by the lateral retention distal segment 556, as illustrated in FIGS. 14 and 15. The lateral retention distal segment 556 is formed by a lateral retention element channel base segment 557 extending generally perpendicularly from a lateral edge of the base tablet rear support panel 532. A lateral retention element channel base segment 558 extends inward (towards a central region of the base tablet rear support panel 532) from a distal edge of the lateral retention element channel base segment 557. Collectively, the associated section of the base tablet rear support panel 532, the lateral retention element channel base segment 557, and the lateral retention element channel base segment 558 form a lateral retention element channel formation 559.

The handle assembly 510 generally includes a lower grip portion or handle 512 and a handle attachment section 518 extending from an assembly end of the handle 512. The handle 512 can include ribs or grooves 514 to facilitate grasping by a user.

In the exemplary embodiment, the portable computing tablet holster 500 additionally includes an independent camera 596 for capturing video images simultaneously with video images captured by the camera 296 of the portable computing tablet 200. A camera lens 597 of the camera 596 is provided on a non-viewing or recording side of the support member 518 and is spaced apart from the camera viewing aperture 570 in the portable computing tablet retention assembly 530 a predetermined distance to provide the desired separation between cameras 296, 596. The light emitting device 160 (FIG. 4) described above is located on the non-viewing or recording surface of the expanding tablet rear support panel 134. In the exemplary portable computing tablet holster 500, a light emitting device 560 is provided on a non-viewing or recording side of the support member 518. The articulating motion between the portable computing tablet retention assembly 530 and the handle assembly 510 additionally enables the user to orient the camera 296 of the portable computing tablet 200 and the integral camera 596 of the portable computing tablet holster 500 to simultaneous capture images from two different directions. Another important advantage of the pivoting motion and the rotating motion provided by the articulating assembly is that such rotation motion and/or pivoting motion enables differing angles between the camera 296 of the portable computing tablet 200 and the integral camera 596 provided on the handle assembly 510 of the portable computing tablet holster 500. This separation and flexibility introduces a capability to the user enabling more creativity when capturing still and/or video images. Importantly, this also allows for flexibility of the viewing angles of the cameras 269, 569 with respect to one another. In addition, the introduction of the camera 569 onto the handle 512 enables the user to capture still and/or video images in one direction, while the display of the portable computing tablet 200 can be oriented at a different angle. This enables ease of viewing of the display upon the portable computing tablet 200, while enabling recording of stills and/or video from a different angle. Another advantage of the two cameras 269, 569 is an introduction of recording three-dimensional still and/or video images.

A touch screen controller input device 562 is located at a location preferably accessible by a user's thumb on the viewing side of the handle assembly 510. The touch screen controller input device 562 is provided to receive user inputs, which are conveyed to the portable computing tablet 200 through a wired connection or a wireless communication link. The touch screen controller input device 562 is preferably located at a position just above the assembly end of the handle 512 to allow operation of the touch screen controller input device 562 by a thumb of the user's gripping hand or finger of the user's free hand.

Although the portable computing tablet holster 500 is shown having three lateral retention segments 552, 554, 556, it is understood that the lateral retention channel can be a single, continuous element, similar to the base elongated retention element 542 and the tablet holster frame first retention channel 544. As illustrated, the lateral retention base segment 552 is continuous with the base elongated retention element 542. Similarly, the lateral retention distal segment 556 is continuous with the distal elongated retention element 546. In one variant, the lateral retention channel can be continuous with each of the base elongated retention element 542 and the distal elongated retention element 546, creating one single retention channel routing along each of the pair of elongated edges of the portable computing tablet retention assembly 530 and the retaining lateral edge of the portable computing tablet retention assembly 530.

Figure 16:
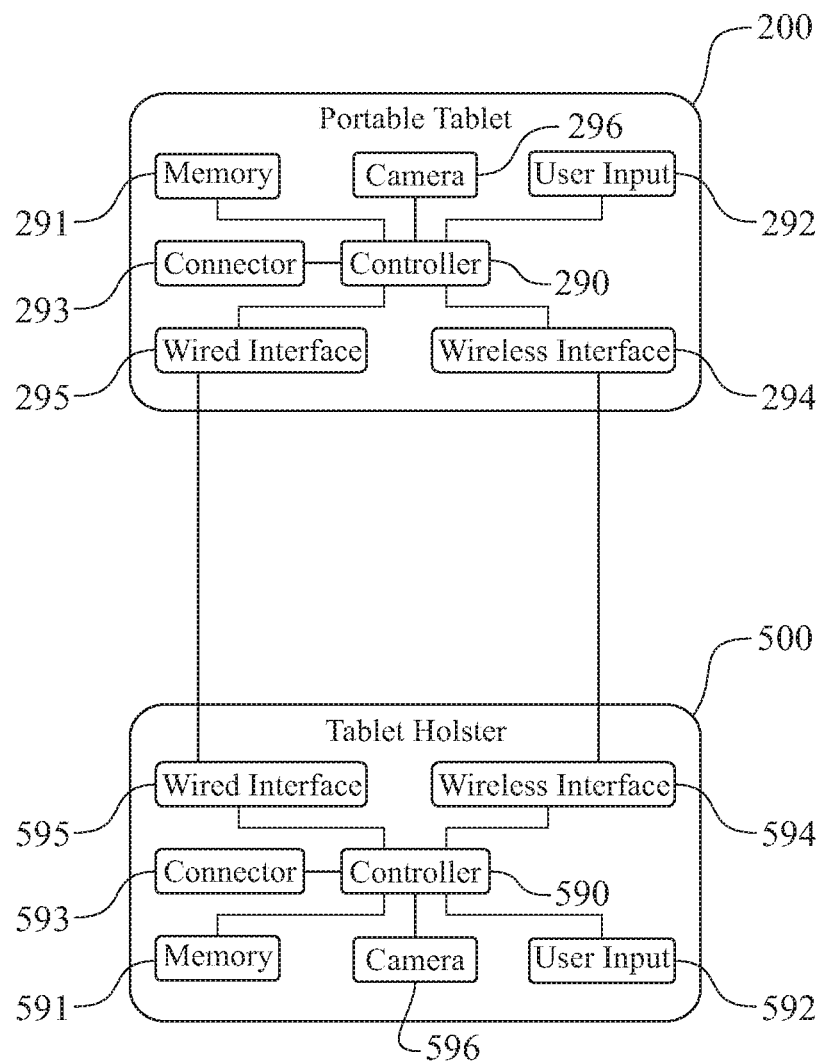
FIG. 16 presents an exemplary schematic diagram introducing functional components of the portable computing tablet holster and functional components portable computing tablet of FIG. 8, the illustration additionally introducing interactions between the functional components of each assembly as well as interactions between the assemblies.
Figure 17:
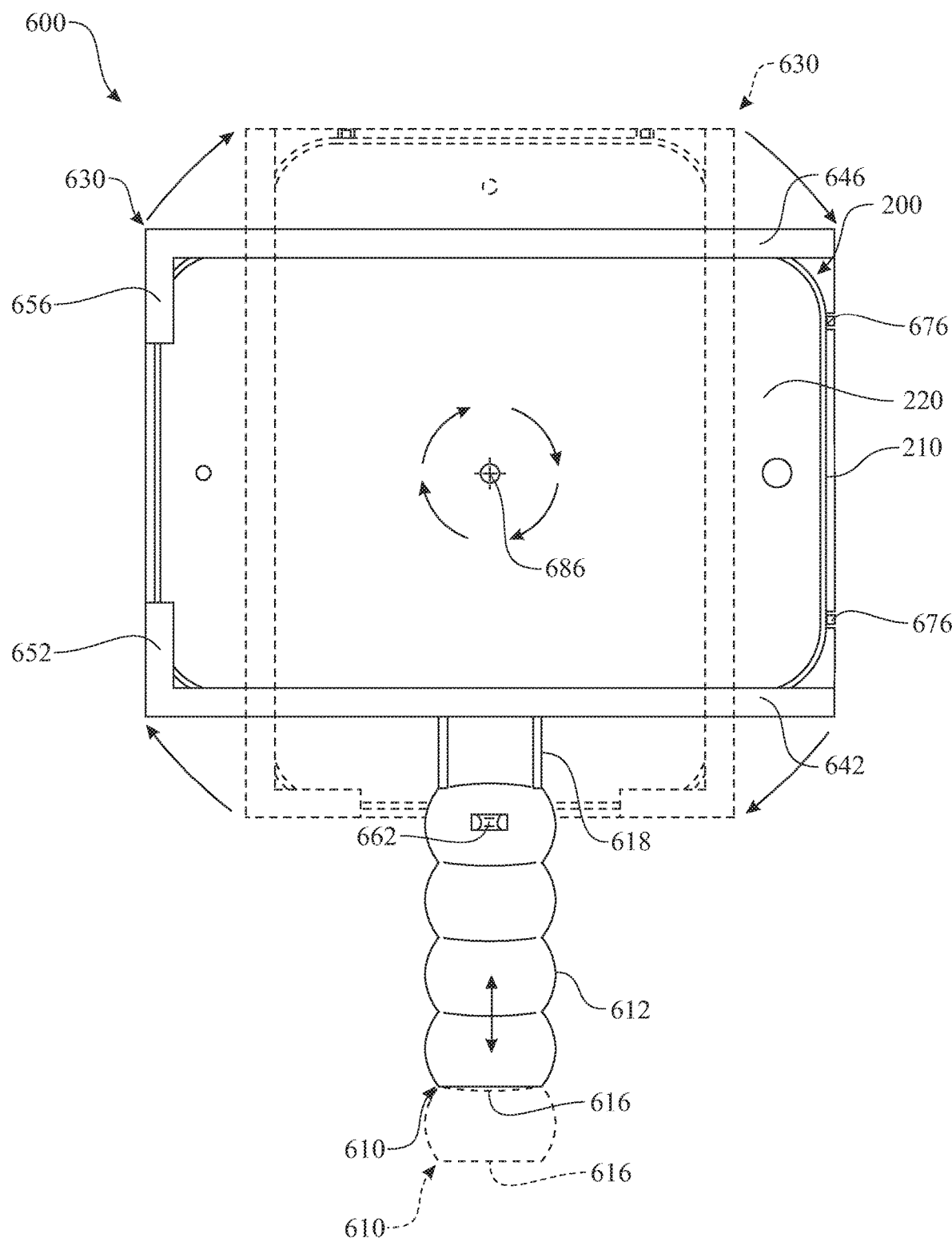
FIG. 17 presents an elevation viewing side view of a variant of the embodiment of the portable computing tablet holster originally introduced in FIG. 8, wherein the exemplary version includes a tablet/handle rotation feature and a handle sliding feature.

The variants and embodiments of the portable computing tablet holster disclosed herein can include electrically operated circuitry and associated components, as detailed in FIG. 16. A controller 590 is provided in non-transient signal communication with any of a variety of functional components, including non-transient digital memory 591, one or more user input devices 592, one or more connectors 593, a wireless interface 594, a wired interface 595, a digital camera 596, and the like. The non-transient digital memory 591 can include integrated memory and or removable memory device. The removable memory device could be in wired communication by way of temporary electro-mechanically integrating the removable memory device into the circuit by a connector 593 or by way of a wireless communication. Examples of removable memory include universal serial bus (USB) memory sticks, secure digital (SD) memory cards, and the like. The wireless interface 594 includes wireless circuitry and operating protocol for wirelessly communicating with other devices, including the portable computing tablet 200 or any other suitable device. The wireless circuitry and operating protocol can include Wi-Fi, Bluetooth, Zigbee, Near Field Communications (NFC), and the like. The wired interface 595 includes wired circuitry, connectors 593 and operating protocol for directly communicating with other devices, including the portable computing tablet 200 or any other suitable device. The wired circuitry and operating protocol can include a serial communication, such as a Universal Serial Bus (USB), a parallel communication, Ethernet, and the like. The camera 596, secondary light emitting device 560, and other connectors 593 are in electrical and/or signal communication with the controller 590 using any suitable electrical and/or signal carrying medium, such as wires, a flexible circuit, fiber optic strands, and the like. The user input 592 can be a touch pad/screen, a contact switch, and the like. Connectors 593 can be provided for any of a variety of functions, including signal communication links, power supplies (for recharging of the portable power supply), receiving the SD memory card, and the like. Power to the electronic circuitry and components would be provided by a portable power supply, such as a battery, a super capacitor, a power generating device (such as a solar energy converter, a kinetic energy converter, etc.), and the like.

The exemplary portable computing tablet holster 500 includes at least one lateral retention segment 552, 554, 556, along a first lateral edge of the portable computing tablet retention assembly 530, and at least one flexible cantilevered retention element 576 proximate a second, opposite lateral edge of the portable computing tablet retention assembly 530. In an alternative configuration, the portable computing tablet retention assembly 530 can be configured replacing the at least one lateral retention segment 552, 554, 556 with at least one flexible cantilevered retention element 576 located along the first lateral edge of the portable computing tablet retention assembly 530, wherein the at least one flexible cantilevered retention element 576 retains the portable computing tablet 200 within the portable computing tablet retention assembly 530 in each direction parallel to the elongated retention elements 542, 546.

In a lower tier version, the modified portable computing tablet holster 500 would include a handle assembly 510 that is fixed to the portable computing tablet retention assembly 530. In the modified portable computing tablet holster 500, the handle assembly 510 and the portable computing tablet retention assembly 530 can be manufactured using a single mold; the modified portable computing tablet holster 500 having a unitary molded construction. This provides a low cost solution for the consumer market.

The portable computing tablet 200 includes like components. Like elements of the portable computing tablet 200 and portable computing tablet holster 500 are numbered the same except preceded by the numeral '2'. Communication between the portable computing tablet holster 500 and the portable computing tablet 200 can be accomplished by a wired interface provided between the wireless interface 595 of the portable computing tablet holster 500 and the wireless interface 295 of the portable computing tablet 200 and/or a wireless interface provided between the wired interface 594 of the portable computing tablet holster 500 and the wired interface 294 of the portable computing tablet 200.

It is understood that a software application can be stored in memory 591 that includes a computer instruction set, executed by the controller 590. The computer instruction set can be employed to operate the integrated camera 596 and the light emitting device 560, when required. The circuitry can include a light sensor (not shown) to aid in determining when the use of the light emitting device 560 is required. The electrical circuitry of the portable computing tablet holster 500 can be such to operate the integrated camera 596 with or without the portable computing tablet 200. Greater creativity can be achieved in producing videos by combining the portable computing tablet 200 with the portable computing tablet holster 500. For example, a user can selectively alternate between utilizing video captured by the camera 596 on the tablet holder 500 and utilizing video captured by the camera 296 on the portable computing tablet 200 in accordance with a user desired video capturing angle.

The portable computing tablet holster 500 introduces a device capable of rotating the portable computing tablet retention assembly 530 and pivoting the portable computing tablet retention assembly 530 about an attachment end of the handle assembly 510. The rotation of a portable computing tablet retention assembly 530 having a rectangular shape can interfere with the user's hand on the handle assembly 510. A portable computing tablet holster 600, illustrated in FIG. 17 through 20, is an enhanced variant of the portable computing tablet holster 500. The portable computing tablet holster 600 and the portable computing tablet holster 500 include a number of like features. The portable computing tablet holster 600 and the portable computing tablet holster 500 are numbered the same except preceded by the numeral '6', unless indicated as otherwise. The portable computing tablet holster 600 introduces a system for sliding a handle assembly 610 to position locating a handle 612 of the handle assembly 610 at a desired distance from a respective edge of a portable computing tablet retention assembly 630, as indicated by a linear arrow. The portable computing tablet holster 600 additionally retains the capability for rotating the portable computing tablet retention assembly 630 about a ratchet rotation disk 686 attached to an attachment end of a handle attachment section 618 of the handle assembly 610, as indicated by a series of arched arrows. Portions of the illustration shown in broken lines indicate an original position of the respective element and portions of the illustration shown in solid lines indicates the current configuration of the portable computing tablet holster 600.

Figure 18:
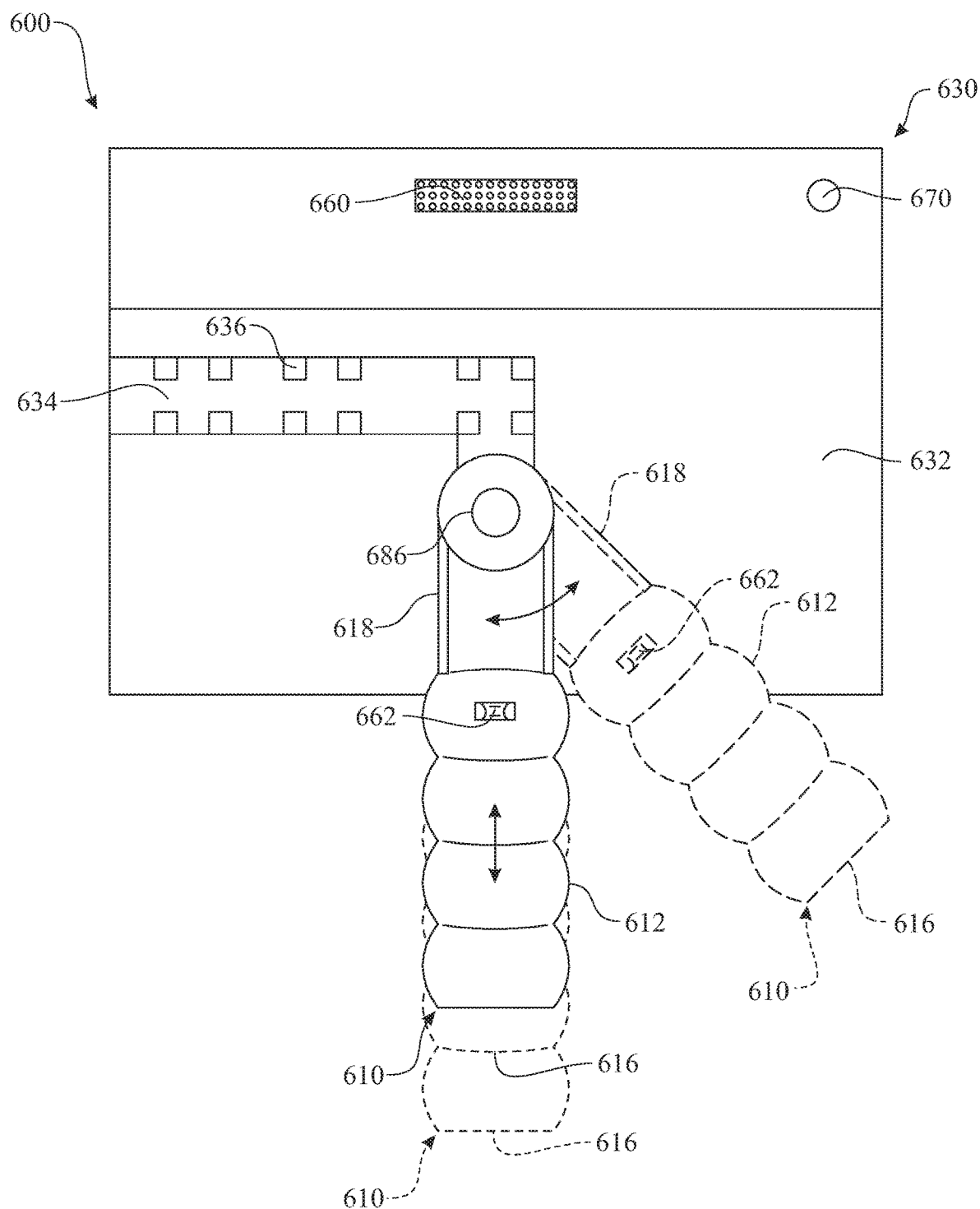
FIG. 18 presents a non-viewing side elevation view of the portable computing tablet holster originally introduced in FIG. 17, the illustration demonstrating movements associated with the tablet/handle sliding feature and the tablet/handle rotation feature.
Figure 19:
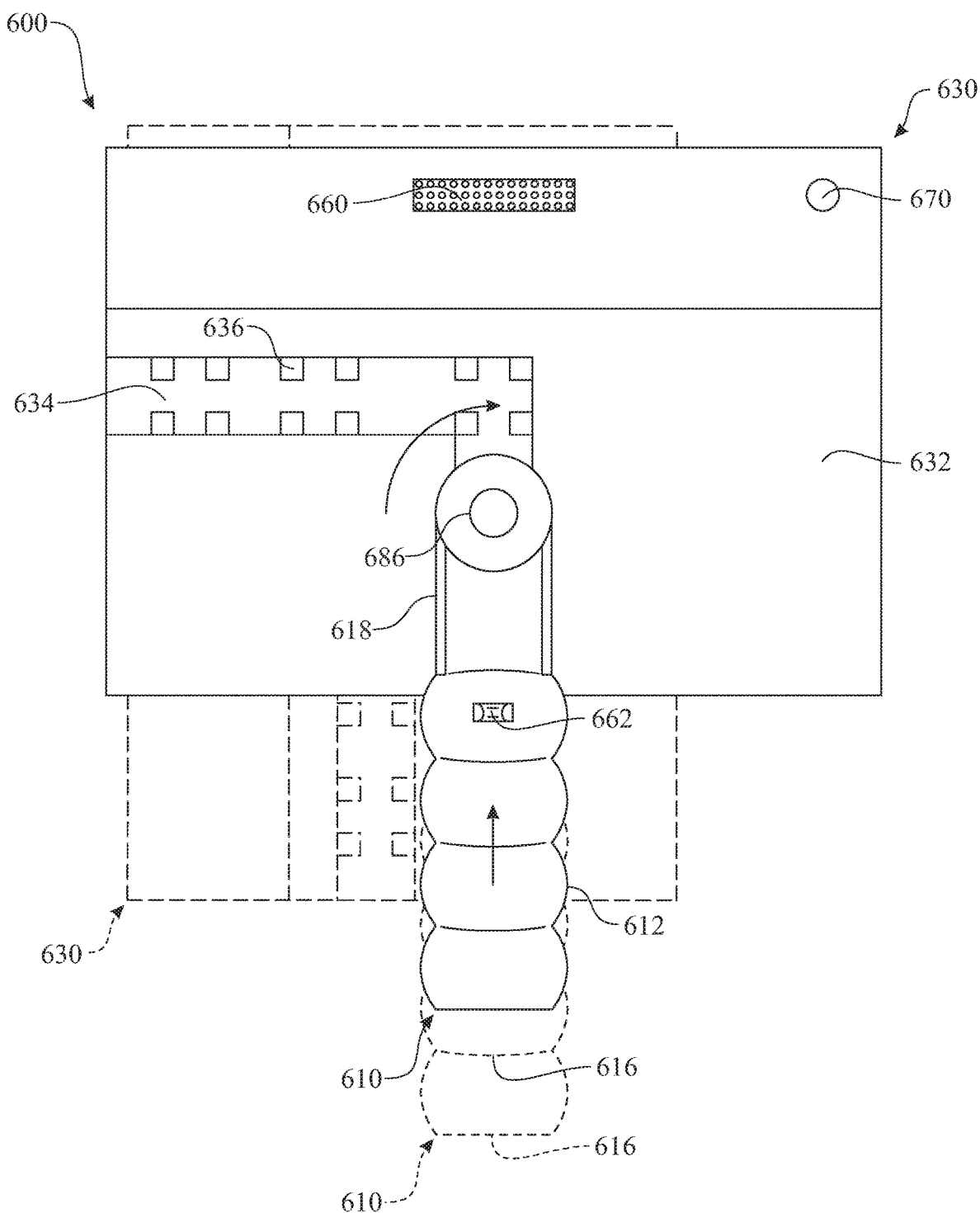
FIG. 19 presents a non-viewing side elevation view of the portable computing tablet holster originally introduced in FIG. 17, the illustration demonstrating alternative movements associated with the tablet/handle sliding feature and the tablet/handle rotation feature.
Figure 20:
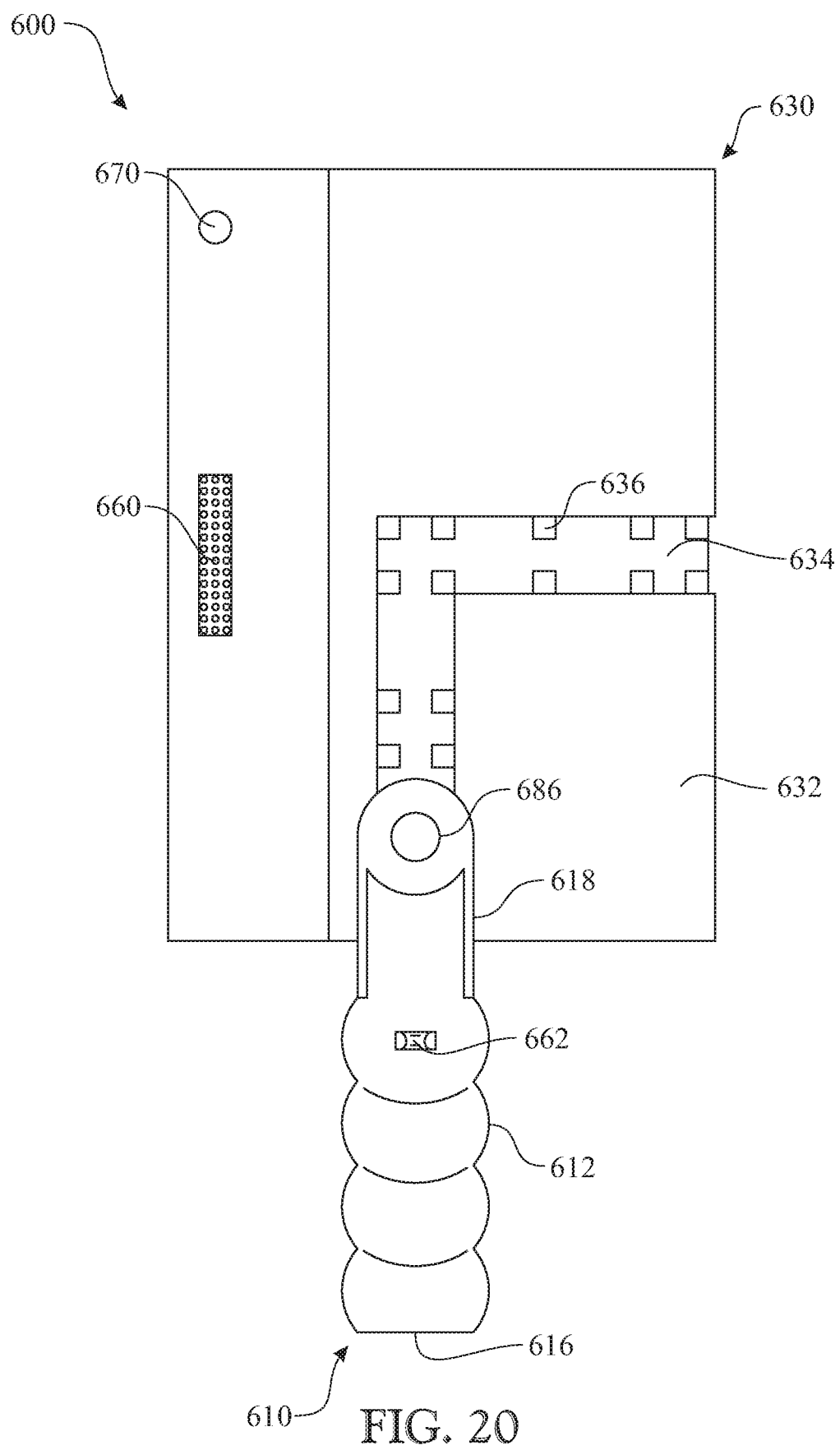
FIG. 20 presents a non-viewing side elevation view of the portable computing tablet holster originally introduced in FIG. 17, the illustration demonstrating another available configuration of the portable computing tablet holster.
Figure 22:
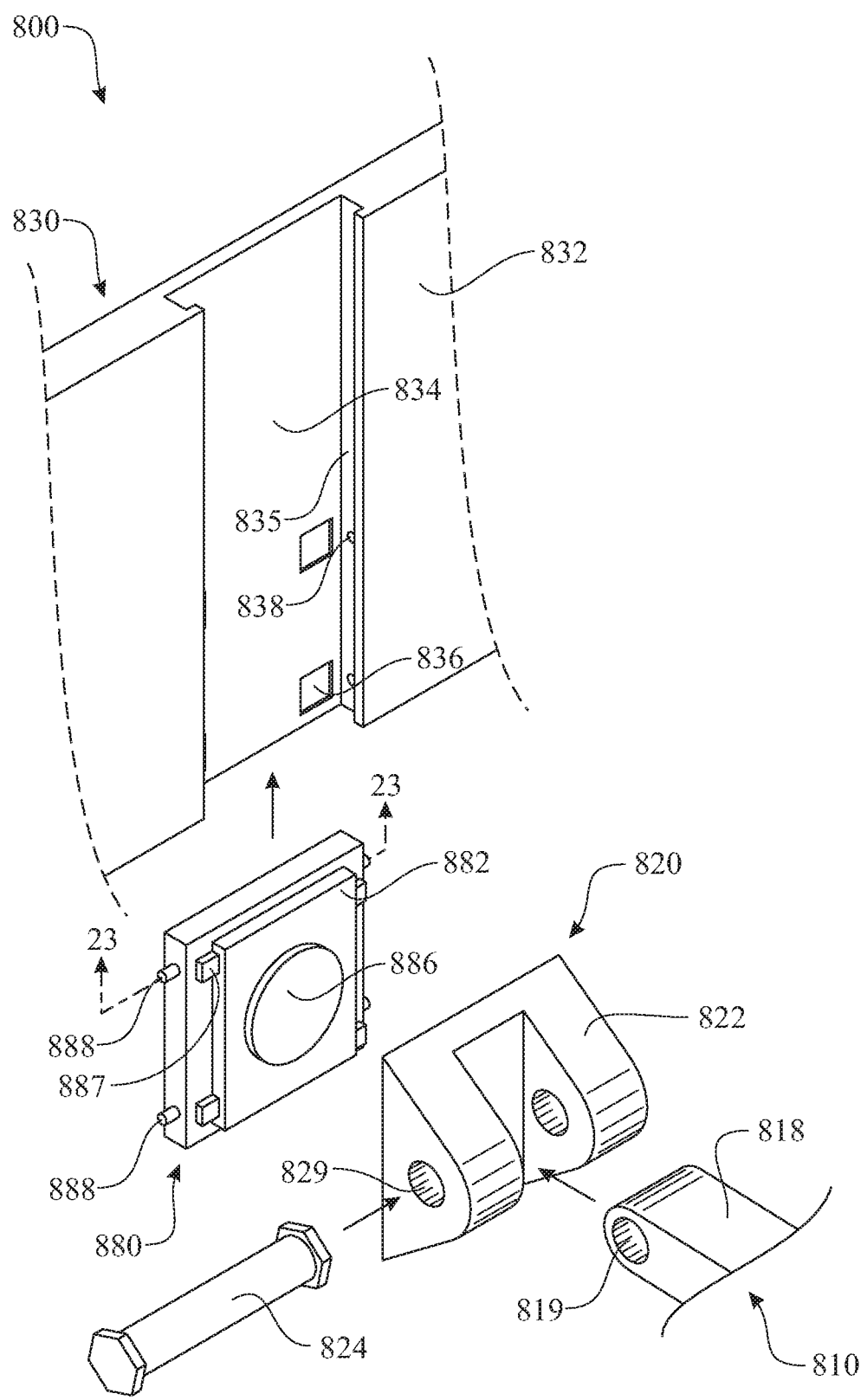
FIG. 22 presents an exploded isometric non-viewing side view of a portion of yet another variant of the portable computing tablet holster originally introduced in FIG. 17, the illustration introducing components enabling the tablet rotation feature, the handle sliding feature and a handle pivot feature.
Figure 23:
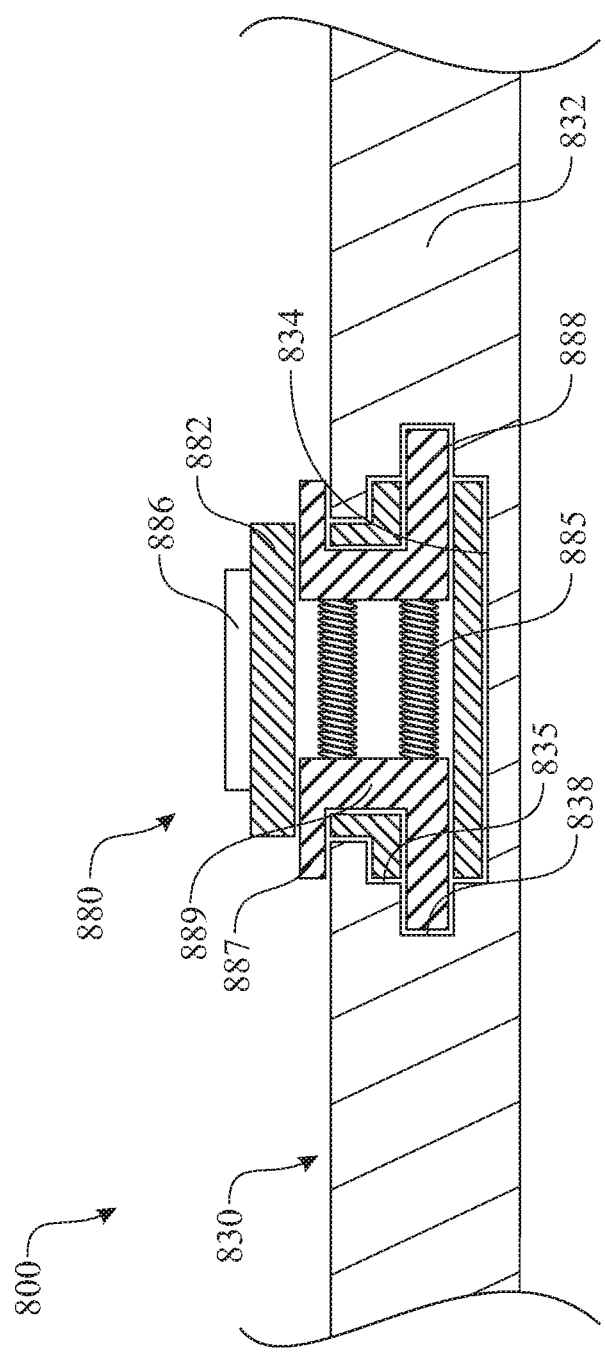
FIG. 23 presents a cross section view of one exemplary slide locking feature, the section being taken along section line 23-23 of FIG. 22.

The sliding system can utilize any sliding interface for slideably assembling an assembly end of the handle attachment section 618 to a non-viewing side of the portable computing tablet retention assembly 630. The sliding motion being along a plane that is substantially parallel to a plane defined by a viewing surface of the portable computing tablet 200. The exemplary sliding system employs a sliding mechanism slideably engaging within a handle sliding mechanism receiving slot 634. As illustrated in FIGS. 18 through 20, the handle sliding mechanism receiving slot 634 can include a longitudinal segment extending parallel to an elongated edge of the portable computing tablet retention assembly 630 and a lateral segment extending perpendicular to the elongated edge of the portable computing tablet retention assembly 630. It would be desired that the point of intersection between the longitudinal segment and the lateral segment would be centered within the non-viewing surface of a base tablet rear support panel 632 of the portable computing tablet retention assembly 630. The sliding system can include a detent locking system enabling retention of the sliding interface at any of a series of predetermined positions along the longitudinal segment or the lateral segment of the handle sliding mechanism receiving slot 634. Details of one exemplary sliding system configuration are shown in FIGS. 22 and 23 later herein.

A rotating motion can be provided by the ratchet rotation disk 686. A rotating motion enables a rotational motion of the handle assembly 610 and the portable computing tablet retention assembly 630 respective to one another as identified by an arched arrow shown in FIGS. 17 and 18. The rotational motion being about an axis that is substantially perpendicular to the viewing surface of the portable computing tablet 200. The ratchet rotation disk 686 can be any suitable rotational mechanism, such as the ratchet rotation disk 586, previously described herein, a pivot axle or pin, and the like. The rotational mechanism can include any suitable rotational elements known by those skilled in the art, or those introduced herein.

The portable computing tablet holster 600 additionally includes a light emitting device 660 operated by an actuation switch 662. The exemplary light emitting device 660 includes a bank of high output light emitting diodes. The light emitting device 660 and the actuation switch 662 are similar to the light emitting device 160 and the actuation switch 162 previously described herein. A portable power supply would be integrated into an enclosure within the handle 612, within an enclosure carried by the base tablet rear support panel 632, or an enclosure carried by any other feature of the portable computing tablet holster 600. The power would be conveyed between the portable power supply, the actuation switch 662 and the light emitting device 660 by any suitable electrically conductive material forming an electrically conductive path therebetween. Examples include wires, a flexible circuit, conductive tape, connectors, a printed circuit board, and the like. It is understood that wireless power transmission can be employed using any suitable wireless power transmission configuration known by those skilled in the art. In one alternative, compact configuration, the actuation switch 662 and the portable power supply would be integrated into the light emitting device 660. The user would toggle the actuation switch 662 to activate and deactivate the light emitting device 660. In another alternative, compact configuration, the actuation switch 662 can be a motion sensing switch, wherein the actuation switch 662 and the portable power supply would be integrated into the light emitting device 660. The user would move the portable computing tablet holster 600 to activate the light emitting device 660. Although the light emitting device 660 is shown being assembled to the non-viewing side of the base tablet rear support panel 632, it is understood that the light emitting device 660 can be integrated into any suitable portion of the handle assembly 610.

The portable computing tablet holster 600 can include any of the features of the previously described versions, such as an integrated camera light emitting device 560 of the portable computing tablet holster 500, the pivoting feature provided by the pivotal motion of the hinged support arm 582 respective to the handle attachment section 518, and the like.

Figure 21:
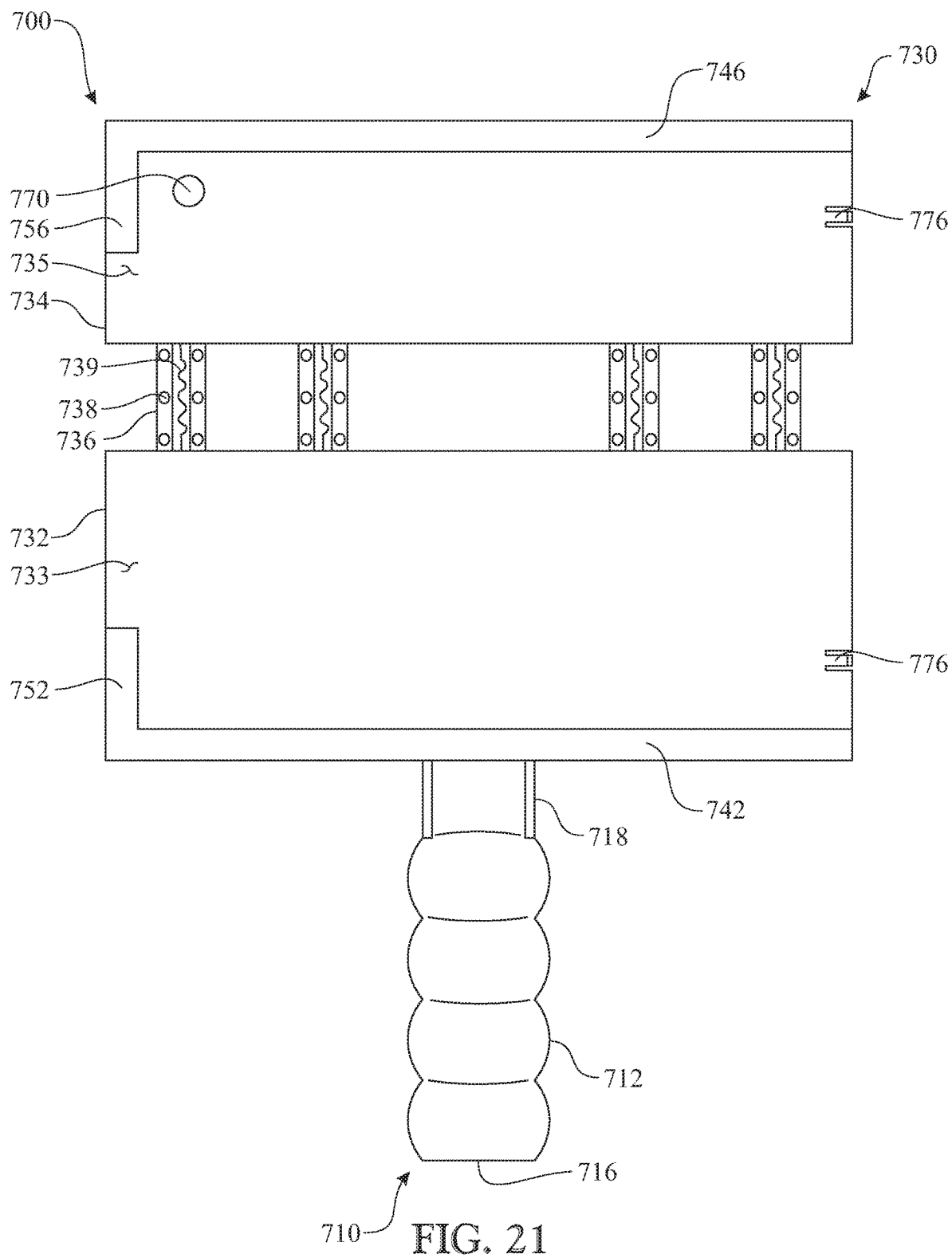
FIG. 21 presents a viewing side elevation view of another variant of the portable computing tablet holster originally introduced in FIG. 8, wherein the exemplary version introduces a portable computing tablet retention assembly expansion feature.

The portable computing tablet holster 100 included the base elongated retention element 142 and the distal elongated retention element 146 to accommodate a lateral dimension H of the portable computing tablet 200, as shown in FIGS. 1 through 5. Retention of the portable computing tablet 200 within the portable computing tablet retention assembly 130 is provided by friction. A portable computing tablet holster 700, illustrated in FIG. 21, introduces an adjustable portable computing tablet retention assembly 730 adapted to accommodate different portable computing tablets 200 having different lateral dimensions H. The portable computing tablet holster 700 combines the tablet retention features of the portable computing tablet holster 500 and the adaptive lateral dimension H provided by the portable computing tablet holster 100. The portable computing tablet holster 700 and the portable computing tablet holster 100 include a number of like features. The portable computing tablet holster 700 and the portable computing tablet holster 100 are numbered the same except preceded by the numeral '7', unless indicated as otherwise. Additionally, the portable computing tablet holster 700 and the portable computing tablet holster 500 include a number of like features. The portable computing tablet holster 700 and the portable computing tablet holster 500 are numbered the same except preceded by the numeral '7', unless indicated as otherwise.

The portable computing tablet retention assembly 730 includes a distal elongated retention element 734 slideably assembled to a base tablet rear support panel 732 by a rear panel expansion sliding element 736. The sliding interface can be of any suitable height adjusting mechanism, including the height adjusting mechanism originally disclosed in FIGS. 3 through 5. In addition to comprising a base elongated retention element 742 and a distal elongated retention element 746, as originally taught by the portable computing tablet holster 100, the portable computing tablet holster 700 includes a lateral retention base segment 752 and a lateral retention distal segment 756, as originally taught by the portable computing tablet holster 500. The lateral retention base segment 752 and the lateral retention distal segment 756 retain the portable computing tablet 200 within the portable computing tablet retention assembly 730 in an insertion direction. The portable computing tablet holster 700 further comprises at least one flexible cantilevered retention element 776, as originally taught by the portable computing tablet holster 500, to retain the portable computing tablet 200 within the portable computing tablet retention assembly 730 in a removal direction. A camera viewing aperture 770 provides access to the camera 296 of the portable computing tablet 200 through the distal elongated retention element 734 for viewing the desired image to be captured. The camera viewing aperture 770 can be of any suitable shape and size to accommodate different locations of cameras 296 of different portable computing tablets 200. The camera viewing aperture 770 can be shaped and sized to additionally accommodate a light emitting device (not shown) that might be integrated into the portable computing tablet 200. Alternatively, a separate orifice can be included to accommodate the light emitting device (not shown) integrated into the portable computing tablet 200. It is recognized that these features could be included in any of the other versions, where applicable.

The exemplary portable computing tablet holster 600 includes the system for sliding the handle assembly 610 along a path formed on a non-viewing side of the portable computing tablet retention assembly 630. The portable computing tablet holster 600 additionally includes the capability for rotating one of the handle assembly 610 and the portable computing tablet retention assembly 630 respective to the other. A portable computing tablet holster 800 retains the sliding motion and rotational motion capabilities and introduces a pivoting capability. An exploded view introducing the operational components of the portable computing tablet holster 800 is illustrated in FIG. 22; with a cross section view detailing components of a sliding, locking mechanism is illustrated in FIG. 23. The portable computing tablet holster 800 and the portable computing tablet holster 600 include a number of like features. The portable computing tablet holster 800 and the portable computing tablet holster 600 are numbered the same except preceded by the numeral '8', unless indicated as otherwise.

A handle sliding mechanism 880 is adapted to slide within a handle sliding mechanism receiving slot 834 formed within a non-viewing side of a tablet rear support panel 832. The handle sliding mechanism 880 can be temporarily fixed in a predetermined location by engaging a locking element of the handle sliding mechanism 880 and a receiving feature formed within the handle sliding mechanism receiving slot 834. A handle sliding mechanism body 882 of the handle sliding mechanism 880 is sized and shaped to slideably assemble into a handle sliding mechanism receiving slot 834, more specifically, having elongated edges that are sized to slideably assembly within a handle sliding mechanism receiving edge channel 835 of the handle sliding mechanism receiving slot 834.

The exemplary illustration introduces two optional locking configurations. A first exemplary locking mechanism includes a pliant feature extending downward from a bottom surface of a handle sliding mechanism body 882 of the handle sliding mechanism 880. The pliant feature engages and disengages with a handle sliding mechanism detent compression recessions 836 formed in a bottom surface of the handle sliding mechanism receiving slot 834. The pliant feature can be of any suitable configuration. A second exemplary locking mechanism includes a series of handle sliding mechanism retention featured 888, which are retained in an expanded condition by a handle sliding mechanism retention feature biasing element 885, as illustrated in FIG. 23. Each handle sliding mechanism retention feature 888 engages and disengages with a respective handle sliding mechanism detent lateral bores 838 formed within the handle sliding mechanism receiving edge channel 835 of the handle sliding mechanism receiving slot 834. Operation of the handle sliding mechanism retention feature 888 is accomplished by applying a compression force to a handle sliding mechanism retention feature operating mechanism 887. The handle sliding mechanism retention feature 888 and handle sliding mechanism retention feature operating mechanism 887 are connected by a handle sliding mechanism retention feature connecting arm 889 and preferably fabricated as a single locking mechanism member having a unitary construction. The handle sliding mechanism body 882 includes cavities and bores to moveably receive each of the locking mechanism members and the handle sliding mechanism retention feature biasing element 885.

A handle sliding mechanism pivot enabling element 886 is carried by the handle sliding mechanism body 882. The handle sliding mechanism pivot enabling element 886 is rotationally assembled to a mating surface of the articulating interface subassembly 820. The handle sliding mechanism pivot enabling element 886 enables the rotational movement of the portable computing tablet retention assembly 830 and the handle assembly 810 respective to one another. The handle sliding mechanism pivot enabling element 886 can be any suitable rotation enabling configuration, including those described above as well as rotation enabling configurations known to those skilled in the art. The articulating interface subassembly 820 contributes to both the rotational motion and the pivotal motion between the handle assembly 810 and the portable computing tablet retention assembly 830. The pivotal motion is provided by a hinge assembly comprising an articulating subassembly pivot pin 824, which is inserted through a pair of central articulating element pivot pin receiving bores 829 formed through arms of a central articulating element 822 of the articulating interface subassembly 820 and a hinge tab bore 819 formed through an handle attachment section 818 of the handle assembly 810.

Although the exemplary hinge assembly illustrated in FIG. 22 is a common hinge configuration, it is understood that any suitable hinge configuration can be integrated herein, including those described herein and any suitable hinge configuration known by those skilled in the art. Additionally, the hinge assembly can include a position retention feature, such as a compression mechanism, which would increase friction between an interior surface of the arms of the central articulating element 822 and the mating surfaces of the handle attachment section 818. In another configuration, the hinge assembly can include a series of radially arranged teeth and mating grooves to limit the rotation when the teeth and mating grooves engage with one another. The hinge assembly can include any other position retention feature known by those skilled in the art.

Figure 24:
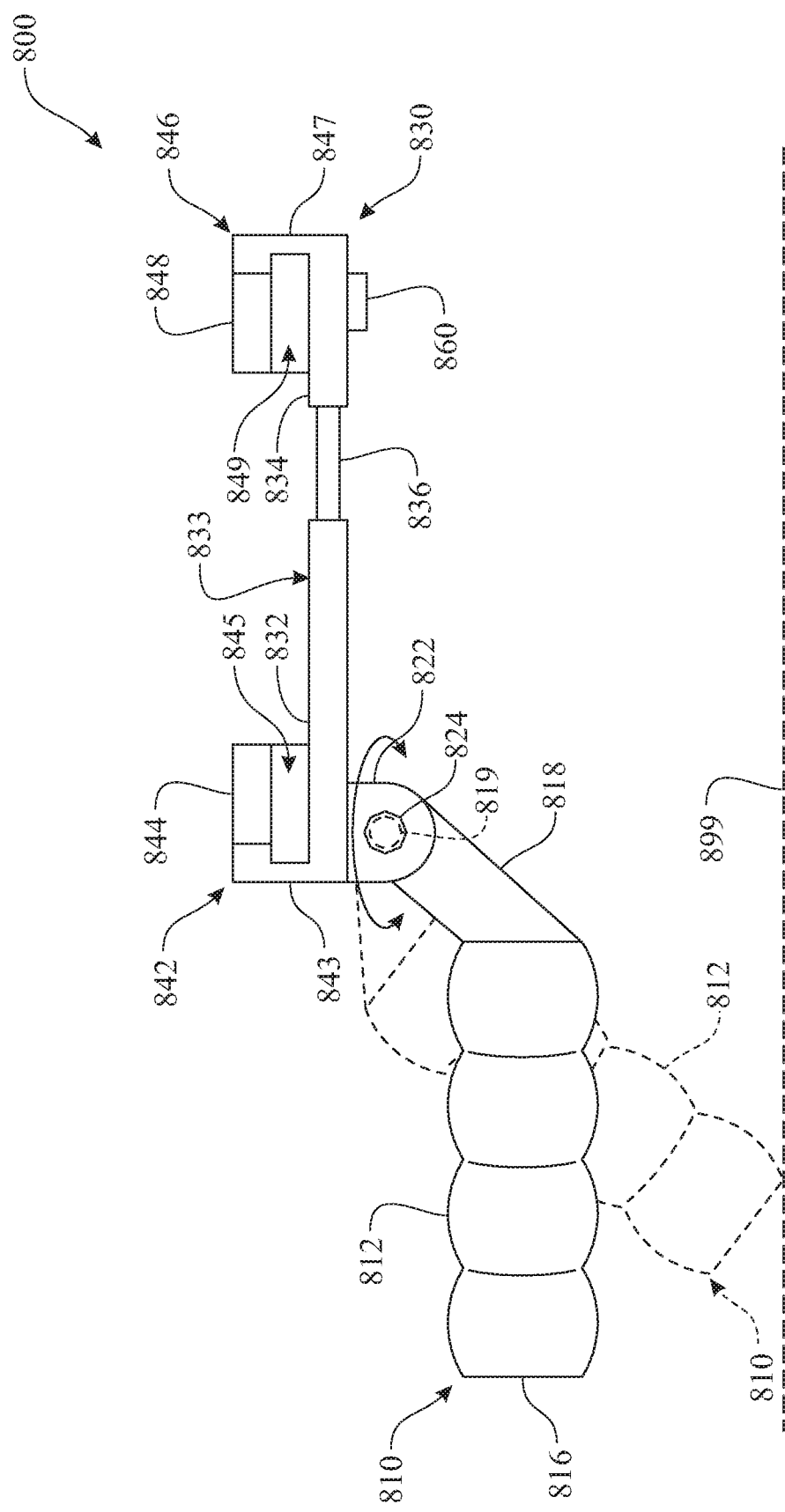
FIG. 24 presents a side elevation view of another variant of the portable computing tablet holster originally introduced in FIG. 23, the illustration demonstrating a first step using the tablet/handle rotation feature for orienting the handle into a stand configuration.
Figure 25:
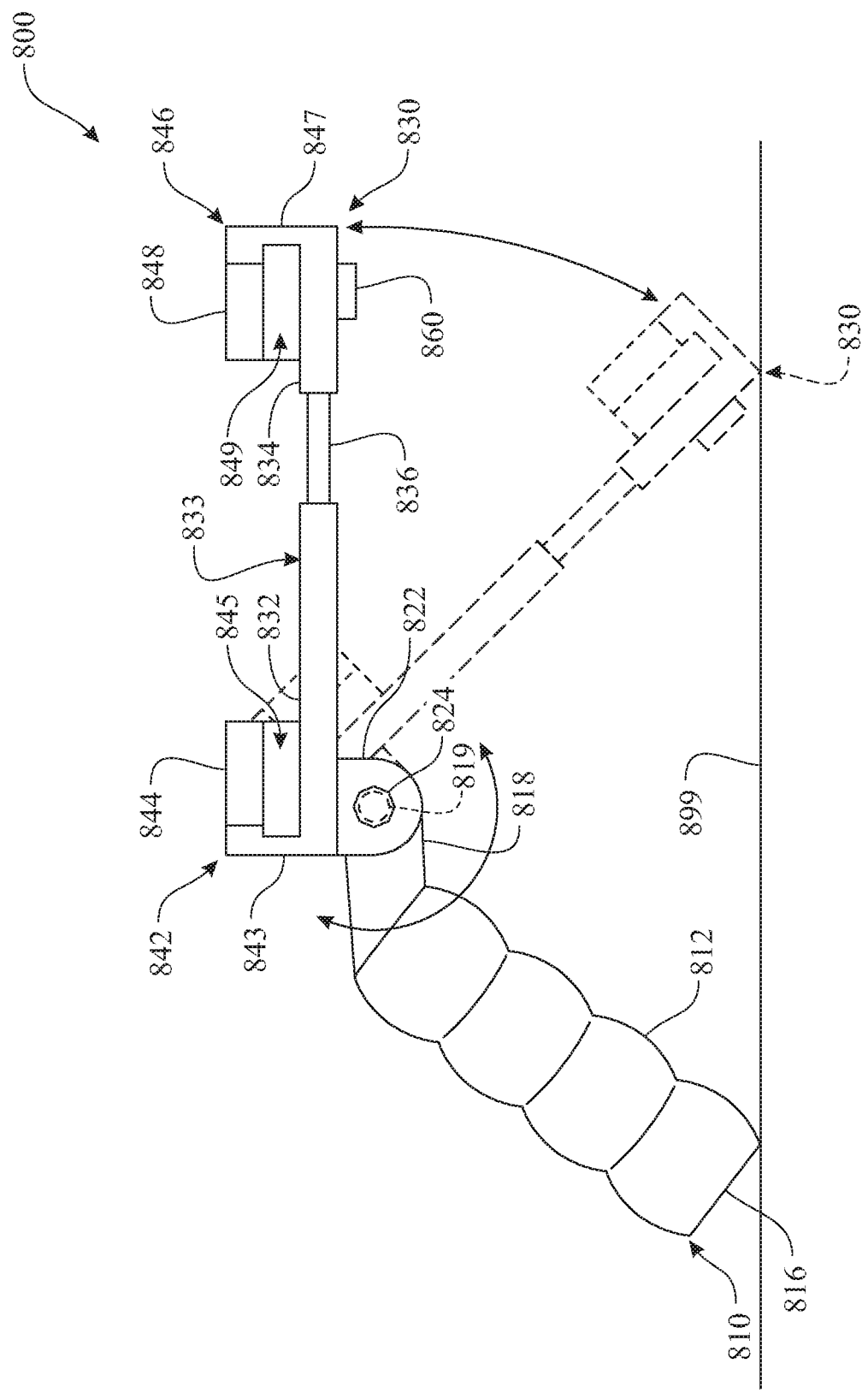
FIG. 25 presents a side elevation view of the portable computing tablet holster originally introduced in FIG. 23, the illustration demonstrating a second step using the tablet/handle pivot feature to orient the handle into a stand configuration.
Figure 26:
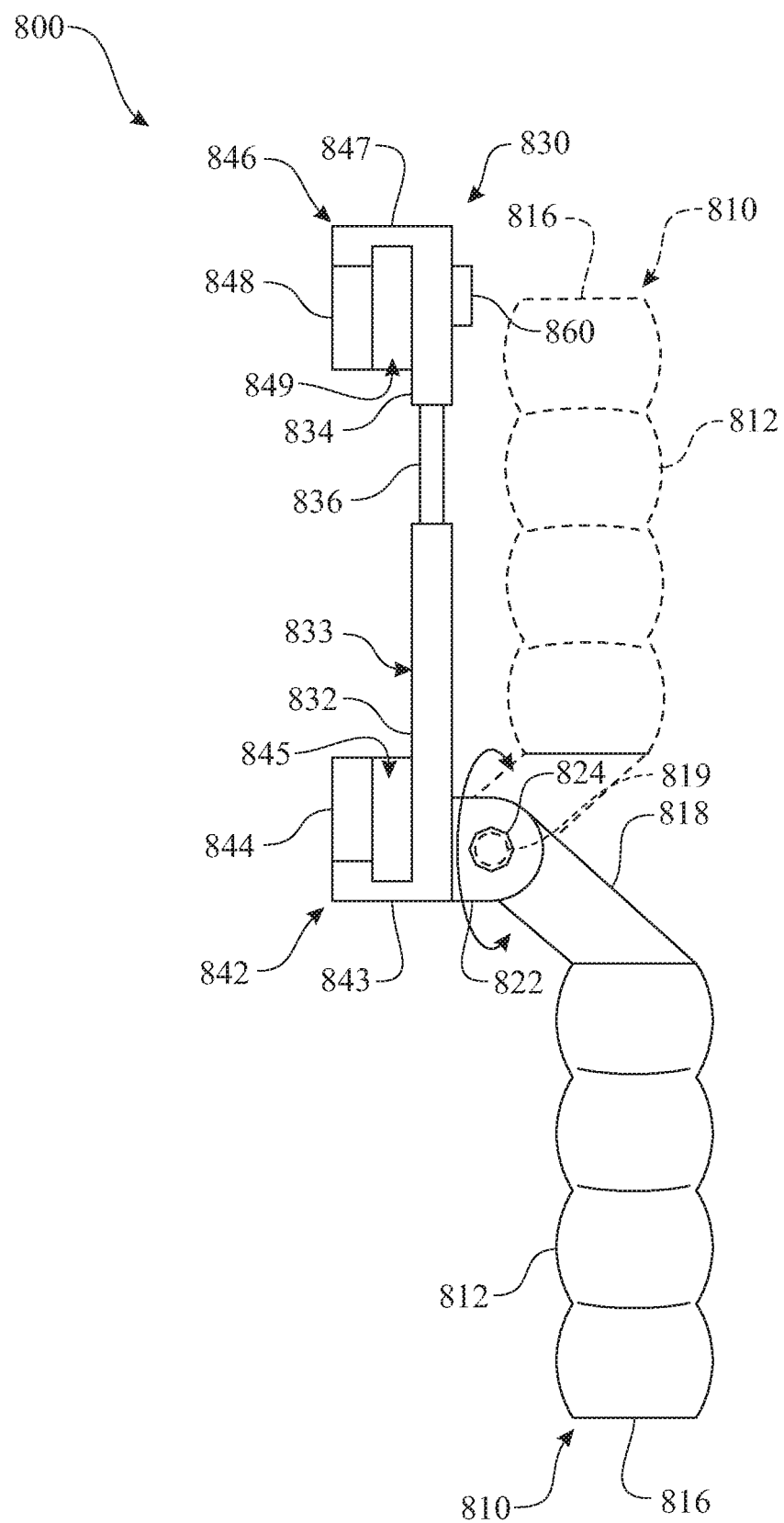
FIG. 26 presents a side elevation view of the portable computing tablet holster originally introduced in FIG. 23, the illustration demonstrating a step using the tablet/handle rotation feature for orienting the handle into a storage configuration.

Various applications of the articulating assembly of portable computing tablet holster 800 are illustrated in FIGS. 24 through 26. The handle attachment section 818 can include a section that is angled respective to an elongated axis of the handle 812. The angled section of the handle attachment section 818 provides an offset between the handle assembly 810 and the portable computing tablet retention assembly 830. The handle assembly 810 can be rotated about the handle sliding mechanism pivot enabling element 886, as illustrated in FIG. 24. The rotational motion illustrated reconfigures the handle assembly 810 from an orientation having the elongated axis of the handle assembly 810 being parallel to a plane defined by the tablet rear support panel 832 (shown in solid lines) to an orientation where the elongated axis of the handle assembly 810 is angled offset from parallel respective to the plane defined by the tablet rear support panel 832 (shown in broken lines). From this configuration, the portable computing tablet retention assembly 830 can be pivoted about the hinge tab bore 819 into a configuration where the portable computing tablet holster 800 is supported by a generally horizontally oriented support surface 899 (shown in broken lines). The portable computing tablet holster 800 would be supported by a distal edge of an handle sliding mechanism receiving slot 834 (or a distal edge of the tablet rear support panel 832 when the portable computing tablet retention assembly 830 excludes an expansion feature, represented by a handle sliding mechanism detent compression recessions 836) and a contacting portion of a distal, free, detached end 816 of the handle 812, as illustrated in FIG. 25.

Alternatively, initiating from the configuration illustrated in FIG. 24, the handle assembly 810 can be rotated about the handle sliding mechanism pivot enabling element 886 from the extended configuration into a compact configuration, as illustrated in broken lines in FIG. 26). The portable computing tablet holster 800 can be placed into the compact configuration for compact applications, for storage, or any other suitable use. The illustrated examples are only a portion of the functions provided by the articulated assembly. It is understood that the articulated assembly can be used for any suitable function desired by the user. The inclusion of a multi-directional slot (similar to the handle sliding mechanism receiving slot 634) enables a slideable positioning of the handle assembly 810 to any of a variety of positions along the multi-directional slot. This furthers the optional configurations and resulting functions provided by the slideably articulated assembly.

Figure 27:
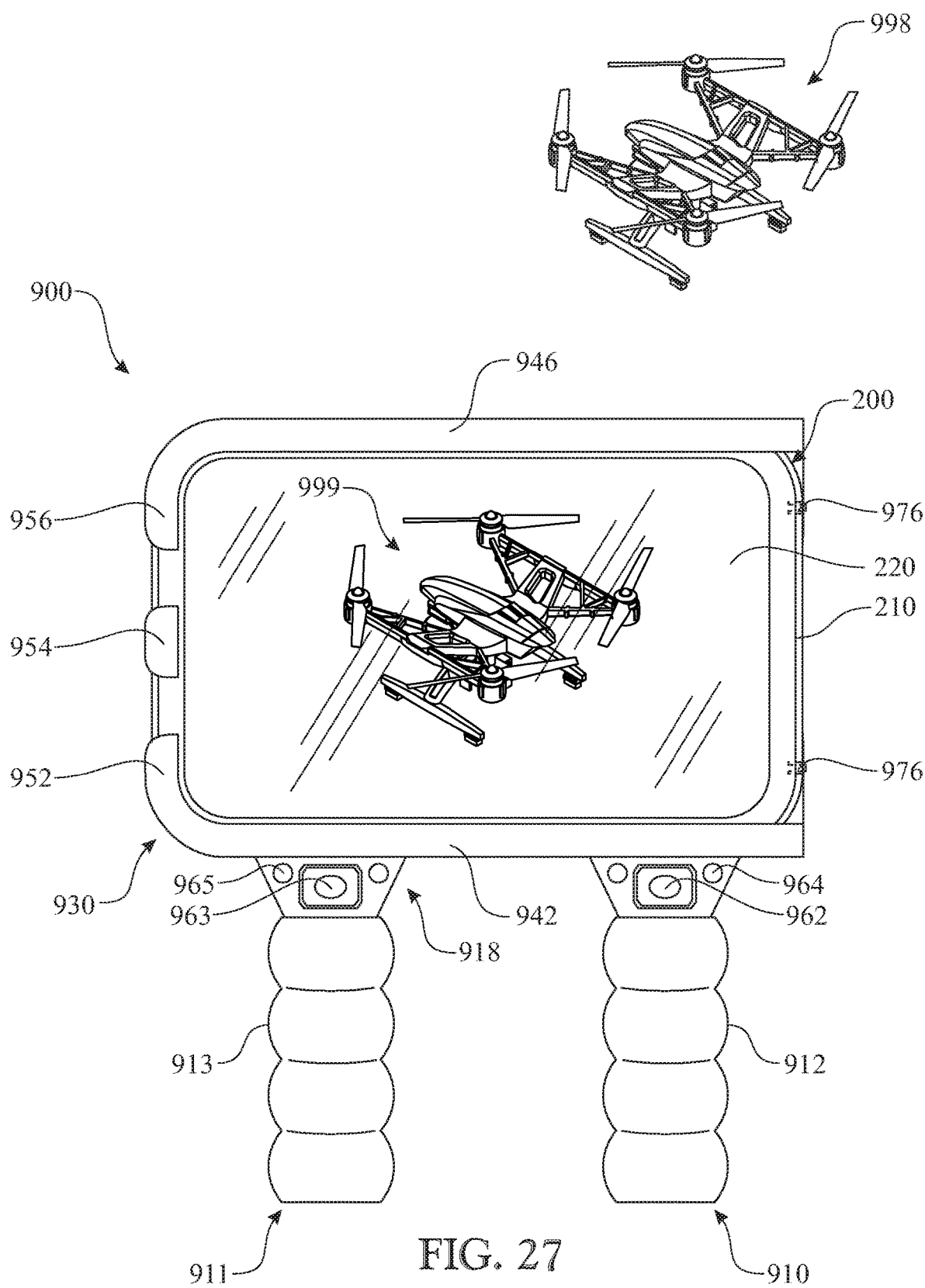
FIG. 27 presents a viewing side elevation view of another variant of the portable computing tablet holster originally introduced in FIG. 8, wherein the exemplary version includes a pair of handles, the portable computing tablet holster being adapted to support a remote control of a radio controlled vehicle.

Each of the above disclosed variants of the portable computing tablet holster include a single handle assembly. The single handle assembly would preferably be configured to remain positioned along a central line of the portable computing tablet retention assembly to ensure the portable computing tablet holster remains balanced when being supported by a single hand of the user. There are some applications where two handles would be beneficial. A portable computing tablet holster 900, introduced in FIG. 27, is a modified version of the portable computing tablet holster 500. The portable computing tablet holster 900 and the portable computing tablet holster 500 have a number of like features. Like features of the portable computing tablet holster 900 and the portable computing tablet holster 500 are numbered the same except preceded by the numeral '9'.

The portable computing tablet holster 900 includes a pair of handle assemblies 910, 911. The pair of handle assemblies 910, 911 is preferably rigidly assembled to the portable computing tablet retention assembly 930. User input devices are integrated into each handle assembly 910, 911. The user input devices can include at least one of a user directional input device 962, 963 and one or more handle user analog input devices 964, 965. The user directional input device 962, 963 can be any suitable multi-directional input device, including a touch pad, a joystick, a trackball, and the like. The analog input devices 964, 965 can be any suitable analog type device providing an open/closed signal, including a tactile switch, a pushbutton switch, a toggle switch, a throw switch, a popple switch, a rocker switch, a snap action switch, a slide switch, a thumbwheel, and the like. As illustrated, the portable computing tablet holster 900 can include one or more one or more handle user analog input devices 964, 965 integrated onto the viewing side of the handle 912, 913. One exemplary implementation of the portable computing tablet holster 900 is a wireless controller for operating a remotely operated vehicle 998. The user would support the portable computing tablet holster 900 using both hands, each hand grasping a respective handle 912, 913. The user would then use their thumb to provide inputs to the portable computing tablet 200 through the user input devices 962, 963, 964, 965. The inputs would be processed and forwarded as an instruction to the remotely operated vehicle 998. The camera (not shown) could be used to acquire images of the remotely operated vehicle 998 during use. The images of the remotely operated vehicle 998 would be displayed as a remotely operated vehicle image 999 upon the touch screen 220 of the portable computing tablet 200. Alternatively, a camera (not shown) can be attached to the remotely operated vehicle 998. Images captured by the camera attached to the remotely operated vehicle 998 can be recorded by the portable computing tablet 200 and/or displayed on the touch screen 220 of the portable computing tablet 200.

Figure 28:
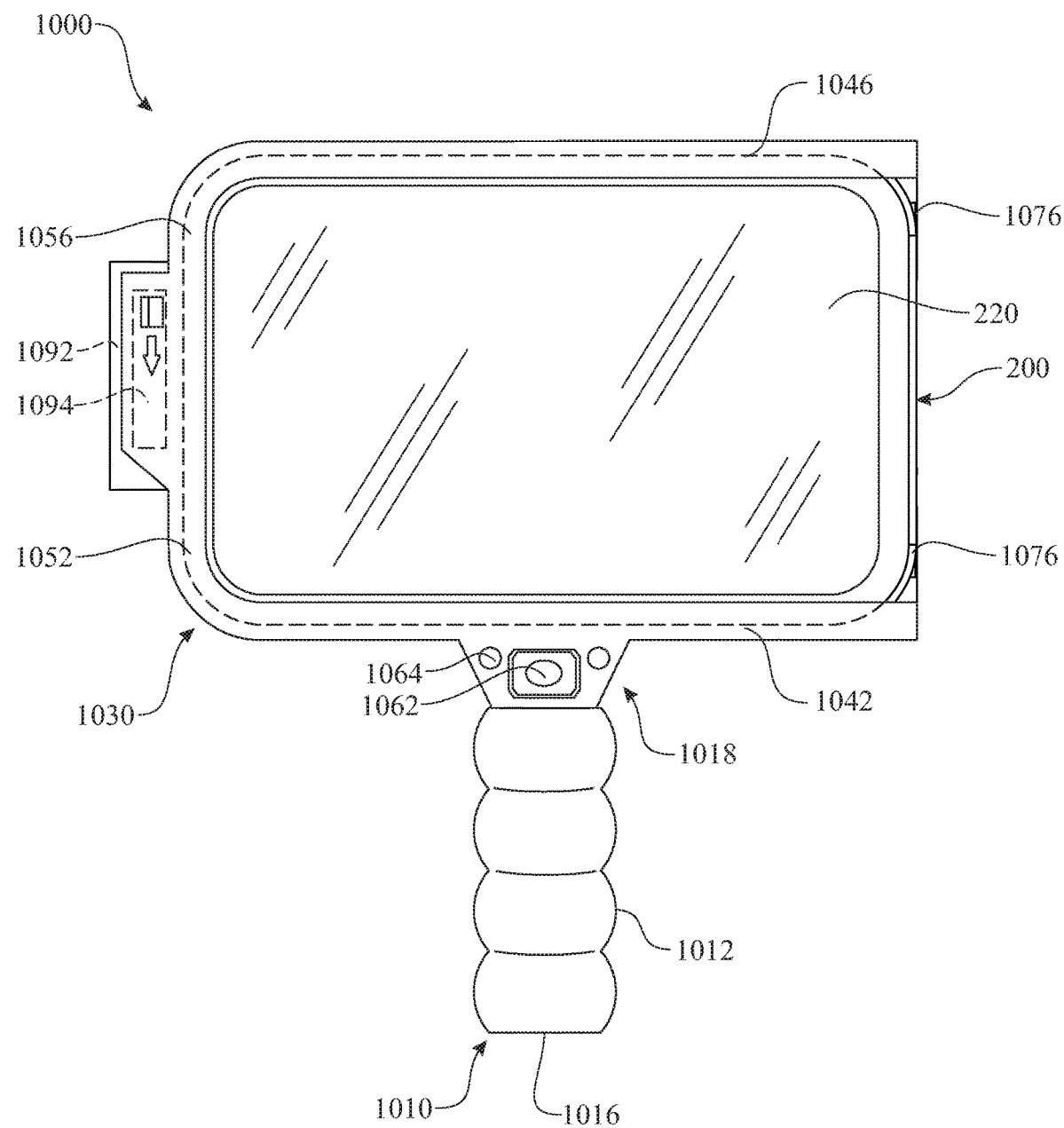
FIG. 28 presents a viewing side elevation view of yet another variant of the portable computing tablet holster originally introduced in FIG. 8, wherein the exemplary version introduces a magnetic strip reader, wherein the magnetic strip reader enables functionality such as a credit card processing feature.

The portable computing tablet holster can be adapted to acquire information from information cards. A portable computing tablet holster 1000, illustrated in FIG. 28, introduces an information card reading feature that can be incorporated into any of the variants disclosed herein. The exemplary portable computing tablet holster 1000 and the portable computing tablet holster 500 have a number of like features. Like features of the exemplary portable computing tablet holster 1000 and the portable computing tablet holster 500 are numbered the same except preceded by the numeral '10'. The exemplary information card reading feature 1092 includes an information card reading device 1094 embedded therein. The information card reading device 1094 would be determined by the type of card targeted for use in conjunction with the portable computing tablet holster 1000. The information card reading device 1094 can be a magnetic card reader, a near field card reader, a contact chip card reader, and the like.

The portable computing tablet holster can be adapted to receive portable computing devices of a variety of sizes, shapes, and thicknesses. A portable computing device holster 1100, illustrated in FIG. 29, introduces a portable computing device seating configuration that is suitable to receive a variety of portable computing devices 200, each having a different size, shape, and/or thickness. This can include the use of a portable computing device inserted into a protective case. The exemplary portable computing device holster 1100 and the portable computing tablet holster 800 have a number of like features. Like features of the exemplary portable computing device holster 1100 and the portable computing tablet holster 800 are numbered the same except preceded by the numeral '11'. The portable computing device holster 1100, illustrated in FIG. 29, further introduces a handle axial extension element 1117 enabling a user to change a distance between a distal, free, detached end 1116 of a handle 1112 and a location of the portable computing device 200. The motion provided by the handle axial extension element 1117 is referenced as an axial extending motion 1197. The handle axial extension element 1117 can also be rotationally assembled to the handle 1112, enabling a rotational motion 1192 of the portable computing device retention assembly 1130 respective to the handle assembly 1110.

Figure 29:
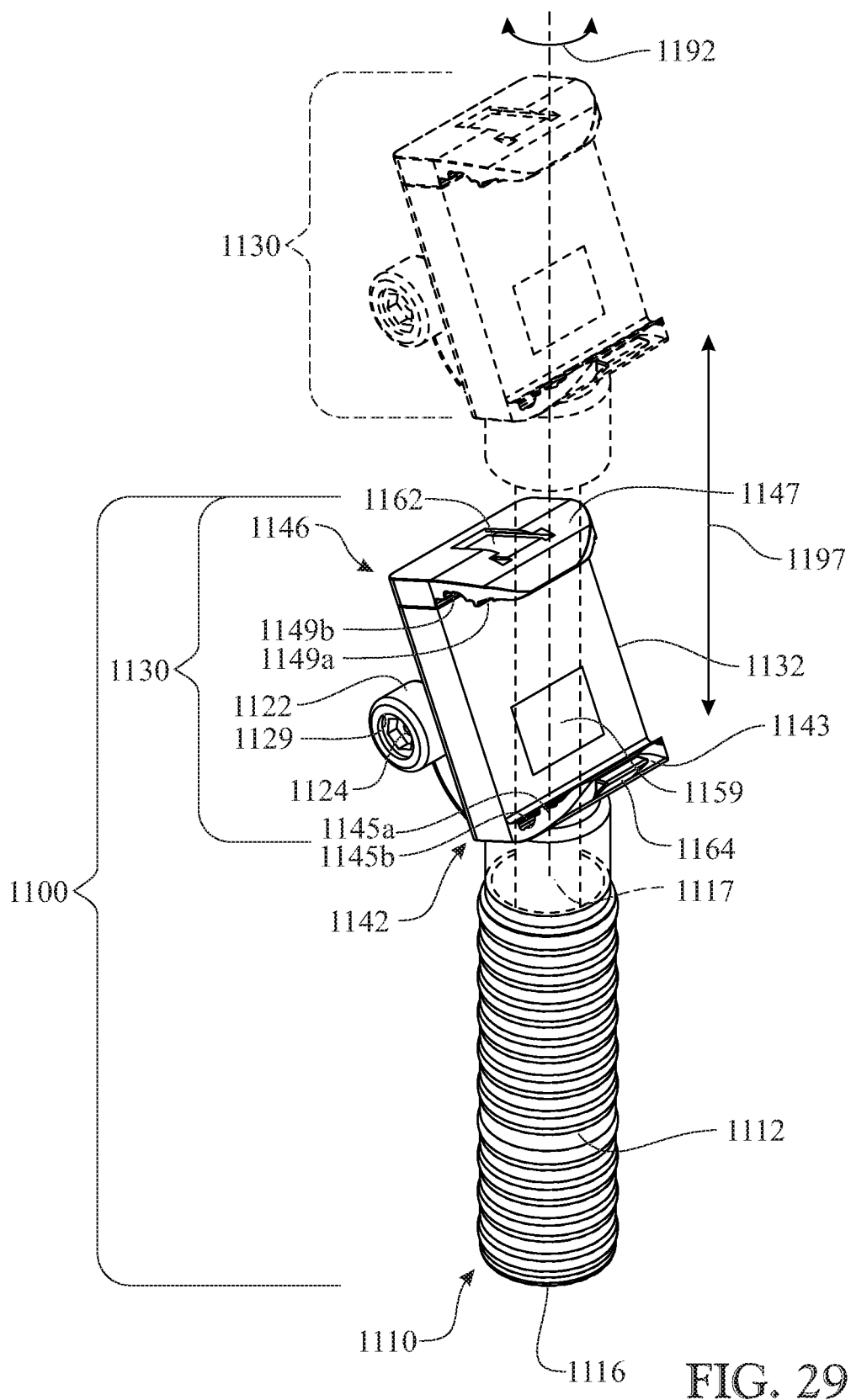
FIG. 29 presents an isometric assembly view of yet another variant of the portable computing device holster originally introduced in FIG. 8, wherein the exemplary version introduces a telescoping handle feature and a device adapting grip design.

The portable computing device holster 1100, illustrated in FIG. 29, further introduces a hot shoe 1162 for acceptance and use of electrically powered accessories.

Figure 30:
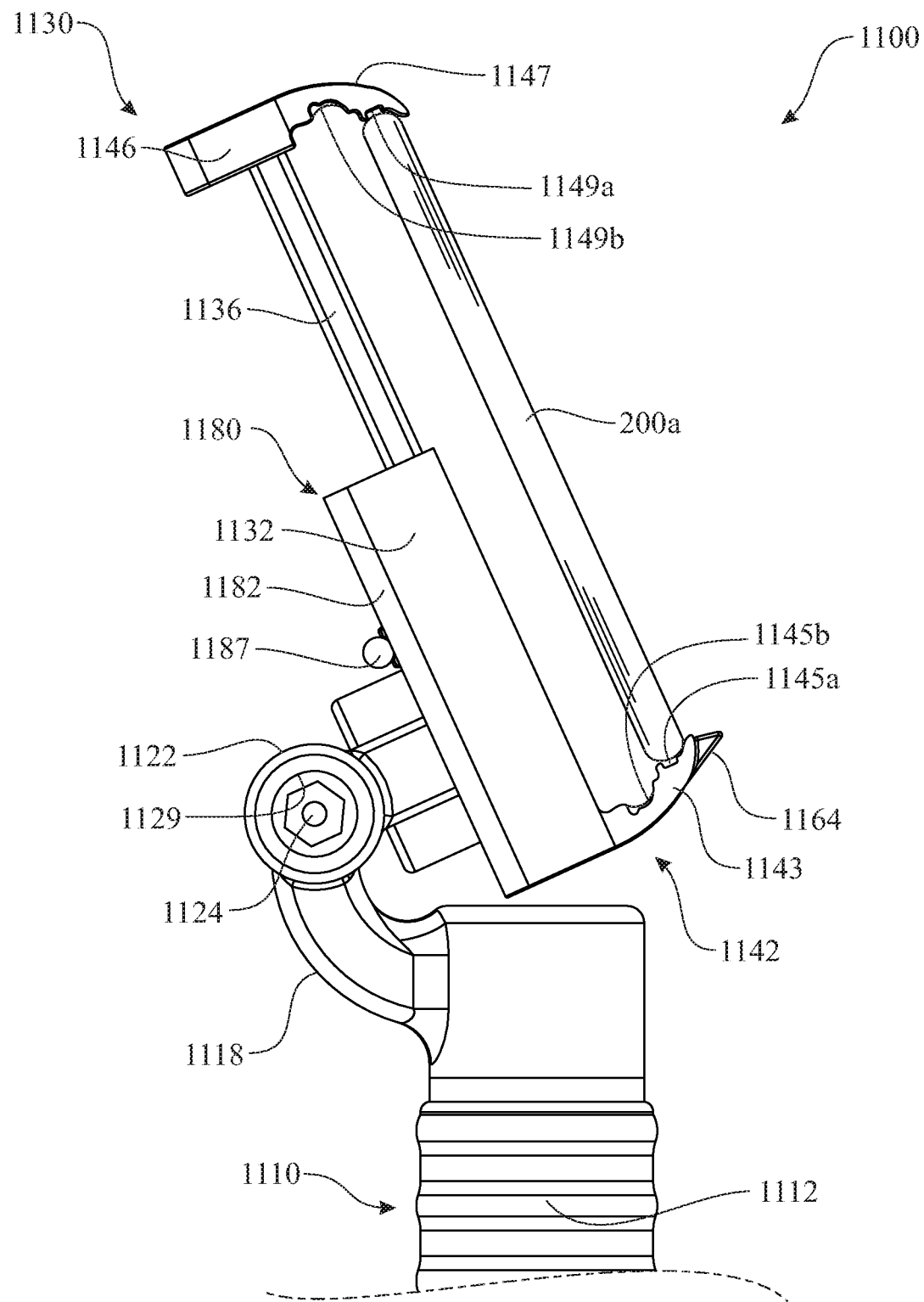
FIG. 30 presents a magnified side elevation view of the portable computing device holster originally introduced in FIG. 29, the illustration presenting a first, thin bodied portable computing device being carried by the holster.
Figure 31:
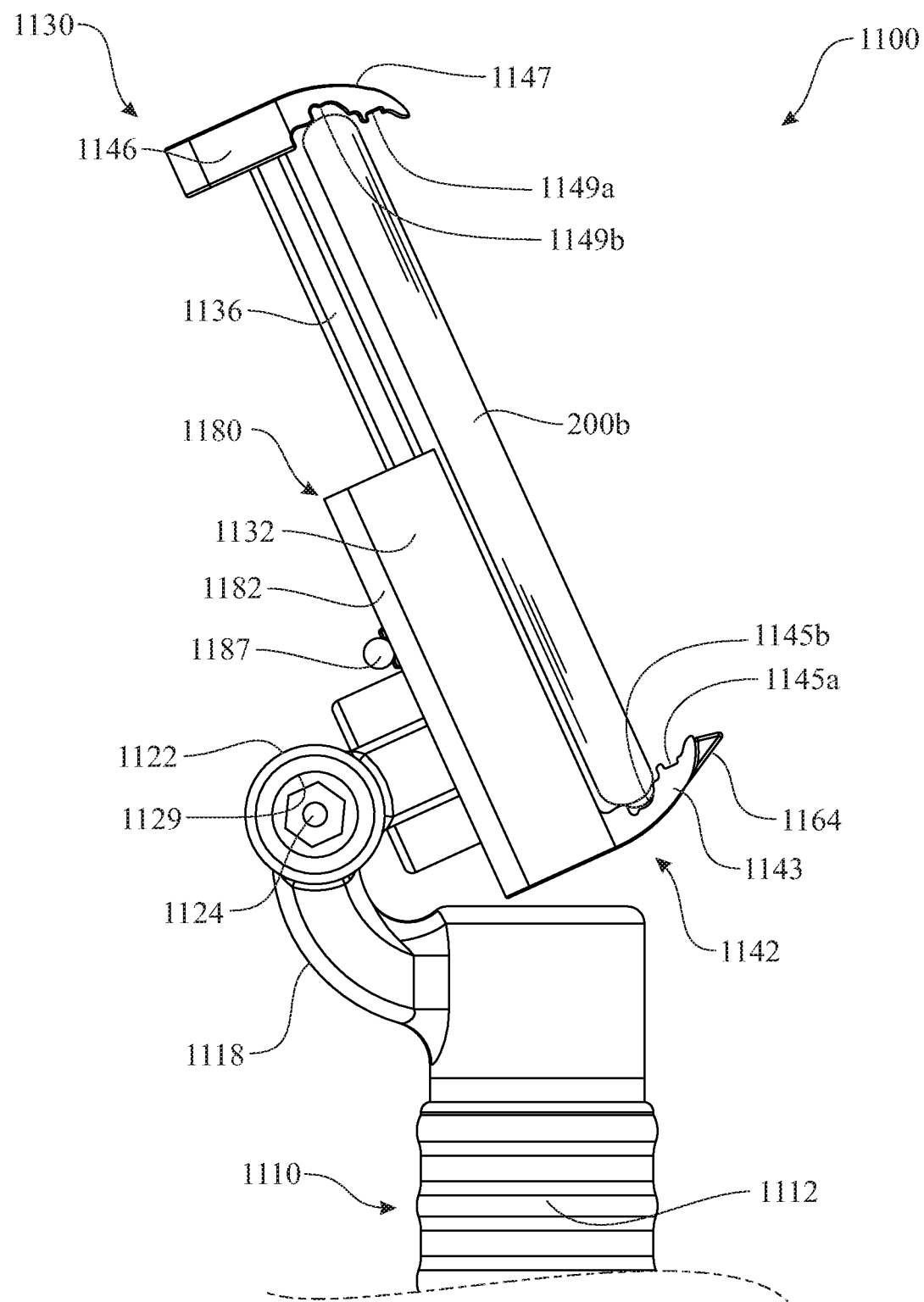
FIG. 31 presents a magnified side elevation view of the portable computing device holster originally introduced in FIG. 29, the illustration presenting a second, thicker bodied portable computing device being carried by the holster.
Figure 32:
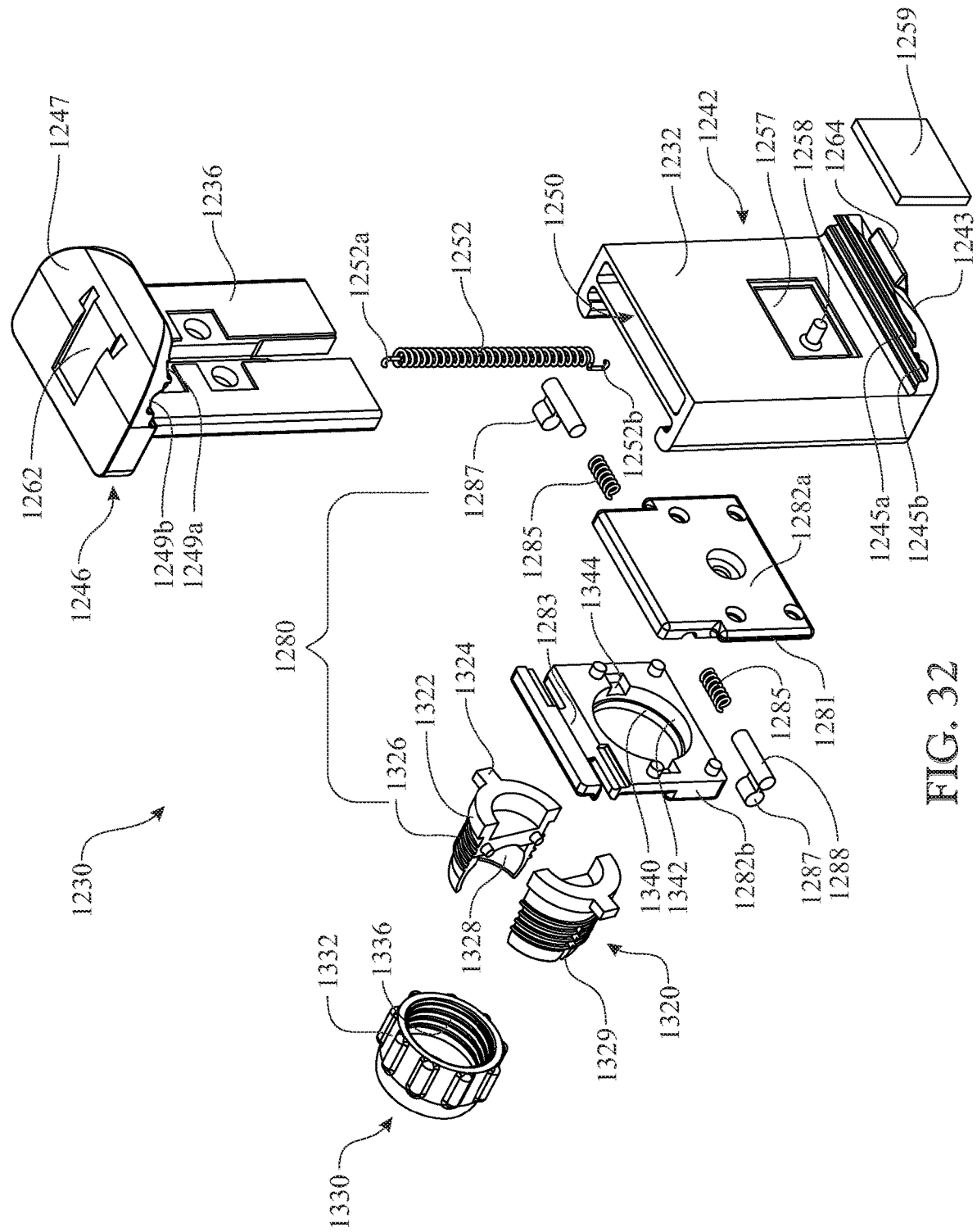
FIG. 32 presents an exploded isometric assembly view of a viewing side of yet another variant of the portable computing tablet holster originally introduced in FIG. 29, the variant being adapted for attachment to a gooseneck support assembly.

A base elongated retention element 1142 and a respectively paired distal elongated retention element 1146 can include a series of elongated retention element channel formations 1145a, 1145b, 1149a, 1149b to accommodate portable computing devices 200 of different sizes, shapes, and/or thicknesses, as illustrated in examples presented in FIGS. 30 and 31.

In FIG. 30, a thin bodied portable computing device 200a is placed into a first base elongated retention element channel formation 1145a and a respective paired first distal elongated retention element channel formation 1149a of a portable computing device retention assembly 1130 of the portable computing device holster 1100. The first base elongated retention element channel formation 1145a and respective paired first distal elongated retention element channel formation 1149a are sized and shaped for receiving and supporting a portable computing device 200 that has a thinner profile. The exemplary first base elongated retention element channel formation 1145a and respective paired first distal elongated retention element channel formation 1149a include a second recessed groove within a first recessed groove. The second recessed groove is narrower than the first recessed groove, enabling support for even thinner versions of the portable computing device 200.

In FIG. 31, a thick bodied portable computing device 200b is placed into a second base elongated retention element channel formation 1145b and a respective paired second distal elongated retention element channel formation 1149b of the portable computing device retention assembly 1130 of the portable computing device holster 1100. The second base elongated retention element channel formation 1145b and respective paired second distal elongated retention element channel formation 1149b are sized and shaped for receiving and supporting a portable computing device 200 that has a thicker profile. The exemplary second base elongated retention element channel formation 1145b and respective paired second distal elongated retention element channel formation 1149b include a second recessed groove within a first recessed groove. The second recessed groove is narrower than the first recessed groove, enabling support for even thicker versions of the portable computing device 200. The exemplary illustration additionally introduces a third recessed groove, which is narrower than the first recessed groove and the second recessed groove, enabling support for versions of the portable computing device 200 of other cross sectioned shapes and thicknesses.

The portable computing device holster 1100 introduces several electrically operated accessories. A first exemplary electrically operated accessory is a hot shoe 1162, which is provided in the distal elongated retention element 1146. Power is provided to the hot shoe 1162 from a portable power source stored in the handle 1112 or any other suitable location. Details of an exemplary power distribution system are presented in FIG. 43 and will be described at a later point within the specification.

Figure 44:
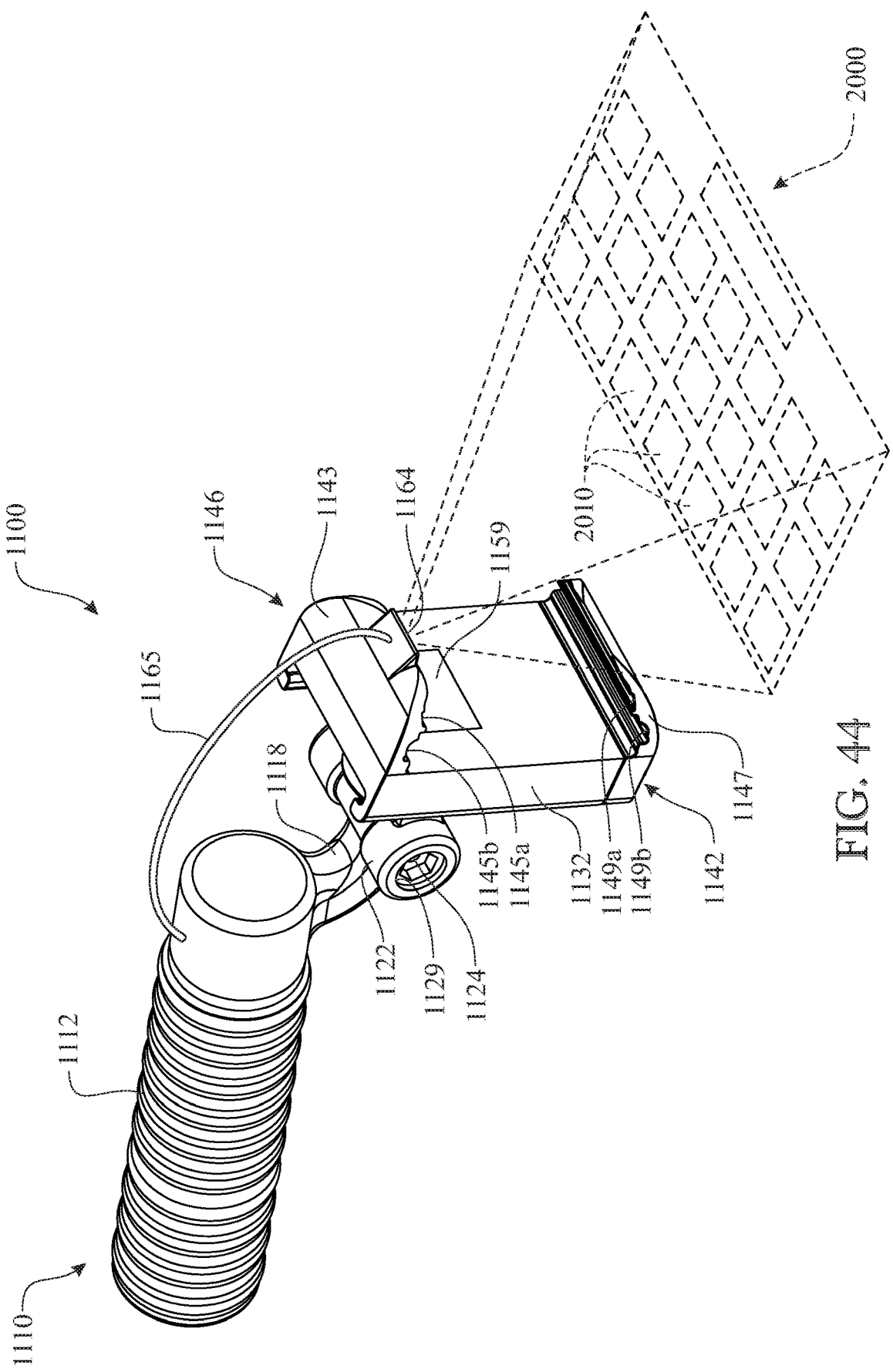
FIG. 44 presents an isometric view of the portable computing device holster originally introduced in FIG. 29, wherein the exemplary illustration presents a laser projection virtual keyboard in use.
Figure 45:
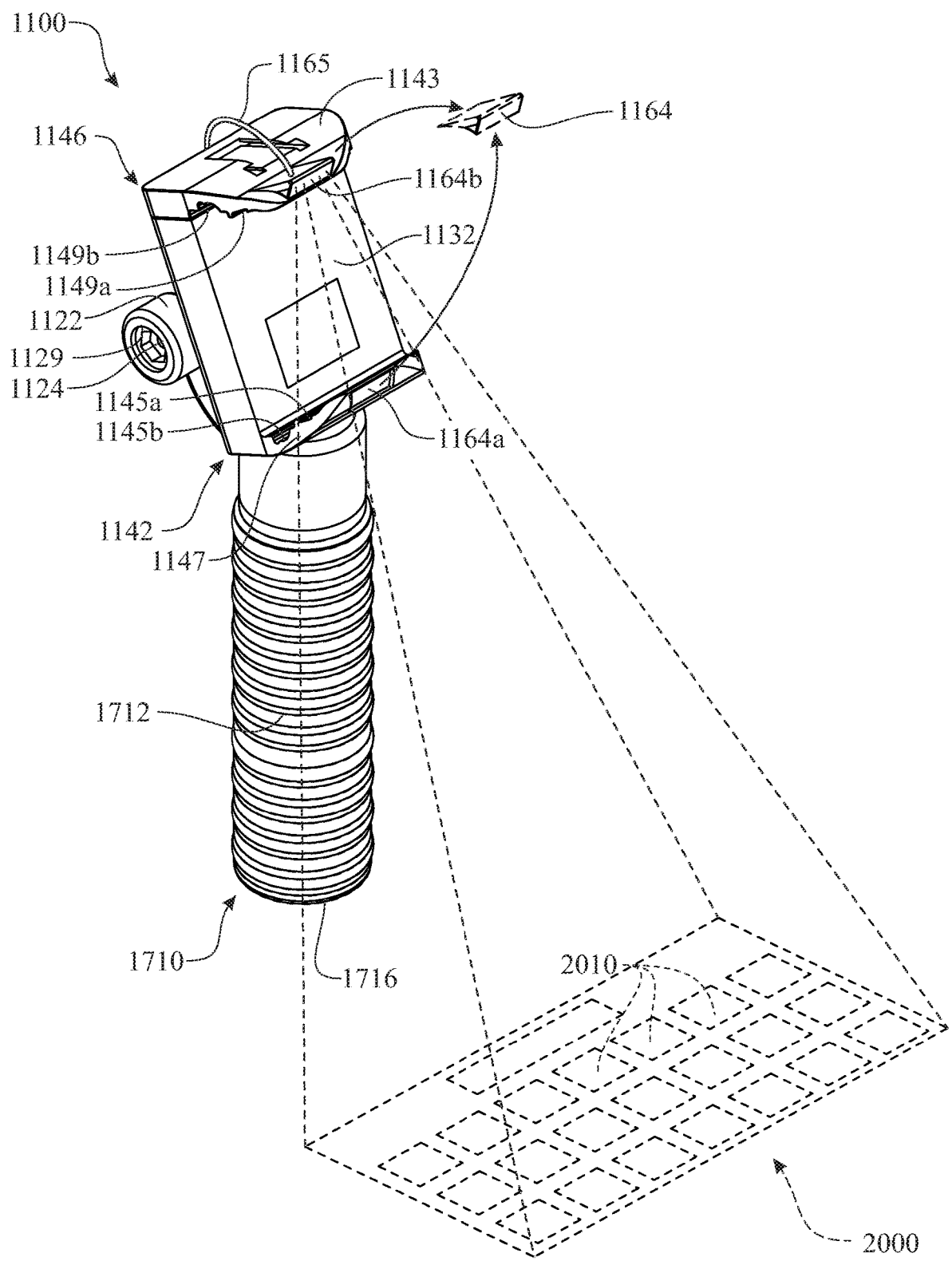
FIG. 45 presents an isometric view of a slightly modified variant of the portable computing device holster originally introduced in FIG. 29, wherein the exemplary illustration presents a repositionable option for the laser projection virtual keyboard.

A second exemplary electrically operated accessory is a laser projection virtual keyboard 1164, which can be provided on the base elongated retention element 1142 (as shown), provided on the distal elongated retention element 1146, or moveable between the base elongated retention element 1142 and the distal elongated retention element 1146, as shown in FIG. 45. Power is provided to the laser projection virtual keyboard 1164 from a portable power source stored in the handle 1112 or any other suitable location using a power distribution system. Details of an operation of the laser projection virtual keyboard 1164 are presented in FIGS. 44 and 45 and will be discussed at a later point within this specification.

The portable computing device retention assembly 1130 can be modified (described as a portable computing device retention assembly 1230) to be mounted upon a flexible gooseneck support system 1300, as illustrated in FIGS. 32 through 35. The exemplary portable computing device retention assembly 1230 and the portable computing device retention assembly 1130 have a number of like features. Like features of the exemplary portable computing device retention assembly 1230 and the portable computing device retention assembly 1130 are numbered the same except preceded by the numeral '12'. Details of the portable computing device retention assembly 1130, previously un-described, are better illustrated in the exploded assembly views of the portable computing device retention assembly 1230 illustrated in FIGS. 32 and 33.

A handle sliding mechanism 1280 is slideably assembled to a handle sliding mechanism receiving slot 1234 of a tablet rear support panel 1232. The sliding capability provided between the handle sliding mechanism 1280 and the tablet rear support panel 1232 enables the repositioning of the portable computing device 200 respective to a grip of a handle 1112 or any other suitable support element, such as a flexible gooseneck support arm subassembly 1310 of the flexible gooseneck support system 1300. A distal elongated retention element 1246 is slideably assembled to the tablet rear support panel 1232, enabling adaptation to grip portable computing devices 200 of different dimensions.

In more detail, the handle sliding mechanism 1280 includes a handle sliding mechanism body first portion 1282a and a mating handle sliding mechanism body second portion 1282*b*. An operating mechanism receiving slot 1283 is formed on each of facing surfaces of the handle sliding mechanism body first portion 1282*a* and the mating handle sliding mechanism body second portion 1282*b*.

A location retention element is slideably assembled to the handle sliding mechanism 1280. The handle sliding mechanism 1280 includes a pair of location retention elements. Each exemplary location retention element of the pair of location retention elements includes a handle sliding mechanism retention feature operating mechanism 1287 and a handle sliding mechanism retention feature 1288 spatially assembled to one another by a handle sliding mechanism retention feature connecting arm 1289.

The operating mechanism receiving slot 1283 slideably receives a first handle sliding mechanism retention feature 1288 and a second handle sliding mechanism retention feature 1288. The operating mechanism receiving slot 1283 also receives a first handle sliding mechanism retention feature biasing element 1285 and a second handle sliding mechanism retention feature biasing element 1285. Each handle sliding mechanism retention feature biasing element 1285 provides a restoration force to a respective handle sliding mechanism retention feature 1288. It is understood that the handle sliding mechanism retention feature biasing element 1285 can be a single component that engages with each of the first handle sliding mechanism retention feature 1288 and the second handle sliding mechanism retention feature 1288. Each handle sliding mechanism retention feature operating mechanism 1287 extends outside of the handle sliding mechanism body 1282, providing suitable clearance for contact with a finger of a user. The handle sliding mechanism retention feature connecting arm 1289 would be located passing through an operating mechanism receiving slot 1283, wherein the operating mechanism clearance slot 1283*a* is in alignment with the operating mechanism receiving slot 1283.

The distal elongated retention element 1246 includes a rear panel expansion sliding element 1236 extending generally perpendicularly from a bottom surface of a distal elongated retention element channel base segment 1247. A first distal elongated retention element channel formation 1249*a* and a second distal elongated retention element channel formation 1249*b* are formed within a gripping surface of the distal elongated retention element channel base segment 1247. A hot shoe 1262 can be provided in an exterior region of the distal elongated retention element channel base segment 1247. A clearance is provided in the rear panel expansion sliding element 1236 for a computing device retention force application tension biasing element 1252. A base elongated retention element 1242 includes a tablet rear support panel 1232 extending generally perpendicularly from a top surface of a base elongated retention element channel base segment 1243. A rear panel expansion sliding element 1250 is formed extending inward from a distal edge of the tablet rear support panel 1232. The rear panel expansion sliding element 1250 is shaped and sized to slideably receive the rear panel expansion sliding element 1236. A biasing element attachment point access cavity 1257 is formed at an end of the tablet rear support panel 1232 proximate the base elongated retention element channel base segment 1243. A biasing element attachment point 1258 is accessible by the biasing element attachment point access cavity 1257. The exemplary biasing element attachment point 1258 is a pin extending outward from a rear surface of the biasing element attachment point access cavity 1257.

The tablet rear support panel 1232 includes a rear panel expansion sliding element 1250 extending inward or downward from a distal edge. A handle sliding mechanism receiving slot 1234 is formed in a non-viewing side of the tablet rear support panel 1232. A handle sliding mechanism receiving edge channel 1235 is formed along each longitudinal side of the handle sliding mechanism receiving slot 1234. The handle sliding mechanism receiving edge channel 1235 is sized and shaped to receive a respective edge of the handle sliding mechanism body 1282. In the exemplary embodiment, a handle sliding mechanism movement guide 1281 is formed along each sliding edge of the handle sliding mechanism body 1282. A series of handle sliding mechanism detent lateral bores 1238 are formed in the handle sliding mechanism receiving edge channel 1235, where the handle sliding mechanism detent lateral bores 1238 are spatially arranged to receive an exposed end of the respective handle sliding mechanism retention feature 1288.

During assembly, the assembler would secure a computing device retention force application tension biasing element distal attachment end 1252*a* of the computing device retention force application tension biasing element 1252 to an attachment feature formed within or provided on the rear panel expansion sliding element 1236. The rear panel expansion sliding element 1236 would be slideably inserted into the rear panel expansion sliding element 1250. The computing device retention force application tension biasing element proximal attachment end 1252*b* would be secured to the biasing element attachment point 1258. The biasing element attachment point 1258 can be of any suitable design, including a pin (as shown), a ring, a clip, and the like. It is noted that a tension is preferably applied to the computing device retention force application tension biasing element 1252 to ensure that the computing device retention force application tension biasing element 1252 remains in tension at all times, drawing the base elongated retention element channel base segment 1243 and the distal elongated retention element channel base segment 1247 towards one another, thus providing a clamping force to a portable computing device 200 when inserted between the base elongated retention element channel base segment 1243 and the distal elongated retention element channel base segment 1247. A biasing element cavity cover member 1259 can be assembled to the tablet rear support panel 1232, concealing the biasing element attachment point access cavity 1257.

Each of the pair of handle sliding mechanism retention features 1288 is retracted against a restoration force provided by the handle sliding mechanism retention feature biasing elements 1285. The handle sliding mechanism 1280 is slideably assembled to the handle sliding mechanism receiving slot 1234. A handle sliding mechanism movement guide 1281 is provided on each edge of the handle sliding mechanism body 1282. Each handle sliding mechanism movement guide 1281 is slideably inserted into a respective handle sliding mechanism receiving edge channel 1235.

Electrical power can be transferred using wires. The conductive wires can be routed to the hot shoe 1262 through a hollow section of the rear panel expansion sliding element 1236. Similarly, the wires can be routed to the laser projection virtual keyboard 1264 though the open cavity within the rear panel expansion sliding element 1250.

A conductive material can be placed within each 1235. Similarly, a conductive material can be applied to an exterior surface of each handle sliding mechanism movement guide 1281. This can enable conduction of electricity using the sliding engagement between the handle sliding mechanism movement guide 1281 and the handle sliding mechanism receiving edge channel 1235. At least one of the handle sliding mechanism movement guide 1281 and the handle sliding mechanism receiving edge channel 1235 can include a biasing element to ensure consistent and reliable electrical contact between the handle sliding mechanism movement guide 1281 and the handle sliding mechanism receiving edge channel 1235.

Figure 33:
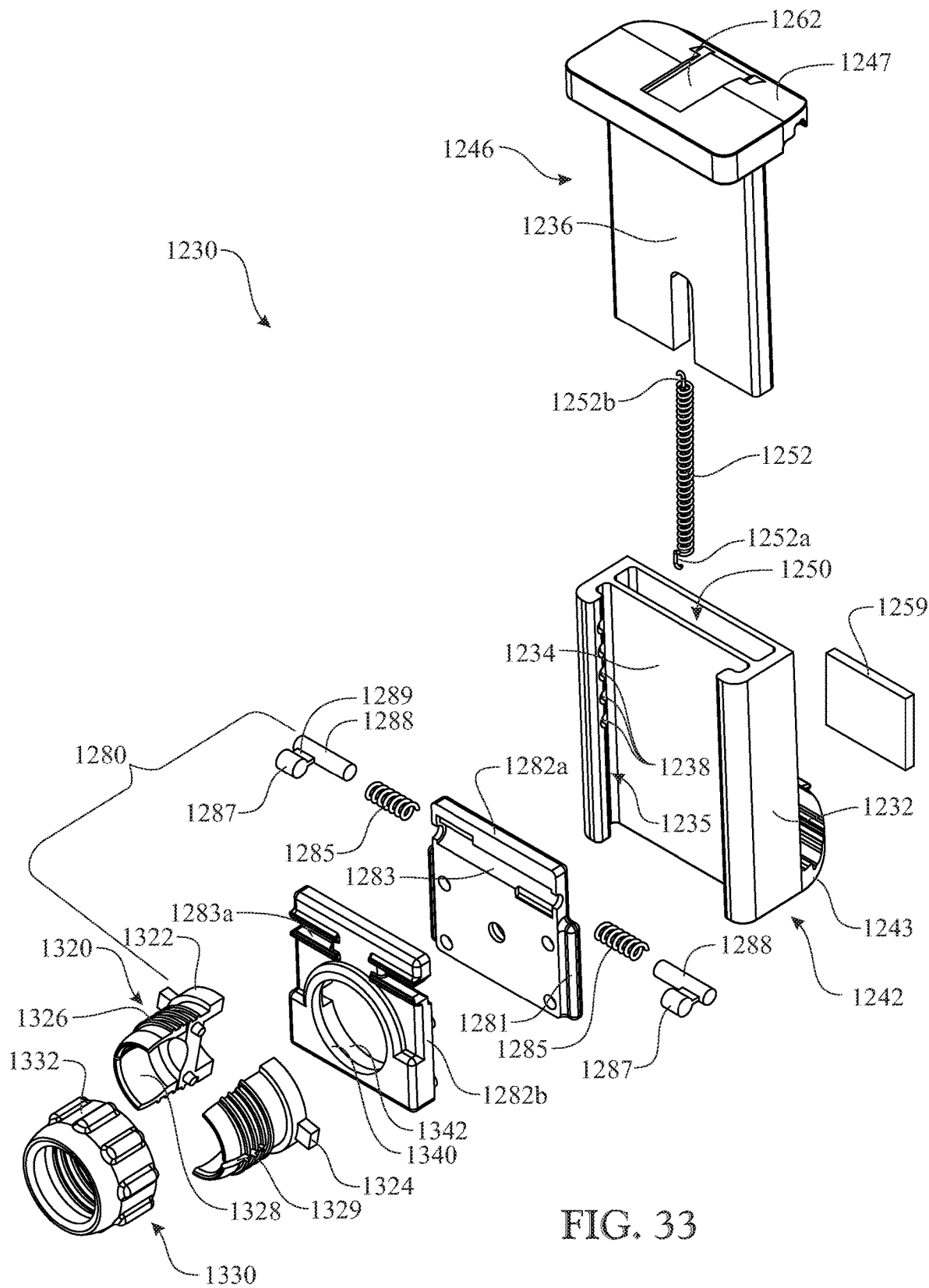
FIG. 33 presents an exploded isometric assembly view of a non-viewing side of the variant of the portable computing tablet holster originally introduced in FIG. 32.
Figure 34:
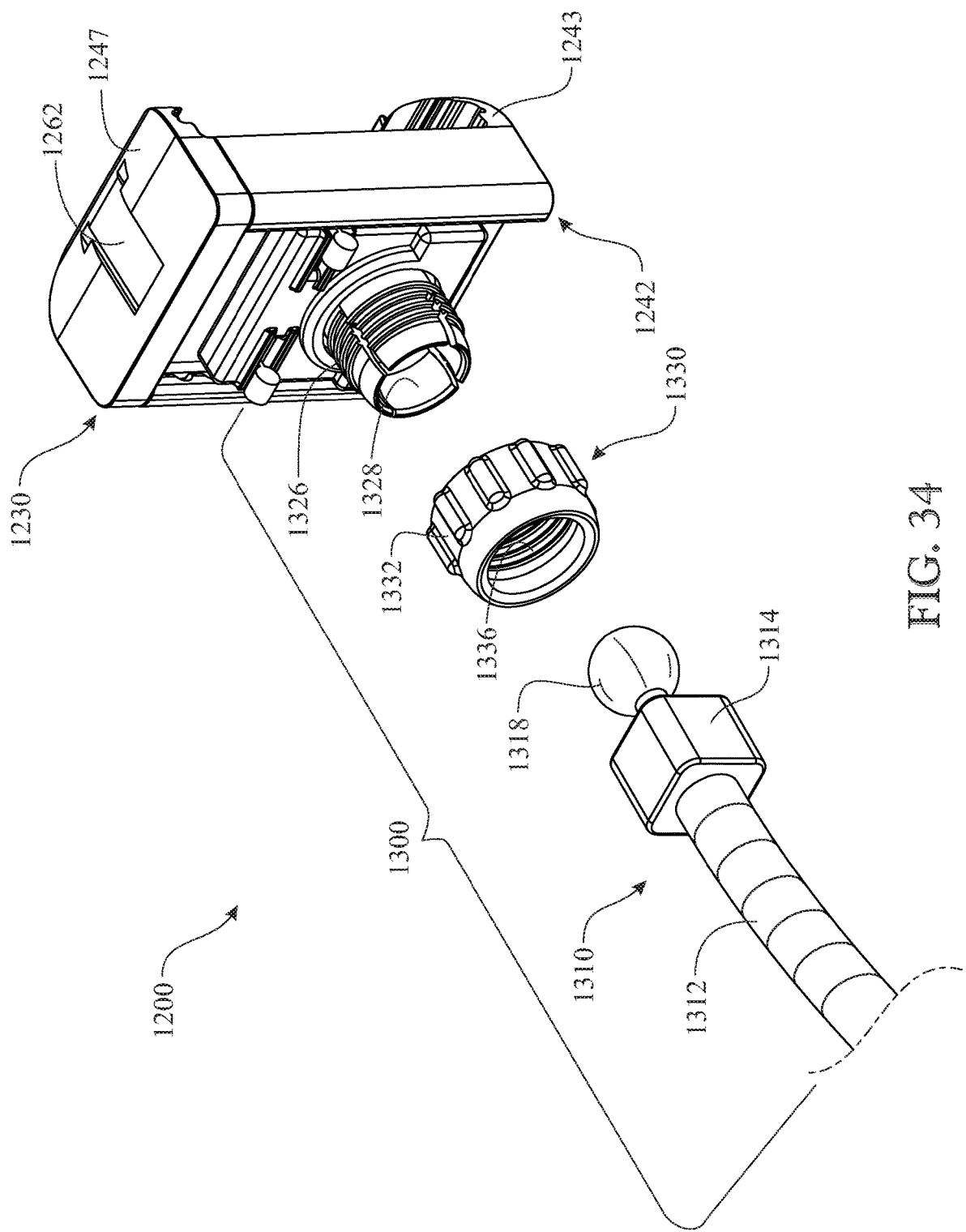
FIG. 34 presents a partially exploded isometric assembly view of a non-viewing side of the variant of the portable computing tablet holster originally introduced in FIG. 32, the illustration introducing the gooseneck support assembly.
Figure 35:
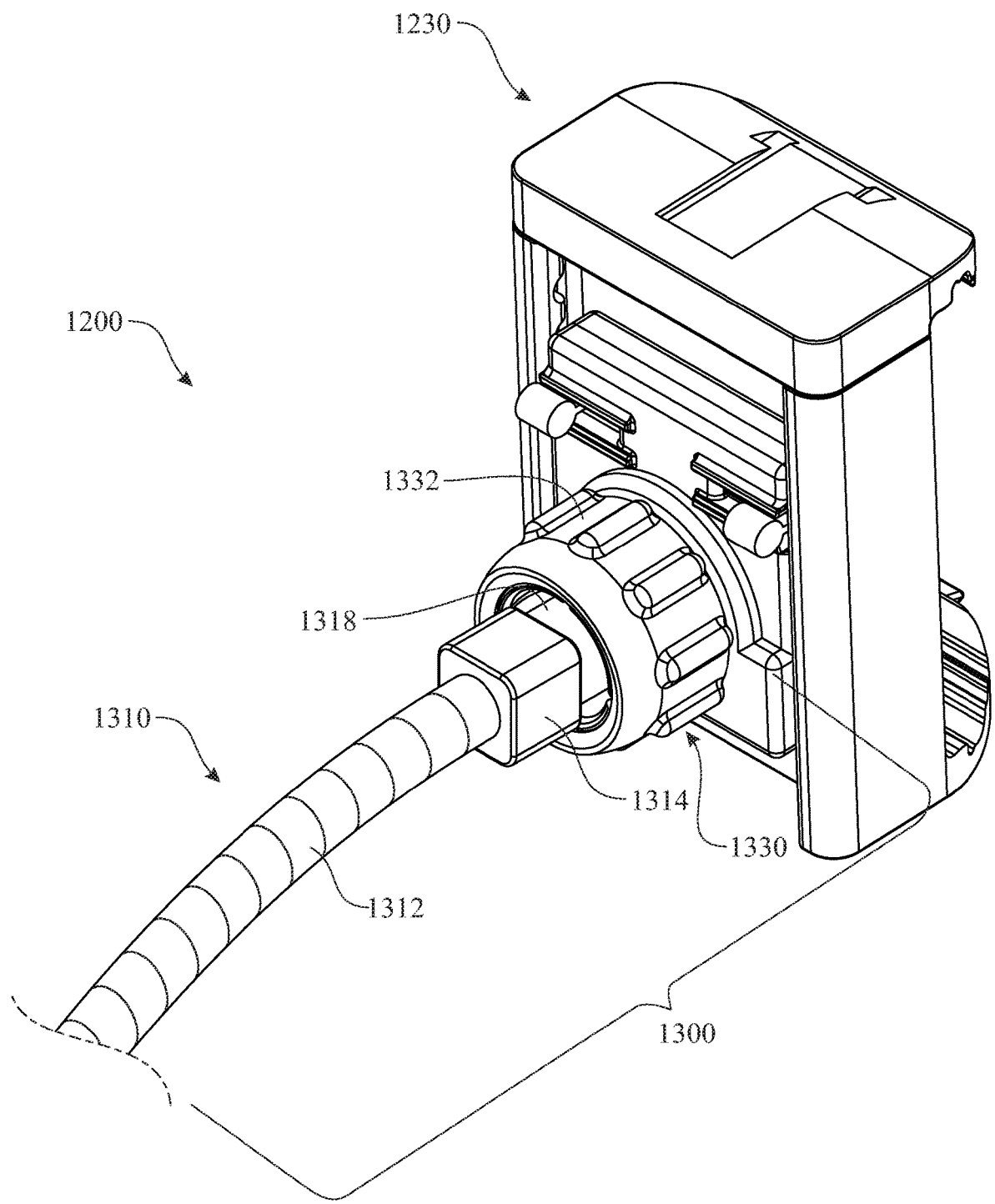
FIG. 35 presents an isometric assembly view of a non-viewing side of the variant of the portable computing tablet holster originally introduced in FIG. 32, the illustration presenting a portable computing device retention assembly assembled to the gooseneck support assembly.

A gooseneck ball clamping component 1320, consisting of two like, mating elements, is assembled through a gooseneck ball clamping component assembly receiving aperture 1340 of the handle sliding mechanism body second portion 1282*b* of the handle sliding mechanism body 1282. The a gooseneck ball clamping component 1320 includes a gooseneck ball clamping component assembly flange 1322, wherein a diameter of the gooseneck ball clamping component assembly flange 1322 is larger than a diameter of an exposed, threaded portion gooseneck ball clamping component cap receiving threading 1326 of the gooseneck ball clamping component 1320. At least one gooseneck ball clamping component orientation feature 1324 can be formed as a feature within or extending from the gooseneck ball clamping component assembly flange 1322. Since the exemplary gooseneck ball clamping component 1320 includes a pair of like elements, the complete gooseneck ball clamping component assembly flange 1322 includes a pair of gooseneck ball clamping component orientation features 1324. A gooseneck ball clamping component assembly flange receptacle 1342 is formed on an interior side of the handle sliding mechanism body second portion 1282*b*. A like number of gooseneck ball clamping component orientation feature receptacle 1344 is/are formed on the interior side of the handle sliding mechanism body second portion 1282*b*, wherein each of the like number of gooseneck ball clamping component orientation feature receptacles 1344 are located to position the gooseneck ball clamping component 1320 in a desired orientation, as best shown in FIG. 33.

The pair of mating like gooseneck ball clamping components 1320 are joined to one another using any suitable joining method. In the exemplary embodiment, the gooseneck ball clamping component 1320 are joined using a pin and receptacle interface. The joined pair of like gooseneck ball clamping components 1320 is inserted through the gooseneck ball clamping component assembly receiving aperture 1340. The gooseneck ball clamping component assembly receiving aperture 1340 retains the pair of like gooseneck ball clamping components 1320 in an assembled configuration. A gooseneck ball clamping component cap receiving threading 1326 is formed circumscribing an exterior surface of the joined pair of like gooseneck ball clamping components 1320. A gooseneck ball clamping component ball receiving socket 1328 is formed on an interior surface of the joined pair of like gooseneck ball clamping components 1320. A gooseneck ball receiving socket compression gap 1329 segments the gooseneck ball clamping component ball receiving socket 1328 into multiple segments, allowing compressibility of the gooseneck ball clamping component ball receiving socket 1328.

A gooseneck ball clamping component compression nut 1330 includes a gooseneck ball receiving socket compression nut threading 1336 formed on an interior surface. The gooseneck ball receiving socket compression nut threading 1336 is shaped and sized to mate with the gooseneck ball clamping component cap receiving threading 1326 of the gooseneck ball clamping component 1320. A distal interior surface of the gooseneck ball clamping component compression nut 1330 can engage with a like distal exterior surface of the gooseneck ball clamping component 1320 creating a compression force. A knurled grip compression nut section 1332 can be provided about a circumferential exterior surface to aid the user in gripping the gooseneck ball clamping component compression nut 1330 during assembly and removal of the gooseneck ball clamping component compression nut 1330 onto and from the gooseneck ball clamping component 1320.

The gooseneck ball clamping component 1320 is designed to be assembled to a flexible gooseneck support arm subassembly 1310. The flexible gooseneck support arm subassembly 1310 includes a flexible gooseneck support arm attachment ball 1318 located at a distal, free end of a flexible gooseneck support arm 1312. A flexible gooseneck support arm distal end component 1314 can be provided to assemble the flexible gooseneck support arm attachment ball 1318 to the distal, free end of the flexible gooseneck support arm 1312. The flexible gooseneck support arm 1312 is fabricated in a manner enabling the flexible gooseneck support arm 1312 to flex or change shape, while retaining the shape during use. An opposite end of the flexible gooseneck support arm subassembly 1310 can include a mounting element (not shown). Exemplary mounting elements can include a flange, a mounting bracket, a clamp, and the like.

It is preferred that a bore of the gooseneck ball clamping component compression nut 1330 is sized to slide over the flexible gooseneck support arm attachment ball 1318 and the flexible gooseneck support arm distal end component 1314. During assembly, the gooseneck ball clamping component compression nut 1330 would be placed over the flexible gooseneck support arm attachment ball 1318 of the flexible gooseneck support arm subassembly 1310. The flexible gooseneck support arm attachment ball 1318 is inserted into the gooseneck ball clamping component ball receiving socket 1328. The gooseneck ball receiving socket compression nut threading 1336 of the gooseneck ball clamping component compression nut 1330 threadably engages with the gooseneck ball clamping component cap receiving threading 1326 of the gooseneck ball clamping component 1320. As the gooseneck ball clamping component compression nut 1330 is tightened upon the gooseneck ball clamping component 1320, the interior surface of the gooseneck ball clamping component compression nut 1330 causes the gooseneck ball clamping component ball receiving socket 1328 to compress. The compression creates a retention force upon the flexible gooseneck support arm attachment ball 1318. The retention force retains the portable computing device retention assembly 1230 in a desired, set orientation respective to the flexible gooseneck support arm 1312.

Figure 36:
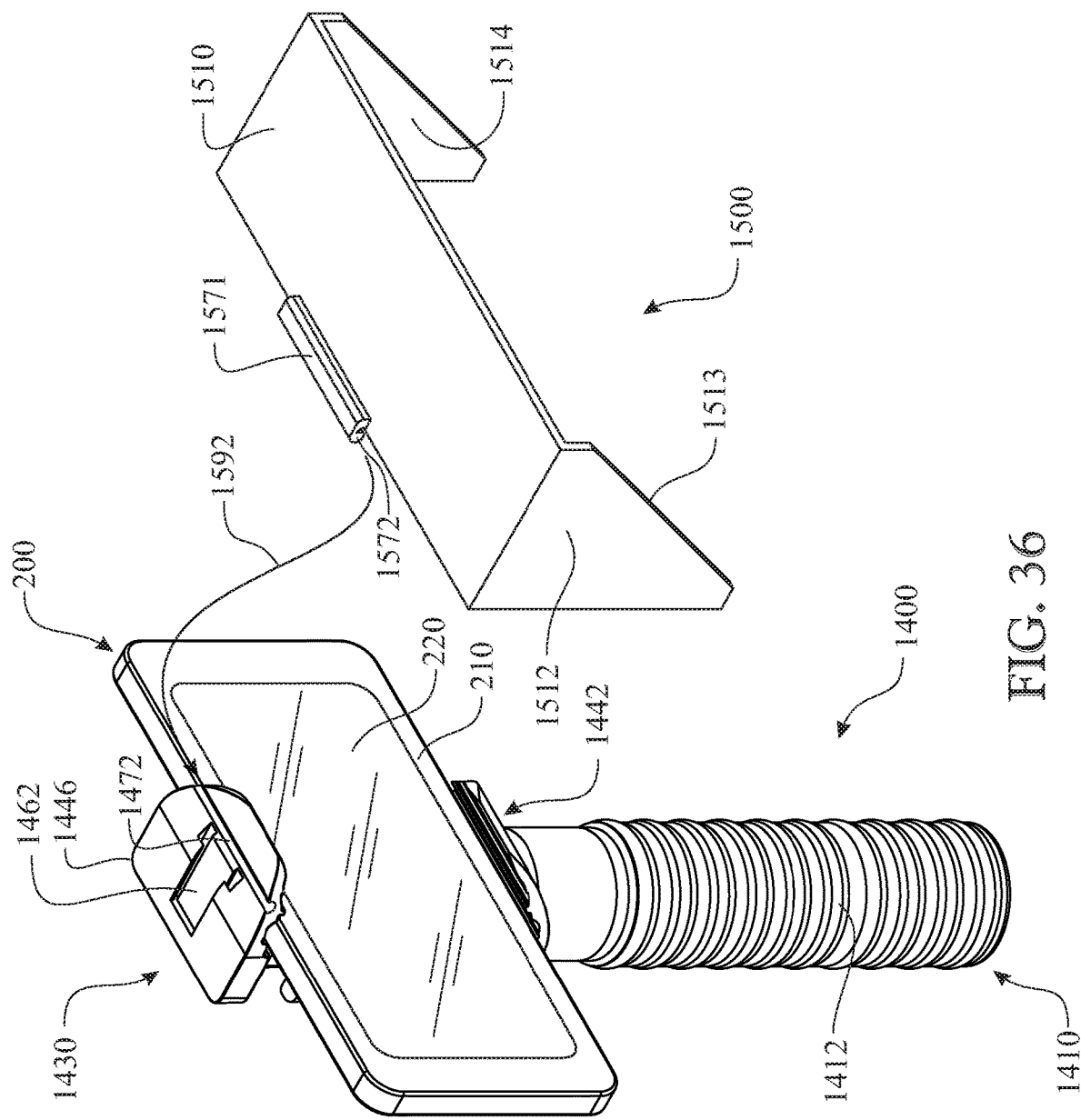
FIG. 36 presents an exploded isometric assembly view of a viewing side view of an accessory being assembled to a slightly modified variant of the portable computing tablet holster originally introduced in FIG. 29, the variant being adapted for receiving a screen display shade accessory.
Figure 37:
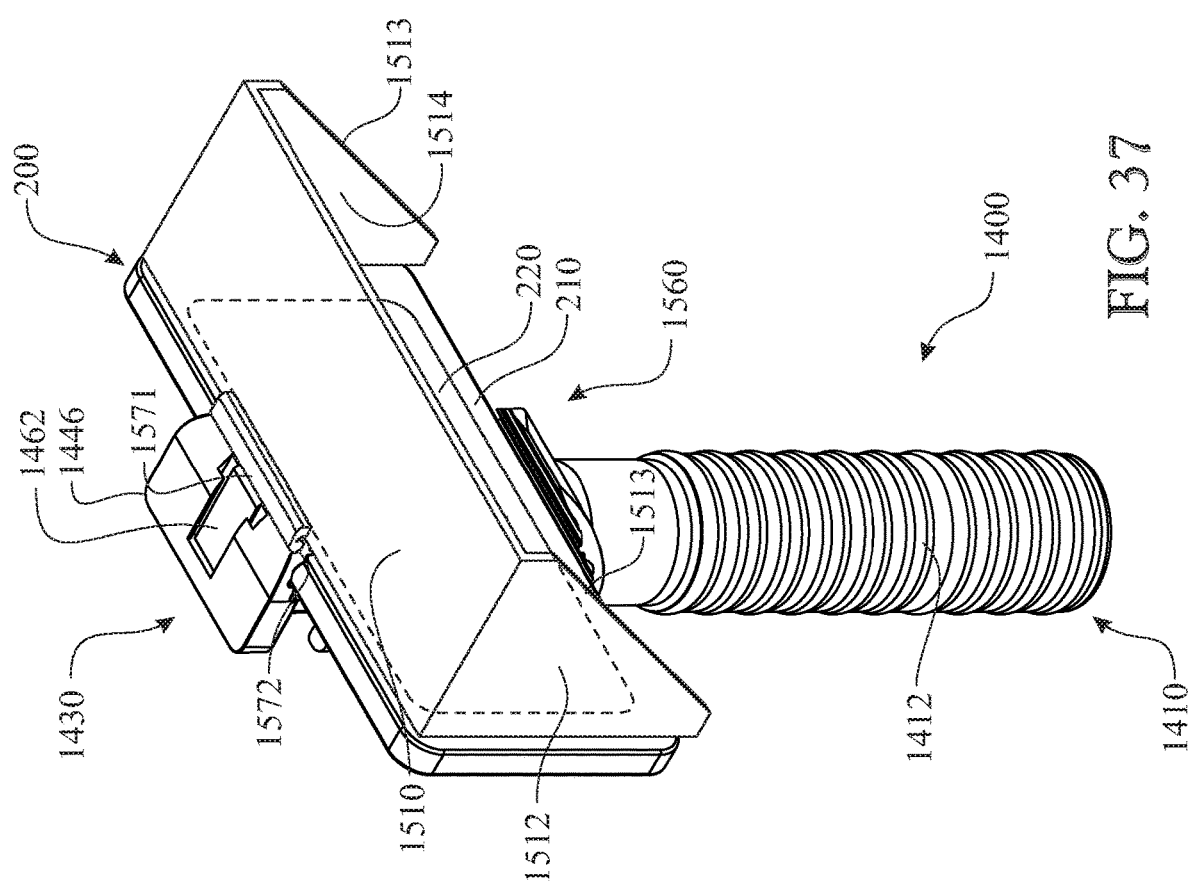
FIG. 37 presents an isometric assembly view of the viewing side view of the portable computing device retention assembly and screen display shade accessory combination introduced in FIG. 36, the illustration presenting a configuration having the screen display shade accessory assembled to the portable computing device retention assembly.

A screen display shade accessory 1500 can be provided for use with a portable computing device holster 1400, as illustrated in FIGS. 36 and 37. The portable computing device holster 1400 is a modified variant of the portable computing device holster 1100. The exemplary portable computing device holster 1400 and the portable computing tablet holster 1100 have a number of like features. Like features of the exemplary portable computing device holster 1400 and the portable computing tablet holster 1100 are numbered the same except preceded by the numeral '14'. The portable computing device holster 1400, further introduces a shadow box attachment groove 1472 enabling a user to temporarily install the screen display shade accessory 1500. The shadow box attachment groove 1472 is formed in a distal elongated retention element 1446.

The screen display shade accessory 1500 provides a screen display shade accessory top panel 1510 and a pair of side panels 1512, 1514 to block light from the touch screen 220 of the portable computing device 200. Each side panel 1512, 1514 extends generally perpendicularly from a respective lateral edge of the screen display shade accessory top panel 1510. Each side panel 1512, 1514 can be shaped having a screen display shade accessory side panel tapered edge 1513. The screen display shade accessory side panel tapered edge 1513 has a widest edge located proximate the screen display shade accessory top panel 1510 and tapering to a shorter edge as the screen display shade accessory side panel tapered edge 1513 continues towards a free, lower edge. In an alternative design, the screen display shade accessory side panel tapered edge 1513 can be parallel to a rear edge, wherein the side panels 1512, 1514 would be rectangular in shape. A screen display shade accessory attachment extrusion 1572 is provided on the screen display shade accessory top panel 1510 in any suitable configuration. In the exemplary illustration, the screen display shade accessory attachment extrusion 1572 is formed as a part of the screen display shade accessory attachment element 1571. The screen display shade accessory attachment element 1571 is attached to the screen display shade accessory top panel 1510. The screen display shade accessory attachment extrusion 1572 can alternatively be unitarily integrated into the screen display shade accessory 1500.

The shadow box attachment groove 1472 is preferably shaped and sized to slideably receive the screen display shade accessory attachment extrusion 1572. Additionally, the shadow box attachment groove 1472 can be shaped and sized to ensure the screen display shade accessory attachment extrusion 1572 is restricted to a linear sliding motion. Alternatively, the shadow box attachment groove 1472 can be rounded, further enabling the screen display shade accessory attachment extrusion 1572 to pivot within the shadow box attachment groove 1472, acting as a hinge.

A gasket material can be provided along a contacting edge of the screen display shade accessory top panel 1510 and optionally along the same contacting edges of the screen display shade accessory first side panel 1512 and the screen display shade accessory second side panel 1514. An elastic element, a ribbon, or any other suitable element can be used to retain a lower edge of the screen display shade accessory 1500 against the portable computing device 200. In one example, an elastic material can extend between a lower edge of the screen display shade accessory first side panel 1512 and a lower edge of the screen display shade accessory second side panel 1514. The elastic material would be routed around a rear of the portable computing device holster 1400. The elastic material would retain the lower edge of the screen display shade accessory 1500 against the portable computing device 200.

During use, the screen display shade accessory 1500 would be assembled to the portable computing device holster 1400 by sliding the screen display shade accessory attachment extrusion 1572 into the shadow box attachment groove 1472, in accordance with a screen display shade accessory assembly motion 1592, as shown in FIG. 37. The screen display shade accessory top panel 1510 and the side panels 1512, 1514 provide a shade to the touch screen 220 of the portable computing device 200 held by the portable computing device holster 1400.

It is understood that the screen display shade accessory 1500 could be customized for the dimensions of the portable computing device 200. Alternatively, the screen display shade accessory 1500 can include adjustable features, enabling the screen display shade accessory 1500 to be adjustably sized to fit the portable computing device 200.

A hot shoe 1462 can be utilized for any of a number of electrically powered accessories. Examples of several electrically powered accessories are presented in FIGS. 38 through 41.

Figure 38:
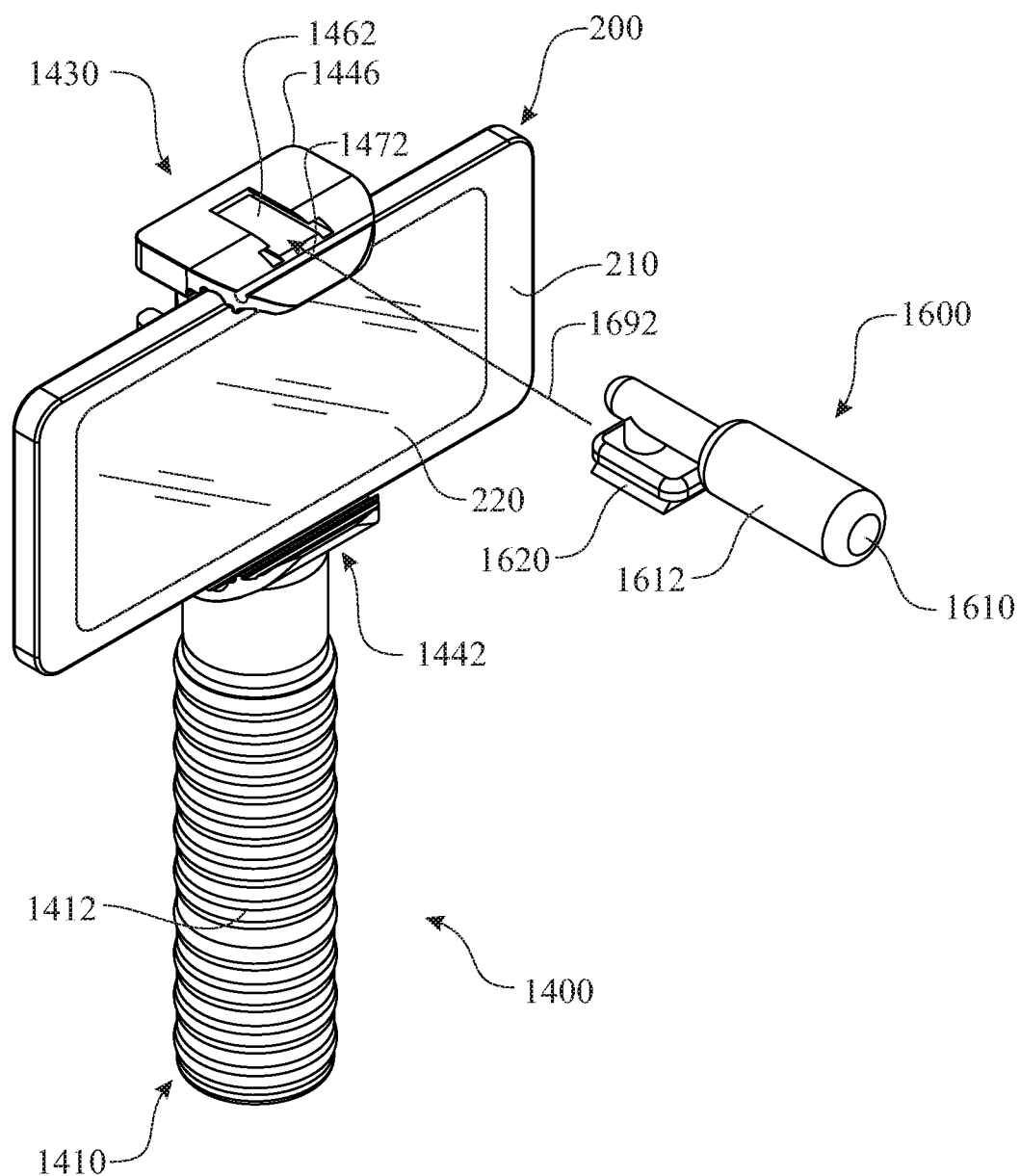
FIG. 38 presents an exploded isometric assembly view of a viewing side view of an accessory being assembled to a hot shoe of the variant of the portable computing tablet holster originally introduced in FIG. 36, the accessory being a microphone.
Figure 39:
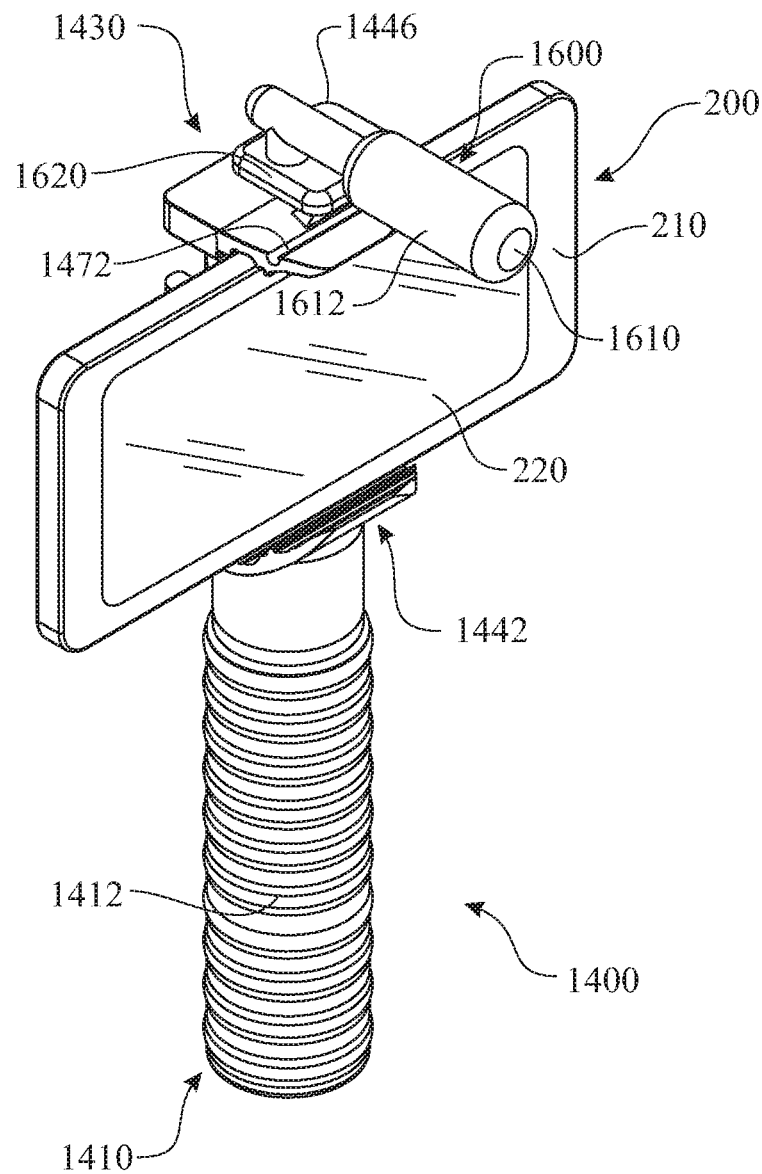
FIG. 39 presents an isometric assembly view of the viewing side view of the portable computing device retention assembly and microphone accessory combination introduced in FIG. 38, the illustration presenting a configuration having the microphone accessory assembled to the hot shoe of portable computing device retention assembly.

A microphone assembly 1600 includes a microphone 1610 supported by a microphone boom 1612, as shown in FIGS. 38 and 39. The microphone boom 1612 is supported by a microphone electro-mechanical coupler 1620. Power is provided to the microphone 1610 through the microphone electro-mechanical coupler 1620. The microphone assembly 1600 is assembled to the portable computing device holster 1400 by sliding the microphone electro-mechanical coupler 1620 into the hot shoe 1462, in accordance with a microphone assembly motion 1692, as shown in FIG. 38. The microphone 1610 can be in signal communication with the portable computing device 200 using a wired connection or using a Bluetooth wireless connection. A Bluetooth wireless transceiver can be integrated into the microphone assembly 1600 or a portion of the portable computing device holster 1400, such as within the handle 1412.

Figure 40:
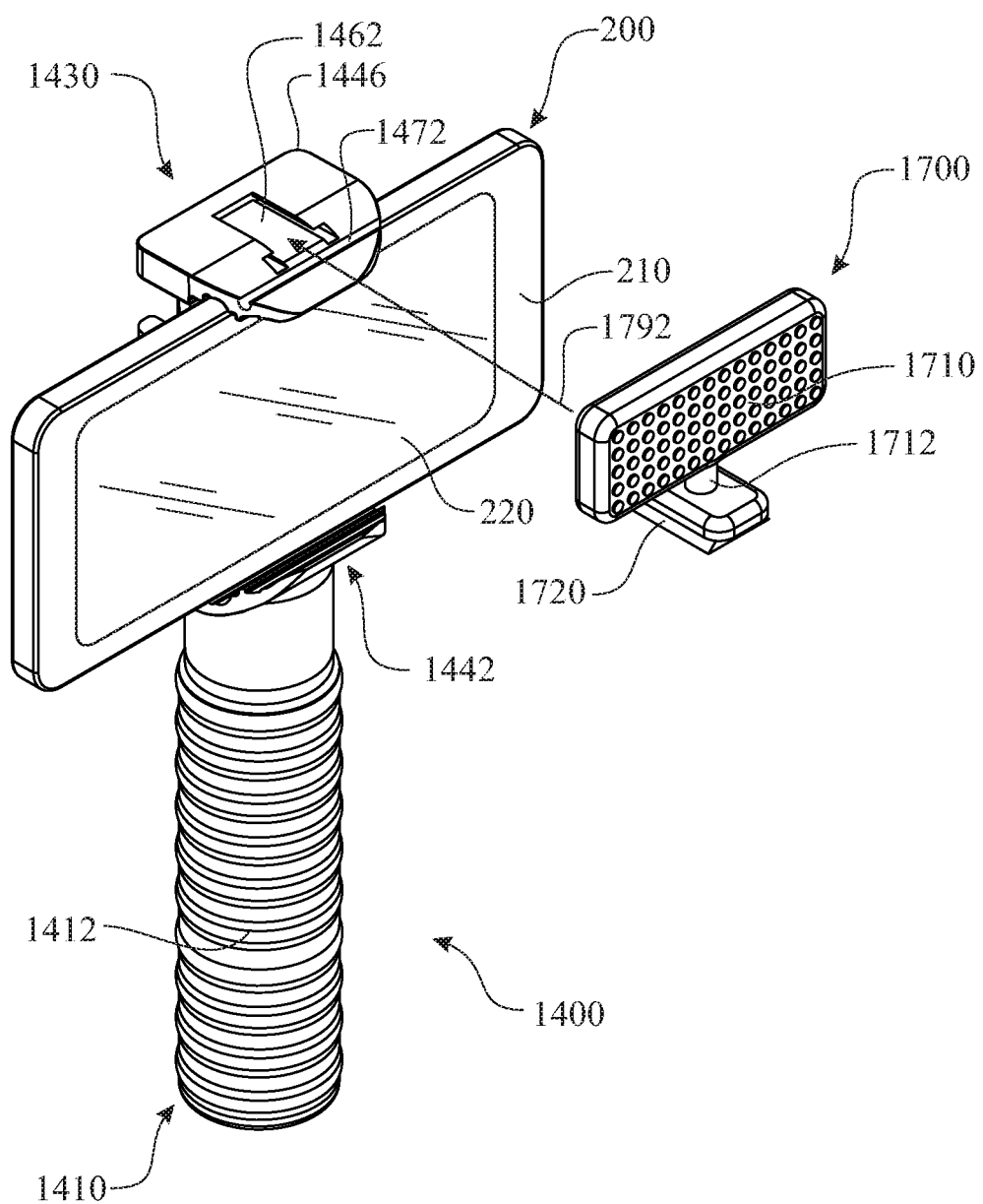
FIG. 40 presents an exploded isometric assembly view of a viewing side view of an accessory being assembled to the hot shoe of the variant of the portable computing tablet holster originally introduced in FIG. 36, the accessory being a light emitting assembly.
Figure 41:
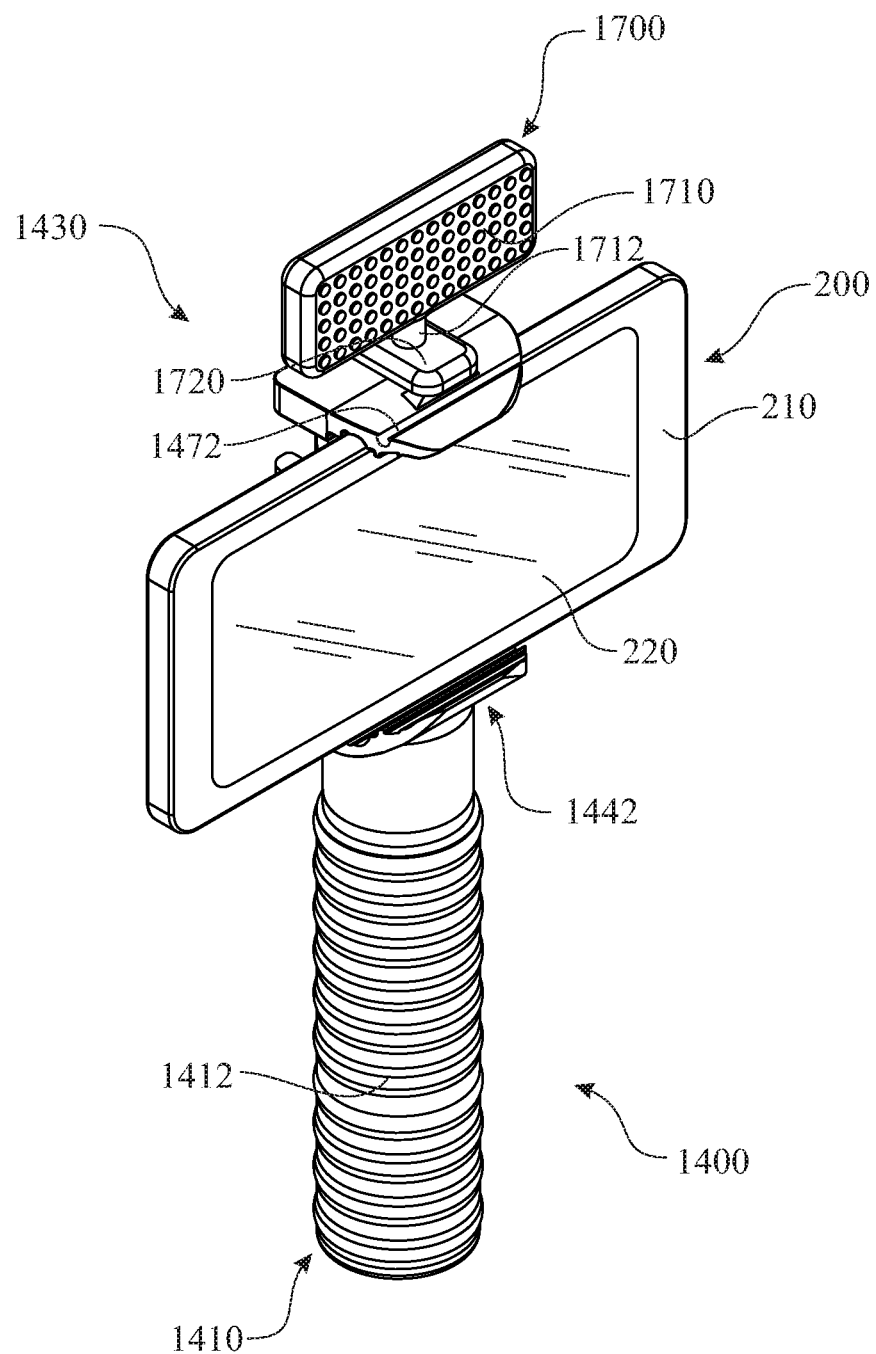
FIG. 41 presents an isometric assembly view of the viewing side view of the portable computing device retention assembly and light emitting assembly combination introduced in FIG. 40, the illustration presenting a configuration having the light emitting assembly assembled to the hot shoe of portable computing device retention assembly.

A light emitting panel assembly 1700 includes a light emitting panel 1710 supported by a light emitting panel support column 1712, as shown in FIGS. 40 and 41. The light emitting panel support column 1712 is supported by a light emitting panel electro-mechanical coupler 1720. Power is provided to the light emitting panel 1710 through the light emitting panel electro-mechanical coupler 1720. The light emitting panel assembly 1700 is assembled to the portable computing device holster 1400 by sliding the light emitting panel electro-mechanical coupler 1720 into the hot shoe 1462, in accordance with a light emitting panel assembly motion 1792, as shown in FIG. 40. The light emitting panel 1710 can be used as a flash. When using the light emitting panel 1710 as a flash, the light emitting panel 1710 can be in signal communication with the portable computing device 200 using a wired connection or using a Bluetooth wireless connection. A Bluetooth wireless transceiver can be integrated into the light emitting panel assembly 1700 or a portion of the portable computing device holster 1400, such as within the handle 1412. Alternatively, the light emitting panel 1710 can remain illuminated during use. Operation of the light emitting panel 1710 can be provided by simply installing the light emitting panel assembly 1700 into the shadow box attachment groove 1472 and removing the light emitting panel assembly 1700 from the shadow box attachment groove 1472 or with an inclusion of a switch (not shown). The switch can be configured to control electrical power to the shadow box attachment groove 1472 or to directly control operation of the light emitting panel 1710. In the exemplary embodiment, the light emitting panel 1710 is an array of Light Emitting Diodes (LED's).

Figure 42:
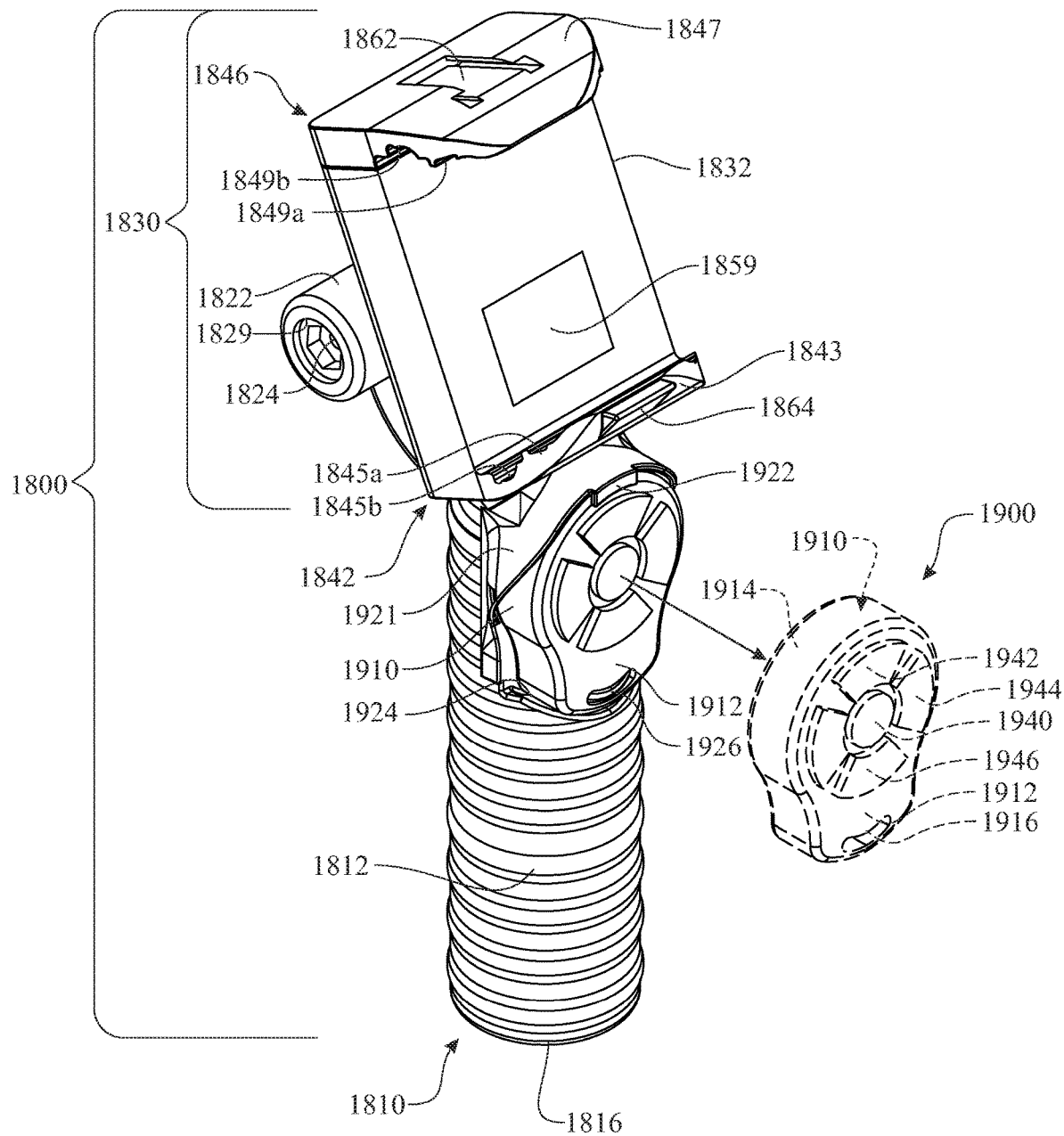
FIG. 42 presents an isometric assembly view of yet another variant of the portable computing device holster originally introduced in FIG. 29, wherein the exemplary version introduces a Bluetooth controller assembly being inserted into a Bluetooth controller assembly receptacle formed within a handle portion of the portable computing device holster.
Figure 43:
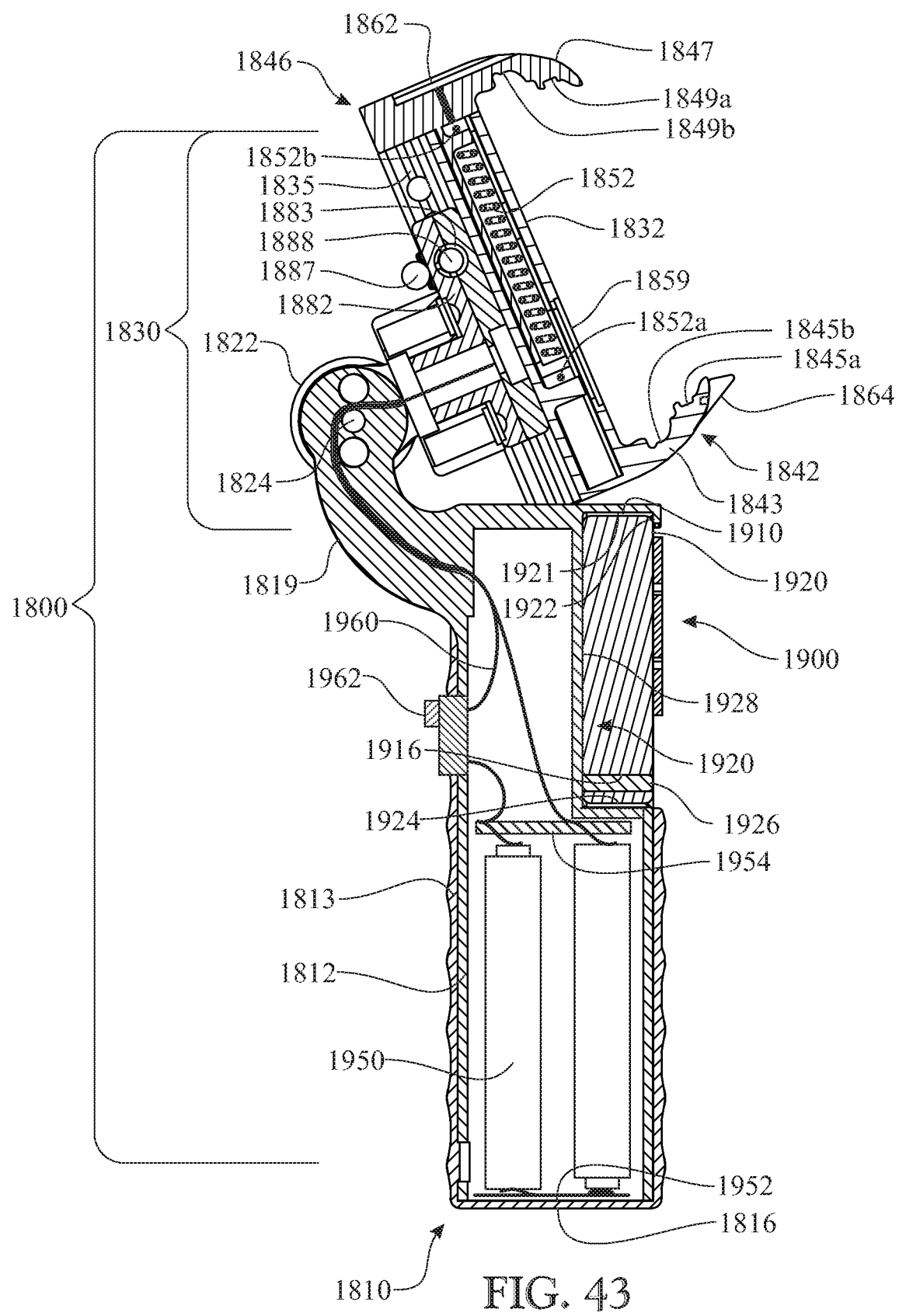
FIG. 43 presents a sectioned side elevation assembly view of the portable computing device holster originally introduced in FIG. 42, wherein the exemplary illustration presents details of features employed to retain the Bluetooth controller assembly within the handle portion of the portable computing device holster, the illustration further introducing details of an electrical power system used to power accessories.

It would be beneficial to provide a controller unit within a portable computing device holster 1800 for operating the portable computing device 200, such as the exemplary portable computing device holster 1800, which is illustrated in FIGS. 42 and 43. The portable computing device holster 1800 includes a receptacle for receiving and retaining a Bluetooth controller 1900, wherein the Bluetooth controller 1900 enables remote operation of the portable computing device 200. The portable computing device holster 1800 is a modified variant of the portable computing device holster 1100, wherein the portable computing device holster 1800 includes the receptacle for receiving and retaining a Bluetooth controller 1900. The exemplary portable computing device holster 1800 and portable computing device holster 1100 have a number of like features. Like features of the exemplary portable computing device holster 1800 and the portable computing device holster 1100 are numbered the same except preceded by the numeral '18'. Additional features of the portable computing device holster 1800 are similar to those of the portable computing device holster 1200. Like features of the exemplary portable computing device holster 1800 and the portable computing device holster 1200 are numbered the same except preceded by the numeral '18'.

The exemplary Bluetooth controller 1900 is an independent device comprising a Bluetooth wireless transceiver circuitry, a self contained portable power supply and a user input. The components are all supported by a Bluetooth controller housing 1910. The Bluetooth controller housing 1910 includes a Bluetooth controller housing front panel 1912, the Bluetooth controller housing front panel 1912 having a peripheral edge, a Bluetooth controller housing side panel 1914 extending rearward from the peripheral edge of the Bluetooth controller housing front panel 1912, and a rear panel that is similar to the Bluetooth controller housing front panel 1912, but located at an opposite edge of the Bluetooth controller housing side panel 1914. The electrical components are contained within the Bluetooth controller housing 1910. The housing additionally includes a Bluetooth controller housing retention slot 1916. The Bluetooth controller housing retention slot 1916 includes interior surfaces or panels that pass through the Bluetooth controller 1900.

User input elements include a Bluetooth controller centrally located button 1940 and a plurality of user input buttons that are located about the Bluetooth controller centrally located button 1940, the plurality of user input buttons surrounding the Bluetooth controller centrally located button 1940 include a Bluetooth controller upper radially located button 1942, a pair of Bluetooth controller central radially located buttons 1944, and a Bluetooth controller lower radially located button 1946. Each of the user input elements 1940, 1942, 1944, 1946 are in signal communication with the operating circuitry within the interior of the Bluetooth controller housing 1910.

The controller receptacle includes a Bluetooth controller receptacle top panel 1921 located proximate an upper edge of the Bluetooth controller receptacle 1920 and a Bluetooth controller receptacle lower panel 1924 located at an opposite, lower edge of the Bluetooth controller receptacle 1920. A Bluetooth controller receptacle front panel latch element 1922 extends from an outer or distal, free edge of the Bluetooth controller receptacle top panel 1921. The Bluetooth controller receptacle top panel 1921 extends in a direction towards a center of the controller receptacle. The distance between a Bluetooth controller receptacle rear panel 1928 of the Bluetooth controller receptacle 1920 and the interior surface of the Bluetooth controller receptacle front panel latch element 1922 is approximately the same as a thickness of the Bluetooth controller 1900. Details are best shown in a cross sectioned illustration shown in FIG. 43.

In use, the Bluetooth controller 1900 would be inserted at an angle, inserting a top portion of the Bluetooth controller 1900 initially into the Bluetooth controller receptacle 1920. The top of the Bluetooth controller 1900 would be seated against the interior surface of the Bluetooth controller receptacle top panel 1921 and the interior surface of the Bluetooth controller receptacle front panel latch element 1922. The Bluetooth controller 1900 is then rotated, sliding the Bluetooth controller housing retention slot 1916 onto a Bluetooth controller receptacle retention projection 1926. The Bluetooth controller receptacle retention projection 1926 projects forward from the Bluetooth controller receptacle rear panel 1928 of the Bluetooth controller receptacle 1920. The combination of contact points in conjunction with the Bluetooth controller receptacle retention projection 1926 engaging within an interior of the Bluetooth controller housing retention slot 1916 retains the Bluetooth controller 1900 within the Bluetooth controller receptacle 1920.

The use of the Bluetooth controller 1900 would be similar to any commonly available Bluetooth controller. The Bluetooth controller 1900 would be linked to the portable computing device 200 in accordance with standard Bluetooth pairing procedures. Once paired, the Bluetooth controller 1900 would provide controller signals to the portable computing device 200.

The section view of the portable computing device holster 1800 illustrated in FIG. 43 introduces a power system. In the exemplary illustration, power is provided by at least one portable power source 1950. The inclusion of a plurality of portable power sources 1950 can be supported by an adjoining power contact 1952. The adjoining power contact 1952 provides continuity between the multiple portable power sources 1950. The exemplary adjoining power contact 1952 includes a pair of contacts, each contact located to provide electrical communication between a pair of adjoining power contacts 1952 arranged in series.

A delivery power contact 1954 is provided on an opposite side of the portable power supply circuit, where the delivery power contact 1954 provides electronic communication between each adjoining power contact 1952 and the electrically powered accessories. Power is transferred from the delivery power contact 1954 to the electrically operated accessories by electrical power conductors 1960. A power operating switch 1962 can be included within the circuitry, where the power operating switch 1962 can be used to activate and deactivate power to the electrically operated accessory. The electrical power conductors 1960 can be routed through channels formed through the components of the portable computing device holster 1800, such as those illustrated in FIG. 43.

Power can be transferred from the handle sliding mechanism body 1882 to the tablet rear support panel 1832 by including a conductive element inserted within the handle sliding mechanism receiving edge channel 1835. A handle sliding mechanism movement guide (similar to 1281 of the portable computing device holster 1200) can include a conductive material. Contact between the handle sliding mechanism movement guide and the handle sliding mechanism receiving edge channel 1835 provides an electrical path between the handle sliding mechanism body 1882 and the tablet rear support panel 1832. Transfer of the electrical power can continue by utilizing a similar conductive contact between mating sliding surfaces. The sliding surfaces between the tablet rear support panel 1832 and the distal elongated retention element 1846 can be conductive, thus providing electrical conductivity therebetween. Wires or other conductors can then be used to transfer the electrical power to the hot shoe 1862. The same can be utilized to provide power to the laser projection virtual keyboard 1864.

The laser projection virtual keyboard 1164 can be used to project a projected virtual keyboard 2000, as illustrated in FIG. 44. The laser projection virtual keyboard 1164 would utilize technology currently available and could be integrated into the portable computing device holster 1100, as illustrated in FIG. 44 or removably attachable, as illustrated in FIG. 45. The projected virtual keyboard 2000 projects a complete set of projected virtual keyboard key(s) 2010 upon a preferably planar surface. The projection is provided by a laser. The lasers can also detect movement of the user's fingers to determine which projected virtual keyboard key(s) 2010 is/are contacted. FIG. 44 illustrates a benefit of the articulating movements between the handle 1112 and the portable computing device retention assembly 1130. The articulated movements enable the user to orient the portable computing device retention assembly 1130 respective to the handle 1112 to direct the projection of the projected virtual keyboard 2000, while adequately supporting the portable computing device holster 1100.

Connectivity of the laser projection virtual keyboard 1164 to the power supply or any other electrical component within the portable computing device holster 1100 can be provided by a signal and/or power conductor 1165 or an internal wiring system. It is also noted that the laser projection virtual keyboard 1164 can be self-contained, having a small portable power source (such as a button battery, a super capacitor, and the like), a wireless communication circuit, and any other necessary circuitry. The shape and size and attachment mechanisms for the laser projection virtual keyboard 1164 would be dependent upon the components required to operate the laser projection virtual keyboard 1164.

The previous versions of the portable computing device retention assembly 1130 included a pair of elongated retention elements, each elongated retention element comprising a retention element channel formation for seating and retaining the portable computing device 200.

Figure 46:
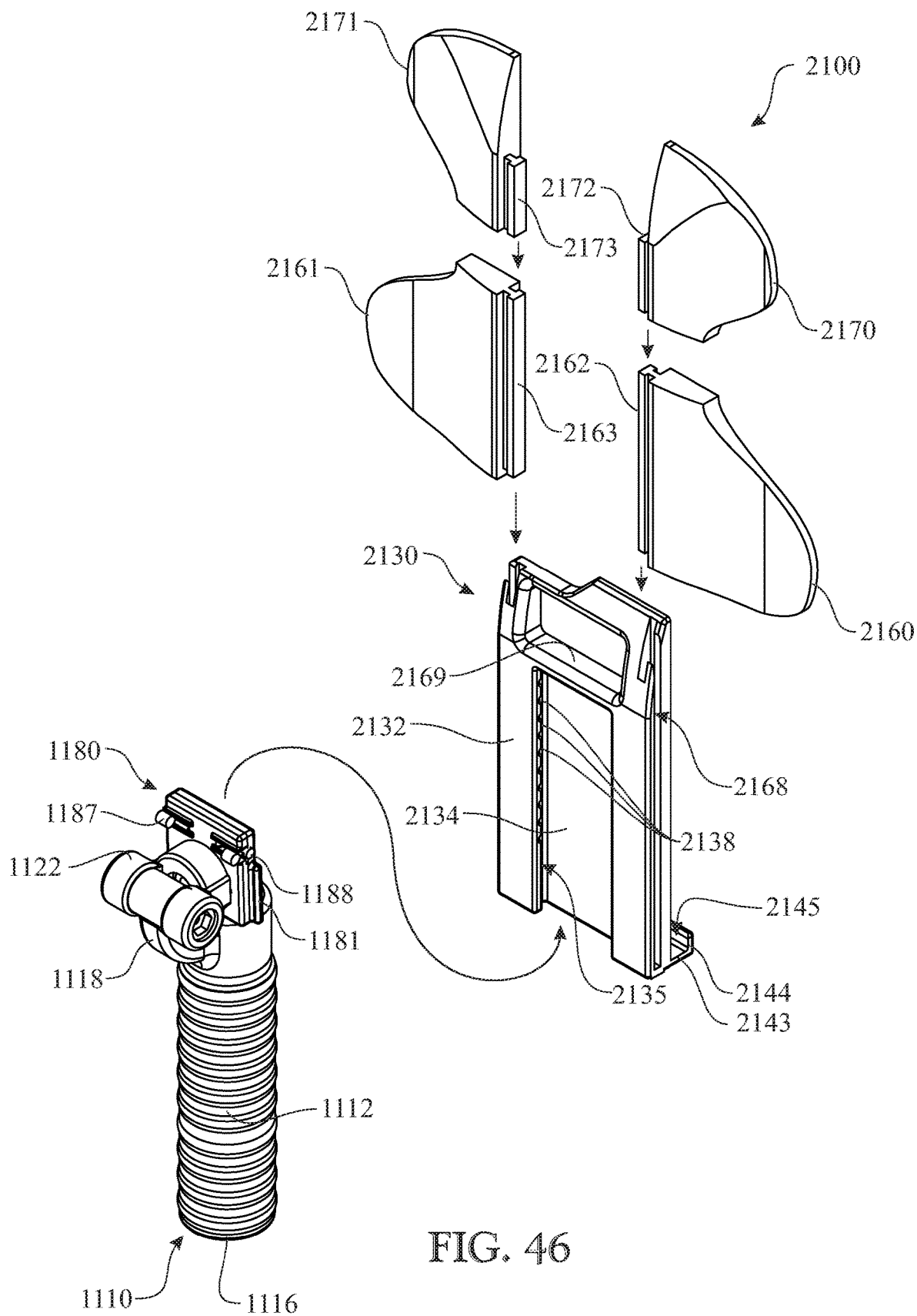
FIG. 46 presents an isometric partially exploded assembly view of a non-viewing side of yet another variant of the portable computing device holster originally introduced in FIG. 29, wherein the exemplary version introduces a support extension wing system for resizing the portable computing device supporting surface area.
Figure 47:
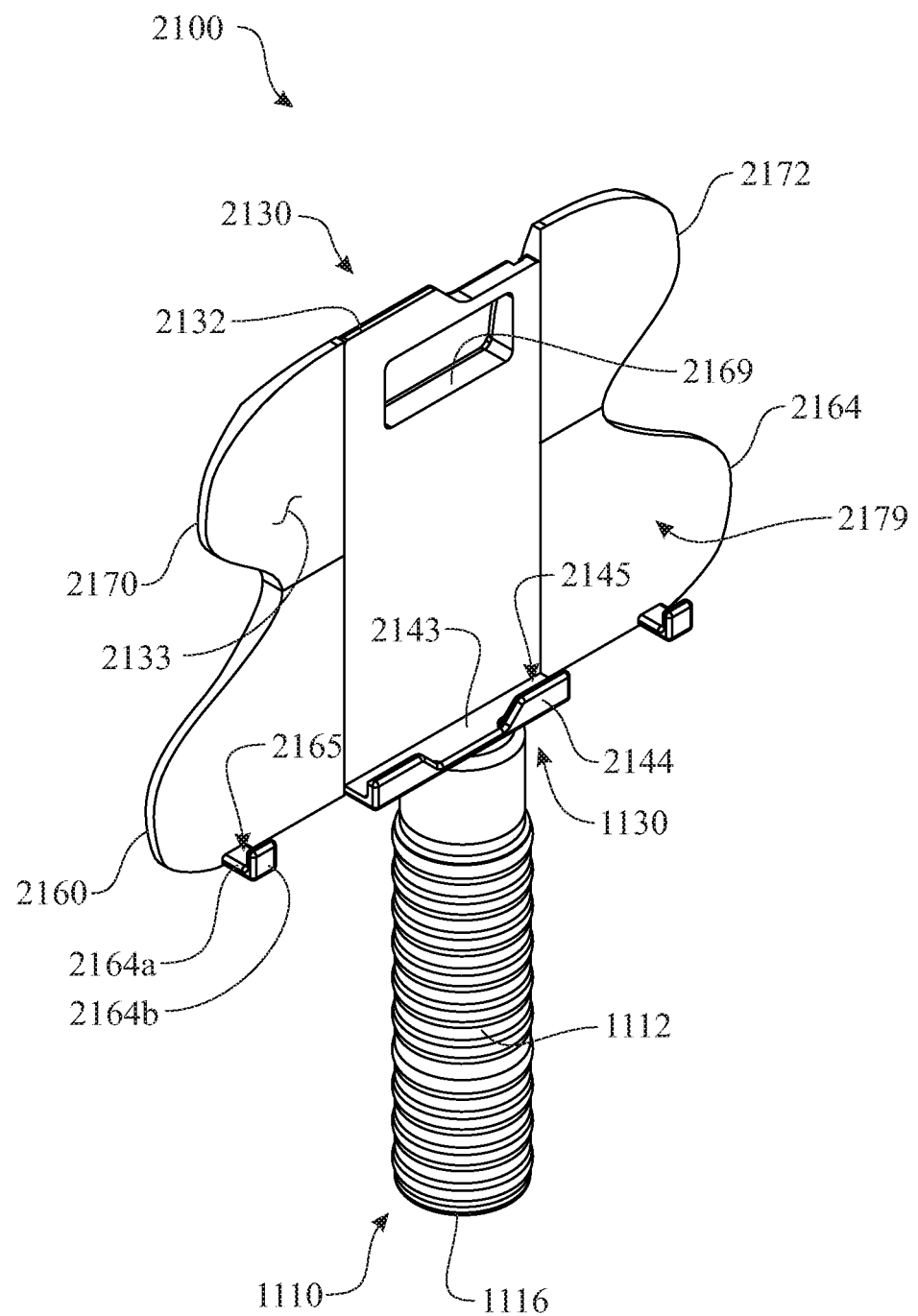
FIG. 47 presents an isometric assembly view of a viewing side of the variant of the portable computing tablet holster originally introduced in FIG. 46, the illustration presenting the support extension wing system assembled to a tablet rear support panel of the portable computing device holster.

The portable computing device holster 1100 is designed to accept a variety of portable computing device grip assemblies, such as the portable computing device retention assembly 1130, previously described. Another variant of a portable computing device grip assembly, referenced as a portable computing device retention assembly 2130, is illustrated in FIGS. 46 and 47. The portable computing device retention assembly 2130 is a modified variant of the portable computing device retention assembly 1130. The exemplary portable computing device retention assembly 2130 and the portable computing device retention assembly 1130 have a number of like features. Like features of the exemplary portable computing device retention assembly 2130 and the portable computing device retention assembly 1130 are numbered the same except preceded by the numeral '21'.

A tablet rear support panel 2132 includes a handle sliding mechanism receiving slot 2134 and the associated features for attachment to the handle sliding mechanism 1180 assembled to a handle assembly 1110. The tablet rear support panel 2132 introduces a pair of extension wing panel assembly slots 2168; each extension wing panel assembly slot 2168 is routed along a respective side or edge of the tablet rear support panel 2132. Each extension wing panel assembly slot 2168 is shaped and sized to receive a mating edge formation 2162, 2163, 2172, 2173 provided on an extension wing 2160, 2161, 2170, 2171. In the exemplary illustration, each mating edge formation 2162, 2163, 2172, 2173 is formed as a "T" shaped extrusion. Each extension wing panel assembly slot 2168 would be formed to receive the "T" shaped extrusion of the mating edge formation 2162, 2163, 2172, 2173. It is understood that the "T" shaped formation is only one exemplary shape. The mating edge formation 2162, 2163, 2172, 2173 can be formed of any suitable shape that limits motion of the extension wings 2160, 2161, 2170, 2171 respective to the tablet rear support panel 2132 to a sliding motion along the axial direction of the extension wing panel assembly slot 2168.

The extension wings 2160, 2161, 2170, 2171 can be of any suitable size and shape. In the exemplary illustration, the extension wings 2160, 2161, 2170, 2171 are formed in a shape similar to a butterfly.

The extendable portable computing device support panel assembly 2100 can include one or more features for retention of the portable computing device 200 upon the extendable portable computing device support panel assembly 2100. An edge of the portable computing device 200 can be seated within a handle sliding mechanism detent lateral bores 2145, defined by a handle sliding mechanism receiving slot 2143 and a handle sliding mechanism receiving edge channel 2144. Each of the lower extension wings 2160, 2161 can include a similar edge support, including a base elongated retention element channel formation 2165 defined by a wing panel retention channel base segment 2164a and a wing panel retention channel edge segment 2164b. Since the base elongated retention element channel formation 2165 is located distally from the handle sliding mechanism detent lateral bores 2145. The arrangement of the base elongated retention element channel formation 2165 in combination with the handle sliding mechanism detent lateral bores 2145 provides a stable support structure for receiving and supporting the portable computing device 200. It is noted that a second channel is omitted from the portable computing device retention assembly 2130. A micro-suction material 2179 can be applied to a contacting surface of each of the extension wings 2160, 2161, 2170, 2171 as well as a rear support panel tablet contacting surface 2133. The micro-suction material 2179 is a temporary bonding material. One source of the micro-suction material 2179 is offered by Sewell and sold under a trade name of AIRSTICK Micro-suction tape. The micro-suction material 2179 would be applied to the contacting surface of each of the extension wings 2160, 2161, 2170, 2171 as well as a rear support panel tablet contacting surface 2133.

A portable computing device retention assembly camera aperture 2169 is provided through the tablet rear support panel 2132. The portable computing device retention assembly camera aperture 2169 is located at a position, sized, and shaped to provide a clearance for a camera 296 of the portable computing device 200. Alternatively, the extendable portable computing device support panel assembly 2100 can be shaped to provide the clearance for the camera 296 of the portable computing device 200.

Figure 48:
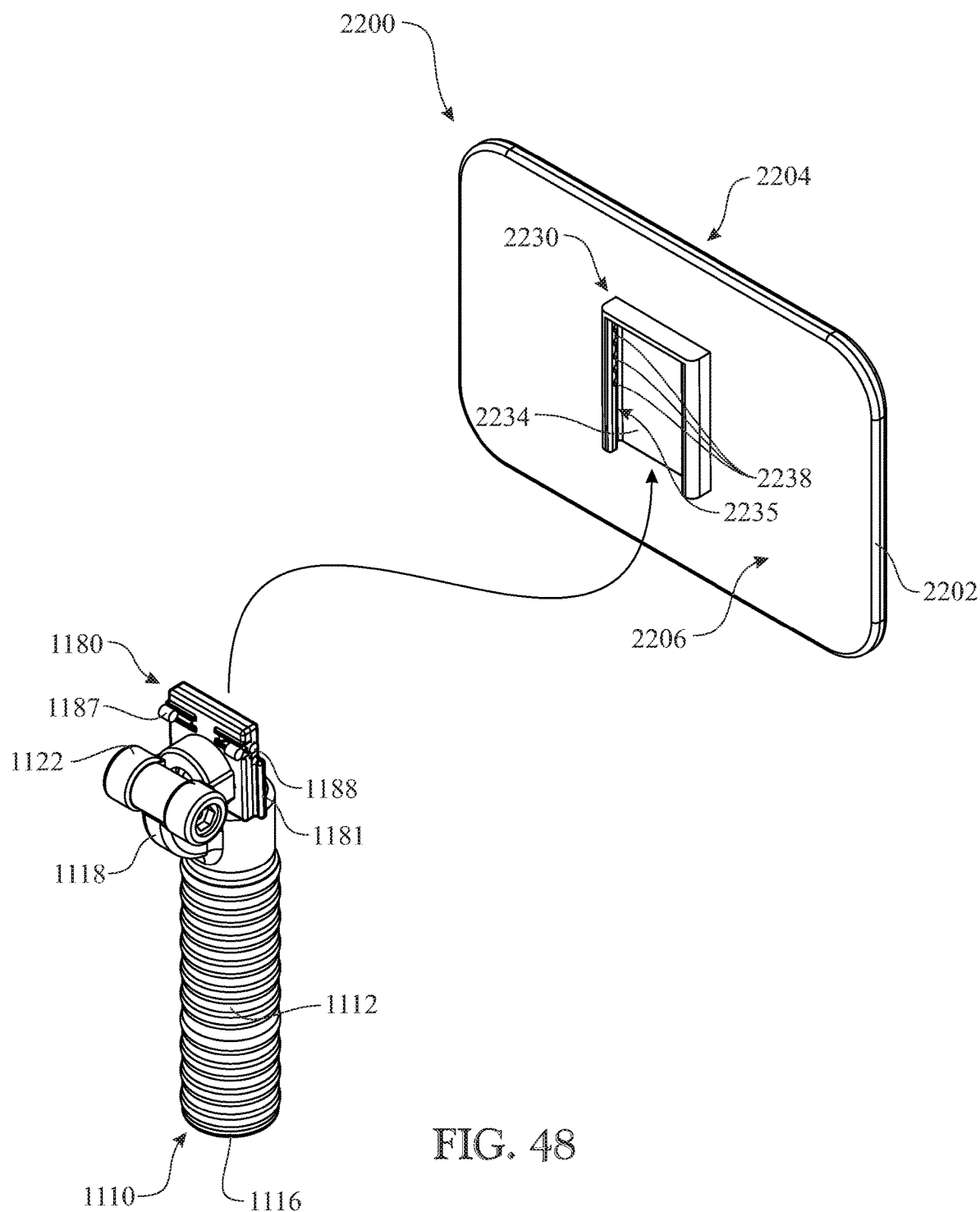
FIG. 48 presents an isometric partially exploded assembly view of a non-viewing side of yet another variant of the portable computing device holster originally introduced in FIG. 29, wherein the exemplary version introduces a support assembly panel which employs micro-suction material for retaining the portable computing device.

A portable computing device retention assembly 2230 can be integrated into or directly attached to a mountable portable computing device 2200, as illustrated in FIG. 48, or a case for the mountable portable computing device 2200. The portable computing device retention assembly 2230 includes like features of the portable computing device retention assembly 2130. Like features of the exemplary portable computing device retention assembly 2230 and the portable computing device retention assembly 2130 are numbered the same except preceded by the numeral '22'. The portable computing device retention assembly 2230 would be assembled to a mountable portable computing device non-viewing surface 2206 of the mountable portable computing device 2200. Descriptive references of the mountable portable computing device 2200 include a mountable portable computing device viewing surface 2204, a mountable portable computing device non-viewing surface 2206 located on a side that is opposite of the mountable portable computing device viewing surface 2204, and a mountable portable computing device peripheral edge 2202, which circumscribes a peripheral edge of the mountable portable computing device 2200. The portable computing device retention assembly 2230 can be integrated into the design of the mountable portable computing device 2200 as a component of the housing. The portable computing device retention assembly 2230 can be attached to or integrated into a design of a case for the portable computing device 200.

The mountable portable computing device 2200 would be assembled to the handle assembly 1110 by inserting the handle sliding mechanism 1180 into a handle sliding mechanism receiving slot 2234 of the portable computing device retention assembly 2230.

Figure 49:
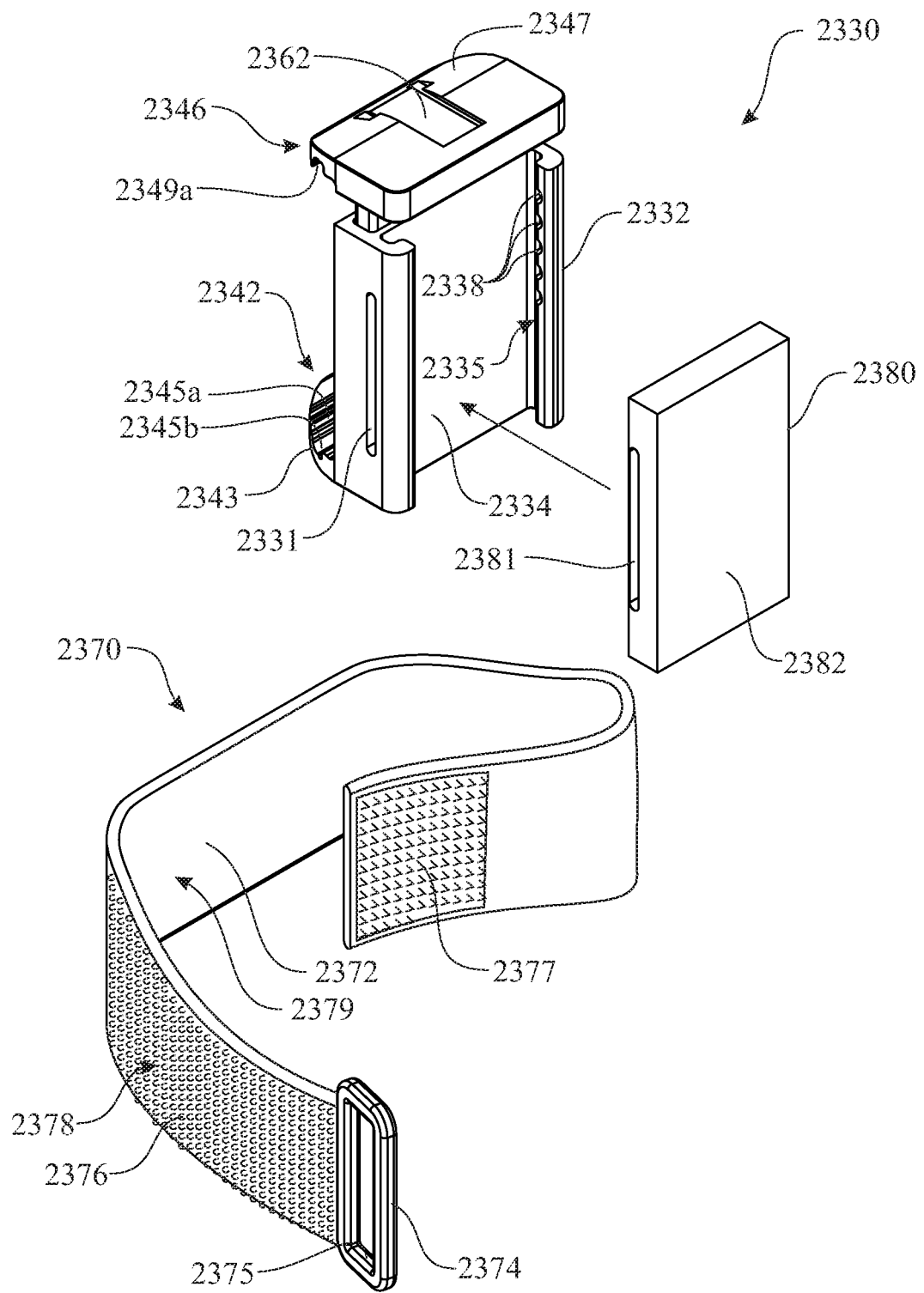
FIG. 49 presents an isometric partially exploded assembly view of a non-viewing side of yet another variant of a portable computing device retention assembly of the portable computing device holster originally introduced in FIG. 29, wherein the exemplary version replaces the handle assembly with a strap mount assembly fur attachment to an individual's arm or any other suitable support item.
Figure 50:
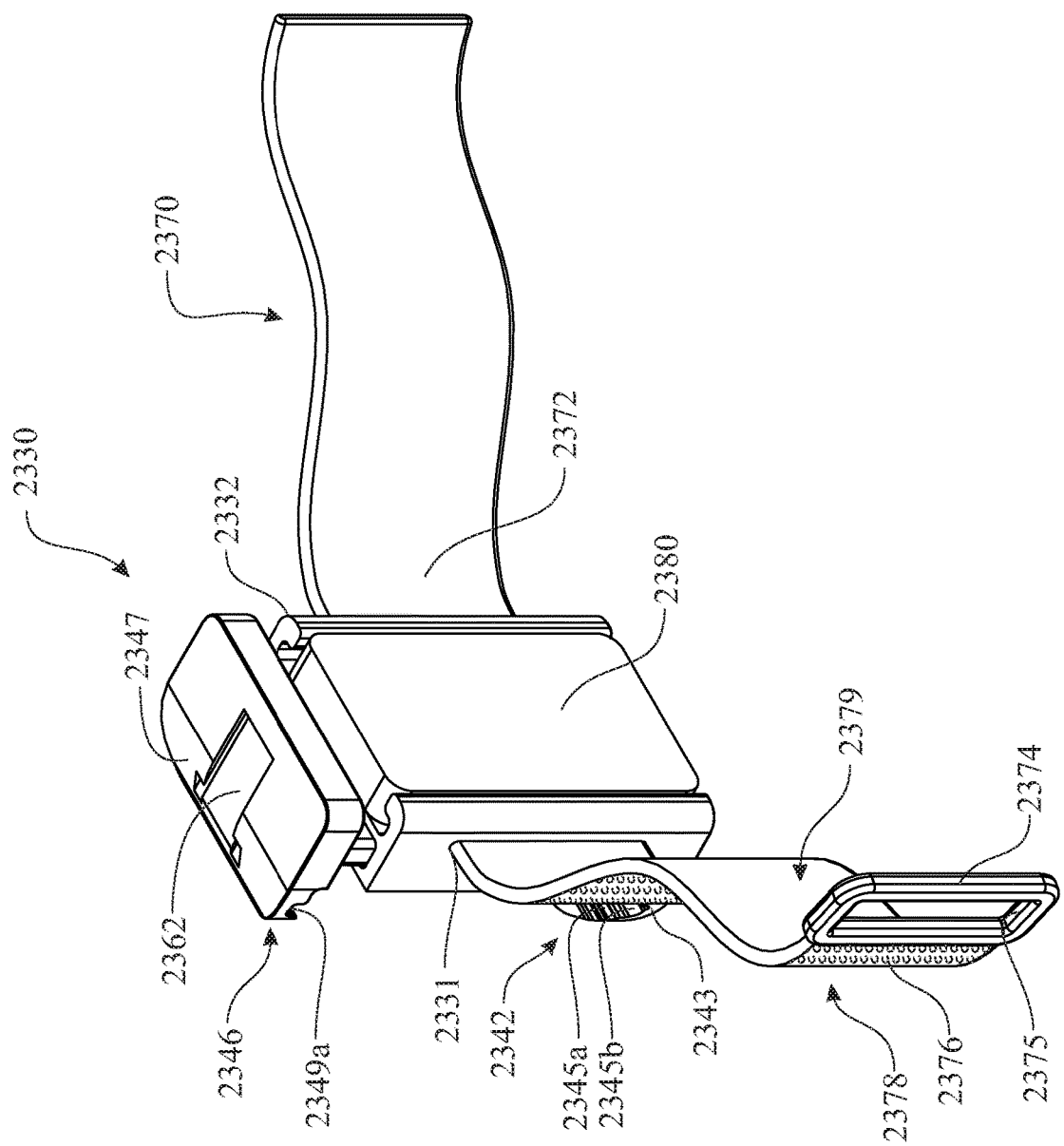
FIG. 50 presents an isometric assembly view of the non-viewing side of the variant of the portable computing tablet holster originally introduced in FIG. 48, the illustration presenting the strap mounting system assembled to the tablet rear support panel of the portable computing device holster.
Figure 51:
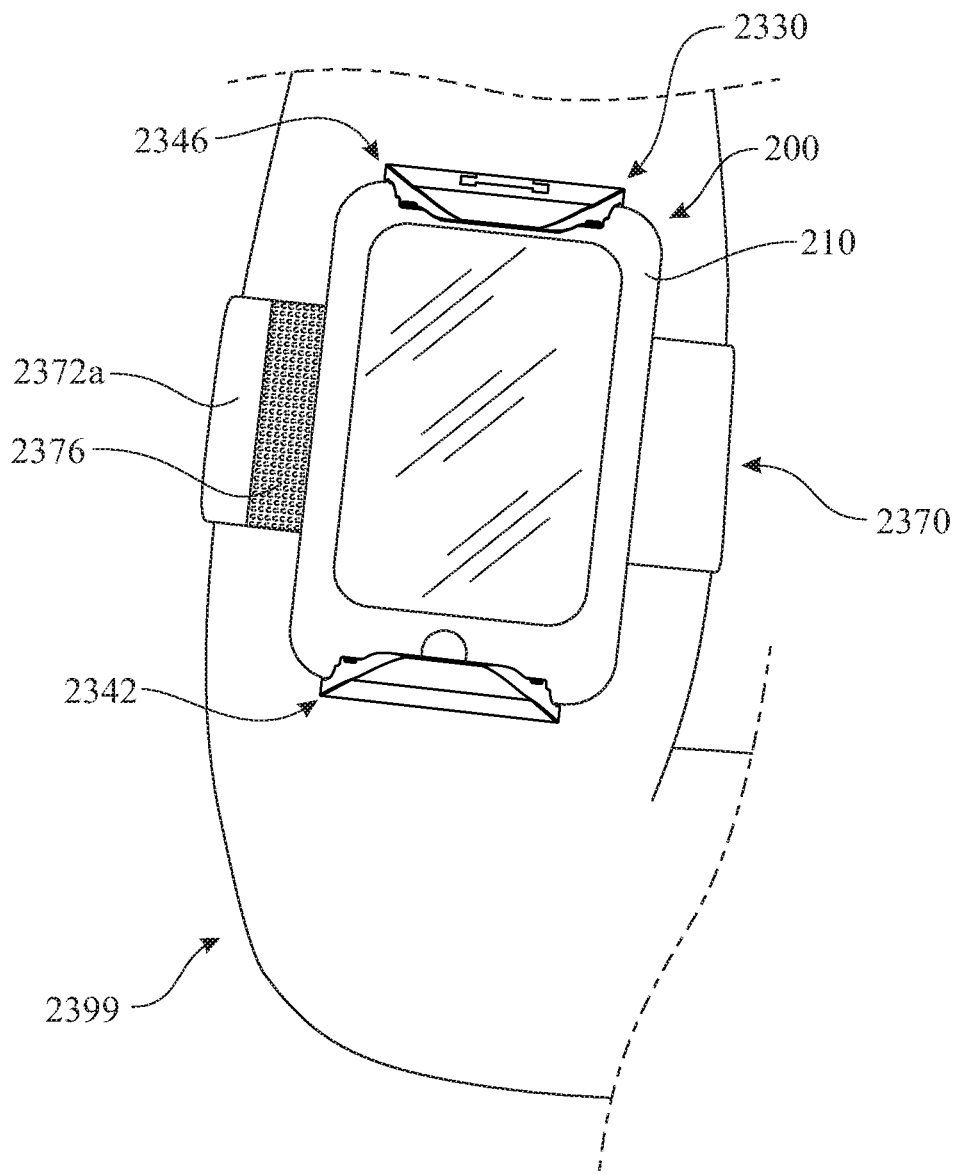
FIG. 51 presents an isometric assembly view of the non-viewing side of the variant of the portable computing tablet holster originally introduced in FIG. 48, the illustration presenting the portable computing device holster being shown in use on an individual's arm.

In previous variants, the portable computing device retention assembly is assembled to a handle or a flexible gooseneck support system. The portable computing device holster includes a handle attachment subassembly that is removably attached to a portable computing device retention assembly. This two-piece interface provides flexibility between applications. One example of the adaptability of the concept is presented in FIGS. 49 through 51, which introduces an adaptation of the portable computing device retention assembly 1130 for attachment to an individual's arm 2399. A portable computing device retention assembly 2330 is a modified variant of the portable computing device retention assembly 1130, where the portable computing device retention assembly 2330 introduces a pair of strap receiving slots 2331 extending through each wall of a handle sliding mechanism receiving edge channel 2335. The balance of the portable computing device retention assembly 2330 is similar to the portable computing device retention assembly 1230. Like features of the exemplary portable computing device retention assembly 2330 and the portable computing device retention assembly 1230 are numbered the same except preceded by the numeral '23'.

A strap comfort fill element 2380 is sized and shaped to be inserted into a handle sliding mechanism receiving slot 2334 of the portable computing device retention assembly 2330. A strap receiving slot 2381 is formed passing through a strap receiving adapting body 2382, creating the strap comfort fill element 2380. The strap receiving adapting body 2382 is preferably fabricated of a pliant material, such as a rubber, nylon, a plastic, foam, a neoprene, and the like or any combination thereof. The selected material is designed to provide comfort to the user while the portable computing device retention assembly 2330 is being worn on the individual's arm 2399. A secondary comforting material can be adhered to an exposed or contacting surface of the strap receiving adapting body 2382. For example, the strap receiving adapting body 2382 can be fabricated of a molded plastic and a neoprene can be adhered to the contacting surface of the strap receiving adapting body 2382.

The strap receiving adapting body 2382 can include or exclude a feature that would be slideably inserted into each handle sliding mechanism receiving edge channel 2335 of the tablet rear support panel 2332. The strap receiving slot 2381 is sized, shaped, and located to align with the strap receiving slot 2331 of the portable computing device retention assembly 2330 when the strap comfort fill element 2380 is inserted into the handle sliding mechanism receiving slot 2334 of the portable computing device retention assembly 2330. The strap receiving slot 2381 and respective strap receiving slots 2331 are sized and shaped to receive an attachment strap 2372 of an attachment strap assembly 2370. Orientation of the attachment strap assembly 2370 can be defined as having an attachment strap exterior surface 2378 and an attachment strap interior surface 2379 located on the opposite side of the attachment strap exterior surface 2378.

The attachment strap assembly 2370 includes an attachment strap loop 2374 assembled to one end of the attachment strap 2372. The attachment strap loop 2374 can be overmolded onto the end of the attachment strap 2372 (as shown), the attachment strap 2372 can be looped around a portion of the attachment strap loop 2374 and secured back to itself, the attachment strap 2372 can be mechanically secured to the attachment strap loop 2374 using a mechanical fastener, or assembled using any other suitable assembly method. An attachment strap dense hook and loop material first portion 2376 is provided on an attachment strap exterior surface 2378 of the attachment strap 2372. The attachment strap dense hook and loop material first portion 2376 is located proximate the attachment strap loop 2374 and continues towards an opposite end of the attachment strap 2372. An attachment strap dense hook and loop material second portion 2377 is provided at a location proximate the opposite or free end of the attachment strap 2372. The attachment strap 2372 and respective lengths of the attachment strap dense hook and loop material first portion 2376 and the attachment strap dense hook and loop material second portion 2377 are such to enable the attachment strap assembly 2370 to be secured around most individual's arms 2399.

In use, the strap comfort fill element 2380 is inserted into the handle sliding mechanism receiving slot 2334. The free end of the attachment strap assembly 2370 is inserted through the strap receiving slot 2331 and the strap receiving slot 2381. The attachment strap assembly 2370 would be oriented having the attachment strap exterior surface 2378 facing towards the portable computing device grips 2342, 2346. The attachment strap assembly 2370 would be routed about the individual's arm 2399. The free end of the attachment strap 2372 is inserted through an attachment strap loop aperture 2375 of the attachment strap loop 2374, looped around, and the attachment strap dense hook and loop material second portion 2377 is secured to the attachment strap dense hook and loop material first portion 2376.

As presented, the portable computing device retention assembly is designed to be adaptable for a variety of applications. The portable computing device retention assembly is also adaptable for receiving and supporting a number of different sized portable computing devices. The portable computing device retention assembly is also capable of receiving and supporting the different sized portable computing devices while protected by a case or other protective enclosure. The portable computing device retention assembly includes features for receiving and support different styles and sizes of cases for the portable computing devices.

The features of the portable computing device retention assembly and the corresponding handle sliding mechanism enable adaptability of the holster for any of a variety of applications.

It is understood that features from one variant can be incorporated into any of the other variants. For example, the portable computing tablet holster 700 can include a pair of handle assemblies handle assembly 710, similar to the portable computing tablet holster 900. In another example, the information card reader feature 1092 can be integrated into any of the portable computing tablet holsters 100, 300, 500, 600, 700, 800, 900. Using the portable computing tablet holster 100 as an example, the information card reader feature 1092 can be integrated into the base elongated retention element 142, enabling a wired communication between a controller circuit installed within the handle 112 and the information card reading device 1094. The information acquired from the information card is then forwarded to the portable computing tablet 200 using wired or wireless communication links.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

REFERENCE ELEMENTS

| Ref. No. | Description |
| --- | --- |
| 100 | portable computing tablet holster |
| 102 | portable computing tablet holster viewing side |
| 104 | portable computing tablet holster non-viewing or recording side |
| 110 | handle assembly |
| 112 | handle |
| 114 | grip enhancing pliant material |
| 116 | distal, free, detached end of the handle |
| 118 | handle attachment section |
| 119 | handle assembly fasteners |
| 120 | lanyard |
| 130 | portable computing tablet retention assembly |
| 132 | base tablet rear support panel |
| 133 | base rear support panel tablet contacting surface |
| 134 | expanding tablet rear support panel |
| 135 | distal rear support panel tablet contacting surface |
| 136 | rear panel expansion sliding element |
| 142 | base elongated retention element |
| 143 | base elongated retention element channel base segment |
| 144 | base elongated retention element channel rail segment |
| 145 | base elongated retention element channel formation |
| 146 | distal elongated retention element |
| 147 | distal elongated retention element channel base segment |
| 148 | distal elongated retention element channel rail segment |
| 149 | distal elongated retention element channel formation |
| 152 | rear panel extension biasing element |
| 154 | rear panel extension detent feature |
| 160 | light emitting device |
| 162 | actuation switch |
| 193 | connector |
| 200 | portable computing tablet |
| 200a | thin bodied portable computing device |
| 200b | thick bodied portable computing device |
| 210 | portable computing tablet housing |
| 212 | front, viewing surface |
| 213 | rear, non-viewing surface |
| 214 | first elongated edge |
| 215 | second elongated edge |
| 216 | first lateral edge |
| 217 | second lateral edge |
| 220 | touch screen |
| 290 | microprocessor |
| 291 | non-transient digital memory |
| 292 | user input device |
| 293 | connector |
| 294 | wireless interface |
| 295 | wired interface |
| 296 | camera |
| 297 | not used |
| 300 | portable computing tablet holster |
| 310 | handle assembly |
| 312 | handle |
| 318 | handle attachment section |
| 320 | lanyard |
| 330 | retention assembly |
| 332 | base tablet rear support panel |
| 334 | distal tablet rear support panel |
| 342 | base elongated retention element |
| 370 | pivot axle |
| 372 | pivot axle bore |
| 402 | viewing handle side |
| 404 | non-viewing handle side |
| 410 | handle assembly |
| 412 | handle |
| 413 | handle finger receiving formations |
| 414 | proximal handle finger receiving formation |
| 416 | distal, free, detached end of the handle |
| 417 | proximal handle end |
| 420 | lanyard |
| 422 | distal lanyard loop |
| 424 | proximal lanyard loop |
| 426 | lanyard sizing loop slide bead |
| 462 | actuation switch |
| 500 | portable computing tablet holster |
| 502 | viewing handle side |
| 504 | non-viewing handle side |
| 506 | handle attachment interior surface |
| 510 | handle assembly |
| 512 | handle |
| 514 | handle grip enhancing feature |
| 516 | distal, free, detached end of the handle |
| 518 | handle attachment section |
| 519 | hinge tab bore |
| 530 | portable computing tablet retention assembly |
| 532 | base tablet rear support panel |
| 542 | base elongated retention element |
| 543 | base elongated retention element channel base segment |
| 544 | tablet holster frame first retention channel |
| 545 | base elongated retention element channel formation |
| 546 | distal elongated retention element |
| 547 | distal elongated retention element channel base segment |
| 548 | distal elongated retention element channel rail segment |
| 549 | distal elongated retention element channel formation |
| 552 | lateral retention base segment |
| 554 | lateral retention central segment |
| 556 | lateral retention distal segment |
| 557 | lateral retention element channel base segment |
| 558 | lateral retention element channel base segment |
| 559 | lateral retention element channel formation |
| 560 | light emitting device |
| 562 | actuation switch |
| 570 | camera viewing aperture |
| 572 | portable computing tablet holster open end slot |
| 574 | portable computing tablet holster tablet securing end slot |
| 576 | flexible cantilevered retention element |
| 576 | flexible cantilevered retention element |
| 577 | flexible cantilevered retention element nib |
| 580 | articulating assembly |
| 581 | hinged support arm holster pivot surface |
| 582 | hinged support arm |
| 583 | hinged support arm holster hinged assembly surface |
| 584 | hinged support arm assembly edge |
| 585 | hinged support arm distal free edge |
| 586 | ratchet rotation disk |
| 588 | rotation disk ratchet teeth |
| 589 | hinge bore |
| 590 | controller |
| 591 | memory |
| 592 | user input device |
| 593 | connector |
| 594 | wired interface |
| 595 | wireless interface |
| 596 | integrated camera |
| 600 | portable computing tablet holster |
| 610 | handle assembly |
| 612 | handle |
| 616 | distal, free, detached end of the handle |
| 618 | handle attachment section |
| 619 | hinge tab bore |
| 630 | portable computing tablet retention assembly |
| 632 | base tablet rear support panel |
| 634 | handle sliding mechanism receiving slot |
| 636 | handle sliding mechanism detent compression rece |
| 642 | base elongated retention element |
| 646 | distal elongated retention element |

| Ref. No. | Description |
|---|---|
| 652 | lateral retention base segment |
| 656 | lateral retention distal segment |
| 660 | light emitting device |
| 662 | actuation switch |
| 670 | camera viewing aperture |
| 676 | flexible cantilevered retention element |
| 686 | ratchet rotation disk |
| 700 | portable computing tablet holster |
| 710 | handle assembly |
| 712 | handle |
| 716 | distal, free, detached end of the handle |
| 718 | handle attachment section |
| 719 | hinge tab bore |
| 730 | portable computing tablet retention assembly |
| 732 | base tablet rear support panel |
| 733 | base rear support panel tablet contacting surface |
| 734 | distal elongated retention element |
| 736 | rear panel expansion sliding element |
| 738 | rear panel extension detent feature |
| 739 | rear panel extension biasing element |
| 742 | base elongated retention element |
| 746 | distal elongated retention element |
| 752 | lateral retention base segment |
| 756 | lateral retention distal segment |
| 770 | camera viewing aperture |
| 776 | flexible cantilevered retention element |
| 800 | portable computing tablet holster |
| 810 | handle assembly |
| 812 | handle |
| 816 | distal, free, detached end of the handle |
| 818 | handle attachment section |
| 819 | hinge tab bore |
| 820 | articulating interface subassembly |
| 822 | central articulating element |
| 824 | articulating subassembly pivot pin |
| 829 | central articulating element pivot pin receiving bore |
| 830 | portable computing tablet retention assembly |
| 832 | tablet rear support panel |
| 833 | rear support panel tablet contacting surface |
| 834 | handle sliding mechanism receiving slot |
| 835 | handle sliding mechanism receiving edge channel |
| 836 | handle sliding mechanism detent compression recessions |
| 838 | handle sliding mechanism detent lateral bores |
| 842 | base elongated retention element |
| 843 | base elongated retention element channel base segment |
| 844 | tablet holster frame first retention channel |
| 845 | base elongated retention element channel formation |
| 846 | distal elongated retention element |
| 847 | distal elongated retention element channel base segment |
| 848 | distal elongated retention element channel rail segment |
| 849 | distal elongated retention element channel formation |
| 850 | rear panel expansion sliding element |
| 860 | light emitting device |
| 880 | handle sliding mechanism |
| 882 | handle sliding mechanism body |
| 885 | handle sliding mechanism retention feature biasing element |
| 886 | handle sliding mechanism pivot enabling element |
| 887 | handle sliding mechanism retention feature operating mechanism |
| 888 | handle sliding mechanism retention feature |
| 889 | handle sliding mechanism retention feature connecting arm |
| 899 | generally horizontally oriented support surface |
| 900 | portable computing tablet holster |
| 910 | first handle assembly |
| 911 | second handle assembly |
| 912 | first handle |
| 913 | second handle |
| 918 | handle attachment section |
| 930 | portable computing tablet retention assembly |
| 932 | base tablet rear support panel |
| 933 | base rear support panel tablet contacting surface |
| 934 | distal elongated retention element |
| 942 | base elongated retention element |
| 946 | distal elongated retention element |
| 952 | lateral retention base segment |
| 954 | rear panel extension detent feature |
| 956 | lateral retention distal segment |
| 962 | first user directional input device |
| 963 | second user directional input device |
| 964 | first handle user analog input device(s) |
| 965 | second handle user analog input device(s) |
| 998 | remotely operated vehicle |
| 999 | remotely operated vehicle image |
| 1000 | portable computing tablet holster |
| 1010 | handle assembly |
| 1012 | handle |
| 1018 | handle attachment section |
| 1030 | portable computing tablet retention assembly |
| 1032 | base tablet rear support panel |
| 1033 | base rear support panel tablet contacting surface |
| 1034 | distal elongated retention element |
| 1042 | base elongated retention element |
| 1046 | distal elongated retention element |
| 1052 | lateral retention base segment |
| 1056 | lateral retention distal segment |
| 1062 | user directional input device |
| 1064 | handle user tactile input device(s) |
| 1092 | information card reader feature |
| 1094 | information card reading device |
| 1100 | portable computing device holster |
| 1110 | handle assembly |
| 1112 | handle |
| 1116 | distal, free, detached end of the handle |
| 1117 | handle axial extension element |
| 1118 | handle attachment section |
| 1122 | central articulating element |
| 1124 | articulating subassembly pivot pin |
| 1129 | central articulating element pivot pin receiving bore |
| 1130 | portable computing device retention assembly |
| 1132 | tablet rear support panel |
| 1136 | rear panel expansion sliding element |
| 1142 | base elongated retention element |
| 1143 | base elongated retention element channel base segment |
| 1145a | first base elongated retention element channel formation |
| 1145b | second base elongated retention element channel formation |
| 1146 | distal elongated retention element |
| 1147 | distal elongated retention element channel base segment |
| 1149a | first distal elongated retention element channel formation |
| 1149b | second distal elongated retention element channel formation |
| 1159 | biasing element cavity cover member |
| 1162 | hot shoe |
| 1164 | laser projection virtual keyboard |
| 1165 | signal and/or power conductor |
| 1180 | handle sliding mechanism |
| 1182 | handle sliding mechanism body |
| 1187 | handle sliding mechanism retention feature operating mechanism |
| 1192 | rotational motion |
| 1197 | axial extending motion |
| 1200 | portable computing device holster |
| 1210 | handle assembly |
| 1212 | handle |
| 1216 | distal, free, detached end of the handle |
| 1217 | handle axial extension element |
| 1218 | handle attachment section |
| 1222 | central articulating element |
| 1224 | articulating subassembly pivot pin |
| 1229 | central articulating element pivot pin receiving bore |
| 1230 | portable computing device retention assembly |
| 1232 | tablet rear support panel |
| 1234 | handle sliding mechanism receiving slot |
| 1235 | handle sliding mechanism receiving edge channel |
| 1236 | rear panel expansion sliding element |
| 1238 | handle sliding mechanism detent lateral bores |
| 1242 | base elongated retention element |
| 1243 | base elongated retention element channel base segment |
| 1245a | first base elongated retention element channel formation |
| 1245b | second base elongated retention element channel formation |
| 1246 | distal elongated retention element |
| 1247 | distal elongated retention element channel base segment |
| 1249a | first distal elongated retention element channel formation |
| 1249b | second distal elongated retention element channel formation |
| 1250 | rear panel expansion sliding element |

-continued

| Ref. No. | Description |
|---|---|
| 1252 | computing device retention force application tension biasing element |
| 1252a | computing device retention force application tension biasing element distal attachment end |
| 1252b | computing device retention force application tension biasing element proximal attachment end |
| 1257 | biasing element attachment point access cavity |
| 1258 | biasing element attachment point |
| 1259 | biasing element cavity cover member |
| 1262 | hot shoe |
| 1264 | laser projection virtual keyboard |
| 1280 | handle sliding mechanism |
| 1281 | handle sliding mechanism movement guide |
| 1282 | handle sliding mechanism body |
| 1282a | handle sliding mechanism body first portion |
| 1282b | handle sliding mechanism body second portion |
| 1283 | operating mechanism receiving slot |
| 1283a | operating mechanism clearance slot |
| 1285 | handle sliding mechanism retention feature biasing element |
| 1287 | handle sliding mechanism retention feature operating mechanism |
| 1288 | handle sliding mechanism retention feature |
| 1289 | handle sliding mechanism retention feature connecting arm |
| 1300 | flexible gooseneck support system |
| 1310 | flexible gooseneck support arm subassembly |
| 1312 | flexible gooseneck support arm |
| 1314 | flexible gooseneck support arm distal end component |
| 1318 | flexible gooseneck support arm attachment ball |
| 1320 | gooseneck ball clamping component |
| 1322 | gooseneck ball clamping component assembly flange |
| 1324 | gooseneck ball clamping component orientation feature |
| 1326 | gooseneck ball clamping component cap receiving threading |
| 1328 | gooseneck ball clamping component ball receiving socket |
| 1329 | gooseneck ball receiving socket compression gap |
| 1330 | gooseneck ball clamping component compression nut |
| 1332 | knurled grip compression nut section |
| 1336 | gooseneck ball receiving socket compression nut threading |
| 1340 | gooseneck ball clamping component assembly receiving aperture |
| 1342 | gooseneck ball clamping component assembly flange receptacle |
| 1344 | gooseneck ball clamping component orientation feature receptacle |
| 1400 | portable computing device holster |
| 1410 | handle assembly |
| 1412 | handle |
| 1430 | portable computing device retention assembly |
| 1442 | base elongated retention element |
| 1446 | distal elongated retention element |
| 1462 | hot shoe |
| 1472 | shadow box attachment groove |
| 1500 | screen display shade accessory |
| 1510 | screen display shade accessory top panel |
| 1512 | screen display shade accessory first side panel |
| 1513 | screen display shade accessory side panel tapered edge |
| 1514 | screen display shade accessory second side panel |
| 1571 | screen display shade accessory attachment element |
| 1572 | screen display shade accessory attachment extrusion |
| 1592 | screen display shade accessory assembly motion |
| 1600 | microphone assembly |
| 1610 | microphone |
| 1612 | microphone boom |
| 1620 | microphone electro-mechanical coupler |
| 1692 | microphone assembly motion |
| 1700 | light emitting panel assembly |
| 1710 | light emitting panel |
| 1712 | light emitting panel support column |
| 1720 | light emitting panel electro-mechanical coupler |
| 1792 | light emitting panel assembly motion |
| 1800 | portable computing device holster |
| 1810 | handle assembly |
| 1812 | handle |
| 1813 | handle grip sleeve |
| 1816 | distal, free handle end |
| 1818 | handle attachment section |
| 1822 | central articulating element |
| 1824 | articulating subassembly pivot pin |

-continued

| Ref. No. | Description |
|---|---|
| 1829 | central articulating element pivot pin receiving bore |
| 1830 | portable computing device retention assembly |
| 1832 | tablet rear support panel |
| 1835 | handle sliding mechanism receiving edge channel |
| 1842 | base elongated retention element |
| 1843 | base elongated retention element channel base segment |
| 1845a | first base elongated retention element channel formation |
| 1845b | second base elongated retention element channel formation |
| 1846 | distal elongated retention element |
| 1847 | distal elongated retention element channel base segment |
| 1849a | first distal elongated retention element channel formation |
| 1849b | second distal elongated retention element channel formation |
| 1852 | computing device retention force application tension biasing element |
| 1852a | computing device retention force application tension biasing element distal attachment end |
| 1852b | computing device retention force application tension biasing element proximal attachment end |
| 1857 | biasing element attachment point access cavity |
| 1858 | biasing element attachment point |
| 1859 | biasing element cavity cover member |
| 1862 | hot shoe |
| 1864 | laser projection virtual keyboard |
| 1882 | handle sliding mechanism body |
| 1900 | Bluetooth controller |
| 1910 | Bluetooth controller housing |
| 1912 | Bluetooth controller housing front panel |
| 1914 | Bluetooth controller housing side panel |
| 1916 | Bluetooth controller housing retention slot |
| 1920 | Bluetooth controller receptacle |
| 1921 | Bluetooth controller receptacle top panel |
| 1922 | Bluetooth controller receptacle front panel latch element |
| 1924 | Bluetooth controller receptacle lower panel |
| 1926 | Bluetooth controller receptacle retention projection |
| 1928 | Bluetooth controller receptacle rear panel |
| 1940 | Bluetooth controller centrally located button |
| 1942 | Bluetooth controller upper radially located button |
| 1944 | Bluetooth controller central radially located button |
| 1946 | Bluetooth controller lower radially located button |
| 1950 | portable power source |
| 1952 | adjoining power contact |
| 1954 | delivery power contact |
| 1960 | electrical power conductors |
| 1962 | power operating switch |
| 2000 | projected virtual keyboard |
| 2010 | projected virtual keyboard key(s) |
| 2100 | extendable portable computing device support panel assembly |
| 2130 | portable computing device retention assembly |
| 2132 | tablet rear support panel |
| 2133 | rear support panel tablet contacting surface |
| 2134 | handle sliding mechanism receiving slot |
| 2135 | handle sliding mechanism receiving edge channel |
| 2138 | handle sliding mechanism detent lateral bores |
| 2143 | handle sliding mechanism receiving slot |
| 2144 | handle sliding mechanism receiving edge channel |
| 2145 | handle sliding mechanism detent lateral bores |
| 2160 | lower first side extension wing panel |
| 2161 | lower second side extension wing panel |
| 2162 | lower first side extension wing panel slide engagement extruded key |
| 2163 | lower second side extension wing panel slide engagement extruded key |
| 2164a | wing panel retention channel base segment |
| 2164b | wing panel retention channel edge segment |
| 2165 | base elongated retention element channel formation |
| 2168 | extension wing panel assembly slot |
| 2169 | portable computing device retention assembly camera aperture |
| 2170 | upper first side extension wing panel |
| 2171 | upper second side extension wing panel |
| 2172 | upper first side extension wing panel slide engagement extruded key |
| 2173 | upper second side extension wing panel slide engagement extruded key |
| 2179 | micro-suction material |
| 2133 | base rear support panel tablet contacting surface |

| Ref. No. | Description |
| --- | --- |
| 2200 | mountable portable computing device |
| 2202 | mountable portable computing device peripheral edge |
| 2204 | mountable portable computing device viewing surface |
| 2206 | mountable portable computing device non-viewing surface |
| 2230 | portable computing device retention assembly |
| 2234 | handle sliding mechanism receiving slot |
| 2235 | handle sliding mechanism receiving edge channel |
| 2238 | handle sliding mechanism detent lateral bores |

What is claimed is:

1. A portable computing device holster adapted to support a portable computing device of any of various sizes, the portable computing device holster comprising:
  a handle having an attachment end and a distal, free, detached end, wherein the handle is of a size and shape conducive to being hand held, the handle including a hand grip extending from the distal, free, detached end towards the attachment end, wherein the portable computing device holster terminates at the distal, free, detached end of the handle:
  a portable computing device retention assembly including:
  a rear support panel;
  a first elongated retention element channel base segment having a first portable computing device supporting feature located forward respective to the rear support panel, the first portable computing device supporting feature designed to engage with and retain an edge of the portable computing device, wherein the first portable computing device supporting feature enables engagement of a length of the edge of the portable computing device is unlimited;
  a second elongated retention element channel base segment having a second portable computing device supporting feature extending forward respective to the rear support panel, the second portable computing device supporting feature designed to engage with and retain an opposite edge of the portable computing device, wherein the second portable computing device supporting feature enables engagement of a length of the opposite edge of the portable computing device is unlimited; and
  at least one width retention element,
    wherein when the hand grip is oriented substantially vertically, the portable computing device retention assembly enables orientation of a viewing screen of the portable computing device to be in a substantially vertically orientation and facing the user,
    wherein the first elongated retention element channel base segment and the second elongated retention element channel base segment are carried by the rear support panel,
    wherein at least one of the first elongated retention element channel base segment and the second elongated retention element channel base segment is slideably assembled to the rear support panel,
    wherein the at least one of the width retention element temporarily retains the first elongated retention element channel base segment and the second elongated retention element channel base segment at a fixed span,
    wherein the fixed span accommodates the portable computing device having a dimension in a direction parallel to the fixed span, where the dimension of the portable computing device parallel to the fixed span is only limited between a minimum span when the sliding assembly is contracted into a minimum dimension and a maximum span when the sliding assembly is contracted into a maximum dimension, wherein the portable computing device retention assembly is attached to the attachment end of the handle.

2. The portable computing device holster as recited in claim 1, further comprising an articulating motion assembly, the articulating motion assembly enabling positional adjustment of a portable computing device carried by the portable computing device retention assembly respective to the handle, wherein the articulating assembly provides at least one of a motion where:
  (a) the rear support panel is rotationally assembled to the handle, wherein the rear support panel rotates about an axis that is perpendicular to a plane defined by a viewing surface of the portable computing device; and
  (b) the rear support panel is pivotally assembled to the handle, wherein the rear support panel pivots about an axis that is perpendicular to a plane defined by the rotational axis and an elongated axis of the handle.

3. The portable computing device holster as recited in claim 1, further comprising an articulating motion assembly, the articulating motion assembly enabling positional adjustment of the portable computing device carried by the portable computing device retention assembly respective to the handle.

4. The portable computing device holster as recited in claim 1, further comprising a controller component assembled into the handle.

5. The portable computing device holster as recited in claim 1, further comprising:
  a controller; and
  at least one of the following in signal communication with the controller:
    a) a wired communication interface,
    b) at least one connector, and
    c) a digital camera.

6. The portable computing device holster adapted to support a portable computing device as recited in claim 1, wherein one or more of the at least one width retention element is a tension generating biasing element and the tension generating biasing element provides a force drawing the first elongated retention element channel base segment and the second elongated retention element channel base segment towards one another, thus retaining a fixed span when an image acquisition device is inserted therebetween.

7. The portable computing device holster as recited in claim 1, further comprising:
  an articulating motion assembly enabling positional adjustment of a portable computing device carried by the portable computing device retention assembly respective to the handle via a first motion and a second motion, the articulating assembly comprising:
    (a) a first articulating motion joint enabling the first motion, and
    (b) a second articulating motion joint enabling the second motion.

8. The portable computing device holster as recited in claim 1, further comprising:
  a user input integrated into the handle, wherein the user input is in signal communication with the portable computing device.

9. The portable computing device holster as recited in claim 1, wherein the handle is removably assembled to the portable computing device retention assembly.

10. The portable computing device holster as recited in claim 1, further comprising:
a lanyard assembled to the handle.

11. The portable computing device holster as recited in claim 1, wherein the distal, free, detached end of the handle is the farthest structural point from the portable computing device retention assembly.

12. The portable computing device holster as recited in claim 1, the portable computing device further comprising a camera, wherein the portable computing device retentions assembly includes a clearance for a camera lens of the camera.

13. An articulating handle assembly, comprising:
a handle having an attachment end and a distal, free, detached end, wherein the handle is of a size and shape conducive to being hand held, the handle including a hand grip extending from the distal, free, detached end towards the attachment end, wherein the portable computing device holster terminates at the distal, free, detached end of the handle;
a portable computing device retention assembly comprising a first portable computing device grip, and a rear support panel carrying a second portable computing device grip, the second portable computing device grip being spatially arranged respective to the first portable computing device grip, the rear support panel having a rear surface, the first portable computing device grip and the second portable computing device grip being linearly moveable respective to one another by a sliding interface;
an articulating motion assembly assembled to the attachment end of the handle and the portable computing device retention assembly, wherein the articulating motion assembly enables a rotational motion between the handle and the portable computing device retention assembly,
wherein when the hand grip is oriented substantially vertically, the portable computing device retention assembly enables orientation of a viewing screen of the portable computing device to be in a substantially vertically orientation and facing the user,
wherein the portable computing device retention assembly is designed enabling retention of the portable computing device, wherein the portable computing device can be any suitable portable computing device, each of any suitable portable computing device having different dimensions in each of a first dimension and a second dimension,
wherein the first dimension is unlimited and the second dimension is limited by dimensions between the first portable computing device grip and the second portable computing device grip in a minimum, collapsed configuration and a maximum, expanded configuration.

14. The articulating handle assembly as recited in claim 13, further comprising:
an articulating motion assembly enabling positional adjustment of a portable computing device carried by the portable computing device retention assembly respective to the handle via a first motion and a second motion, the articulating assembly comprising:
(a) a first articulating motion joint enabling the first motion, and
(b) a second articulating motion joint enabling the second motion.

15. The articulating handle assembly as recited in claim 13, further comprising a controller component assembled into the handle.

16. The articulating handle assembly as recited in claim 13, further comprising:
a user input integrated into the handle, wherein the user input is in signal communication with a portable computing device.

17. The articulating handle assembly as recited in claim 13, wherein the handle is removably assembled to the portable computing device retention assembly.

18. The articulating handle assembly as recited in claim 13, further comprising:
a lanyard assembled to the handle.

19. An image acquisition assembly comprising:
a handle having an attachment end and a distal, free, detached end, the handle being elongated having a substantially consistent cross section shape and size conducive to being hand held along an entire length extending from the distal, free, detached end towards the attachment end;
an image acquisition device support element being carried by the attachment end of the handle;
an articulating assembly integrated between the image acquisition device support element and the handle,
an image acquisition device carried by the image acquisition device support element; and
a touch screen carried by the handle, wherein the touch screen and the image acquisition device are separate elements, wherein the touch screen is in signal communication with the image acquisition device, wherein, a viewing plane of the touch screen is substantially parallel to an elongated axis of the handle.

20. The image acquisition assembly as recited in claim 19, wherein the handle is a first handle, the image acquisition assembly further comprising:
a second handle, wherein the second handle has an attachment end and a distal, free detached end,
wherein the image acquisition device support element is carried by the attachment end of the first handle and the attachment end of the second handle.

21. The image acquisition assembly as recited in claim 19, the holster further comprising:
a controller; and
at least one of the following in signal communication with the controller:
a) a wired communication interface,
b) at least one connector, and
c) a digital camera.

22. The image acquisition assembly as recited in claim 19, further comprising:
an articulating motion assembly enabling positional adjustment of a portable computing device carried by the portable computing device retention assembly respective to the handle via a first motion and a second motion, the articulating assembly comprising:
(a) a first articulating motion joint enabling the first motion, and
(b) a second articulating motion joint enabling the second motion.

23. The image acquisition assembly as recited in claim 19, further comprising a controller component assembled into the handle.

24. The image acquisition assembly as recited in claim 19, further comprising:
a user input integrated into the handle, wherein the user input is in signal communication with the image acquisition assembly.

25. The image acquisition assembly as recited in claim 19, wherein the handle is removably assembled to the portable computing device retention assembly.

26. The image acquisition assembly as recited in claim 19, further comprising:
 a lanyard assembled to the handle.

27. The image acquisition assembly as recited in claim 19, further comprising:
 a portable computing device retention assembly including:
  a rear support panel;
  a first elongated retention element channel base segment having a first portable computing device supporting feature located forward respective to the rear support panel, the first portable computing device supporting feature designed to engage with and retain an edge of the portable computing device;
  a second elongated retention element channel base segment having a second portable computing device supporting feature extending forward respective to the rear support panel, the second portable computing device supporting feature designed to engage with and retain an edge of the portable computing device;
  at least one width retention element,
  wherein the first elongated retention element channel base segment and the second elongated retention element channel base segment are carried by the rear support panel,
  wherein at least one of the first elongated retention element channel base segment and the second elongated retention element channel base segment is slideably assembled to the rear support panel,
  wherein the at least one of the width retention element temporarily retains the first elongated retention element channel base segment and the second elongated retention element channel base segment at a fixed span.

28. The image acquisition assembly adapted to support a portable computing device as recited in claim 27, wherein one or more of the at least one width retention element is a tension generating biasing element and the tension generating biasing element provides a force drawing the first elongated retention element channel base segment and the second elongated retention element channel base segment towards one another, thus retaining a fixed span when an image acquisition device is inserted therebetween.

29. An image acquisition assembly comprising:
 a handle having an attachment end and a distal free, detached end, wherein the handle is of a size and shape conducive to being hand held, the handle including a hand grip extending from the distal free, detached end towards the attachment end;
 an image acquisition device support element being carried by the attachment end of the handle;
 an articulating assembly integrated between the image acquisition device support element and the handle, the articulating assembly enables at least two different motions encountered by a camera, wherein at least one motion of the at least two different motions encountered by the camera is a rotational motion about an axis that is perpendicular to a plane defined by a viewing direction of the camera; and
 an image acquisition device carried by the image acquisition device support element,
 wherein the image acquisition device support element includes a clearance enabling an uninhibited view of a camera lens of the camera when the portable computing device is inserted into the image acquisition device support element.

30. The image acquisition assembly as recited in claim 29 further comprising:
 a user input device carried by the handle, wherein the user input device is in signal communication with the image acquisition device.

31. The image acquisition assembly as recited in claim 29, wherein a second motion of the at least two different motions encountered by the camera is a rotational motion about an axis that is parallel to a plane defined by a viewing direction of the camera and perpendicular to an axis defined by the handle.

\* \* \* \* \*